United States Patent
Boyd et al.

(10) Patent No.: US 9,186,547 B2
(45) Date of Patent: *Nov. 17, 2015

(54) GOLF CLUBS AND GOLF CLUB HEADS

(75) Inventors: Robert Boyd, Euless, TX (US); John Stites, Weatherford, TX (US); Mario A. Lafortune, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 665 days.

This patent is subject to a terminal disclaimer.

(21) Appl. No.: 13/250,107

(22) Filed: Sep. 30, 2011

(65) Prior Publication Data

US 2012/0277018 A1    Nov. 1, 2012

Related U.S. Application Data

(60) Provisional application No. 61/480,322, filed on Apr. 28, 2011.

(51) Int. Cl.
*A63B 53/00* (2015.01)
*A63B 24/00* (2006.01)
(Continued)

(52) U.S. Cl.
CPC ......... *A63B 24/0003* (2013.01); *A63B 24/0021* (2013.01); *A63B 53/00* (2013.01); *A63B 53/047* (2013.01); *A63B 53/0466* (2013.01); *A63B 69/3632* (2013.01); *A63B 69/3685* (2013.01); *A63B 71/0619* (2013.01); *A63B 71/0622* (2013.01); *G06F 1/1626* (2013.01); *G06F 3/0346* (2013.01); *A63B 53/04* (2013.01);
(Continued)

(58) Field of Classification Search
CPC ........... A63B 69/3632; A63B 24/0003; A63B 24/0021; A63B 2220/30; A63B 2220/53; A63B 2220/833; A63B 2220/803; A63B 2225/20; A63B 2225/50; A63B 2220/16; A63B 2220/40; A63B 53/14; A63B 53/00; A63B 53/10; A63B 53/12
USPC ......................................................... 473/223
See application file for complete search history.

(56) References Cited

U.S. PATENT DOCUMENTS 569,438 A    10/1896    Urquhart
632,885 A     9/1899    Sweny
(Continued)

FOREIGN PATENT DOCUMENTS

CA    2139690 A1    7/1996
CN    2411030 Y     12/2000
(Continued)

OTHER PUBLICATIONS

International Search Report in related International Application No. PCT/US12/35476; dated Aug. 24, 2012.
(Continued)

*Primary Examiner* — Michael Cuff
(74) *Attorney, Agent, or Firm* — Banner & Witcoff, Ltd.

(57) ABSTRACT

Golf clubs according to at least some example aspects of this disclosure may include a golf club head and a shaft configured to engage with the golf club head which includes a grip engaged with the shaft. Further, the golf club may include a monitoring device, which includes a sensor and a transmitter. Additionally, the monitoring device may be configured to determine data related to the characteristics of a golf swing. Further, the monitoring device may be configured to transmit the data related to the characteristics of a golf swing to a remote computer.

41 Claims, 34 Drawing Sheets

(51) Int. Cl.
*A63B 53/04* (2015.01)
*A63B 69/36* (2006.01)
*A63B 71/06* (2006.01)
*G06F 3/0346* (2013.01)
*G06F 1/16* (2006.01)
*A63B 53/10* (2015.01)
*A63B 53/14* (2015.01)

(52) U.S. Cl.
CPC ............. *A63B53/0475* (2013.01); *A63B 53/10* (2013.01); *A63B 53/14* (2013.01); *A63B 2053/005* (2013.01); *A63B 2053/0433* (2013.01); *A63B 2071/0647* (2013.01); *A63B 2209/00* (2013.01); *A63B 2220/16* (2013.01); *A63B 2220/30* (2013.01); *A63B 2220/40* (2013.01); *A63B 2220/53* (2013.01); *A63B 2220/803* (2013.01); *A63B 2220/833* (2013.01); *A63B 2225/15* (2013.01); *A63B 2225/20* (2013.01); *A63B 2225/50* (2013.01)

(56) References Cited

U.S. PATENT DOCUMENTS

| | | |
|---|---|---|
| 648,256 A | 4/1900 | Hartley |
| 651,920 A | 6/1900 | Cushing, Jr. |
| 670,522 A | 3/1901 | Thompson |
| 727,086 A | 5/1903 | Burnam |
| 777,400 A | 12/1904 | Clark |
| 1,058,463 A | 4/1913 | Pringle |
| 1,083,434 A | 1/1914 | Curry |
| 1,133,129 A | 3/1915 | Govan |
| 1,135,621 A | 4/1915 | Roberts |
| 1,137,457 A | 4/1915 | Breitenbaugh |
| 1,165,559 A | 12/1915 | Vories |
| 1,190,589 A | 7/1916 | Rolfe |
| 1,206,104 A | 11/1916 | Goodrich |
| 1,206,105 A | 11/1916 | Goodrich |
| 1,219,417 A | 3/1917 | Vories |
| 1,222,770 A | 4/1917 | Kaye |
| 1,235,922 A | 8/1917 | Pittar |
| 1,250,301 A | 12/1917 | Goodrich |
| 1,258,212 A | 3/1918 | Goodrich |
| 1,429,569 A | 9/1922 | Craig |
| 1,529,959 A | 3/1925 | Martin |
| 1,549,265 A | 8/1925 | Kaden |
| 1,556,928 A | 10/1925 | Ganders |
| 1,568,485 A | 1/1926 | Turney |
| 1,594,850 A | 8/1926 | Perkins |
| 1,605,140 A | 11/1926 | Perkins |
| 1,620,588 A | 3/1927 | wilson |
| 1,644,177 A | 10/1927 | Collins |
| 1,676,518 A | 7/1928 | Boles |
| 1,697,846 A | 1/1929 | Anderson |
| 1,697,998 A | 1/1929 | Novak et al. |
| 1,705,997 A | 3/1929 | Williams |
| 1,818,359 A | 8/1931 | Samaras et al. |
| 1,840,924 A | 1/1932 | Tucker |
| 1,854,548 A | 4/1932 | Hunt |
| 1,916,792 A | 7/1933 | Hadden |
| 1,974,224 A | 9/1934 | Van Der Linden |
| 1,993,928 A | 3/1935 | Glover |
| 2,004,968 A | 6/1935 | Young |
| 2,041,676 A | 5/1936 | Gallagher |
| 2,087,685 A | 7/1937 | Hackney |
| 2,179,034 A | 11/1939 | Duncan, Jr. |
| 2,217,338 A | 10/1940 | Fuller |
| 2,242,670 A | 5/1941 | Fuller |
| 2,305,270 A | 12/1942 | Nilson |
| 2,329,313 A | 9/1943 | Winter |
| 2,381,636 A | 8/1945 | Bancroft |
| 2,384,333 A | 9/1945 | Nilson |
| 2,429,351 A | 10/1947 | Fetterolf |
| 2,451,262 A | 10/1948 | Watkins |
| 2,455,150 A | 11/1948 | Verderber |
| 2,475,926 A | 7/1949 | Verderber |
| 2,477,438 A | 7/1949 | Brouwer |
| 2,495,444 A | 1/1950 | Chamberlain et al. |
| 2,520,701 A | 8/1950 | Verderber |
| 2,520,702 A | 8/1950 | Verderber |
| 2,550,846 A | 5/1951 | Milligan |
| 2,571,970 A | 10/1951 | Verderber |
| 2,576,866 A | 11/1951 | Verderber |
| 2,593,368 A | 4/1952 | Verderber |
| 2,691,525 A | 10/1954 | Callaghan, Sr. |
| 2,705,147 A | 3/1955 | Winter |
| 2,750,194 A | 6/1956 | Clark |
| 2,777,694 A | 1/1957 | Winter |
| 2,847,219 A | 8/1958 | Shoemaker et al. |
| 2,962,286 A | 11/1960 | Brouwer |
| 3,045,371 A | 7/1962 | Kurlinski |
| 3,064,980 A | 11/1962 | Steiner |
| 3,084,940 A | 4/1963 | Cissel |
| 3,170,698 A | 2/1965 | Schoeffler et al. |
| 3,212,783 A | 10/1965 | Bradley |
| 3,270,564 A * | 9/1966 | Evans ........................ 73/865.4 |
| 3,305,235 A | 2/1967 | Williams, Jr. |
| 3,477,720 A | 11/1969 | Saba |
| 3,519,271 A | 7/1970 | Smith |
| 3,601,399 A | 8/1971 | Agens et al. |
| 3,606,327 A | 9/1971 | Gorman |
| 3,788,647 A | 1/1974 | Evans |
| 3,791,647 A | 2/1974 | Verderber |
| 3,792,863 A | 2/1974 | Evans |
| 3,806,131 A | 4/1974 | Evans |
| 3,810,631 A | 5/1974 | Braly |
| 3,814,437 A | 6/1974 | Winquist |
| 3,840,231 A | 10/1974 | Moore |
| 3,945,646 A | 3/1976 | Hammond |
| 3,966,210 A | 6/1976 | Rozmus |
| 3,970,236 A | 7/1976 | Rogers |
| 3,976,299 A | 8/1976 | Lawrence et al. |
| 3,980,301 A | 9/1976 | Smith |
| 3,997,170 A | 12/1976 | Goldberg |
| 4,165,874 A | 8/1979 | Lezatte et al. |
| 4,194,739 A | 3/1980 | Thompson |
| 4,291,883 A | 9/1981 | Smart et al. |
| 4,313,607 A | 2/1982 | Thompson |
| 4,322,083 A | 3/1982 | Imai |
| 4,398,965 A | 8/1983 | Campau |
| 4,431,192 A | 2/1984 | Stuff, Jr. |
| 4,438,931 A | 3/1984 | Motomiya |
| 4,444,392 A | 4/1984 | Duclos |
| 4,511,145 A | 4/1985 | Schmidt |
| 4,523,759 A | 6/1985 | Igarashi |
| 4,534,558 A | 8/1985 | Yoneyama |
| 4,535,990 A | 8/1985 | Yamada |
| 4,582,321 A | 4/1986 | Yoneyama |
| 4,630,827 A | 12/1986 | Yoneyama |
| 4,635,941 A | 1/1987 | Yoneyama |
| 4,664,383 A | 5/1987 | Aizawa |
| 4,667,963 A | 5/1987 | Yoneyama |
| 4,681,321 A | 7/1987 | Chen et al. |
| 4,697,814 A | 10/1987 | Yamada |
| 4,708,347 A | 11/1987 | Kobayashi |
| 4,728,105 A | 3/1988 | Kobayashi |
| 4,732,389 A | 3/1988 | Kobayashi |
| 4,811,949 A | 3/1989 | Kobayashi |
| 4,811,950 A | 3/1989 | Kobayashi |
| 4,842,280 A | 6/1989 | Hilton |
| 4,856,782 A | 8/1989 | Cannan |
| 4,867,458 A | 9/1989 | Sumikawa et al. |
| 4,871,174 A | 10/1989 | Kobayashi |
| 4,878,666 A | 11/1989 | Hosoda |
| 4,895,371 A | 1/1990 | Bushner |
| 4,898,387 A | 2/1990 | Finney |
| 4,927,144 A | 5/1990 | Stormon |
| 4,928,972 A | 5/1990 | Nakanishi et al. |
| 4,930,781 A | 6/1990 | Allen |
| 4,991,850 A | 2/1991 | Wilhlem |
| 5,004,242 A | 4/1991 | Iwanaga et al. |
| 5,009,425 A | 4/1991 | Okumoto et al. |
| D318,703 S | 7/1991 | Shearer |
| 5,028,049 A | 7/1991 | McKeighen |

(56) References Cited

U.S. PATENT DOCUMENTS

| | | | |
|---|---|---|---|
| 5,060,951 A | 10/1991 | Allen | |
| 5,067,715 A | 11/1991 | Schmidt et al. | |
| 5,076,585 A | 12/1991 | Bouquet | |
| 5,078,397 A | 1/1992 | Aizawa | |
| 5,080,366 A | 1/1992 | Okumoto et al. | |
| D326,130 S | 5/1992 | Chorne | |
| 5,133,553 A | 7/1992 | Divnick | |
| 5,186,465 A | 2/1993 | Chorne | |
| 5,205,560 A | 4/1993 | Hoshi et al. | |
| 5,211,401 A | 5/1993 | Hainey | |
| 5,213,328 A | 5/1993 | Long et al. | |
| 5,221,088 A | 6/1993 | McTeigue et al. | |
| 5,228,689 A | 7/1993 | Donofrio, Sr. | |
| 5,228,694 A | 7/1993 | Okumoto et al. | |
| 5,253,869 A | 10/1993 | Dingle et al. | |
| 5,269,517 A | 12/1993 | Petruccelli et al. | |
| 5,282,625 A | 2/1994 | Schmidt et al. | |
| 5,290,036 A | 3/1994 | Fenton et al. | |
| 5,295,689 A | 3/1994 | Lundberg | |
| 5,301,941 A | 4/1994 | Allen | |
| 5,301,946 A | 4/1994 | Schmidt et al. | |
| 5,316,305 A | 5/1994 | McCabe | |
| 5,326,106 A | 7/1994 | Meyer | |
| 5,330,187 A | 7/1994 | Schmidt et al. | |
| 5,332,225 A | 7/1994 | Ura | |
| D350,176 S | 8/1994 | Antonious | |
| 5,333,871 A | 8/1994 | Wishon | |
| 5,340,104 A | 8/1994 | Griffin | |
| 5,372,365 A | 12/1994 | McTeigue et al. | |
| D354,103 S | 1/1995 | Allen | |
| 5,377,985 A | 1/1995 | Ohnishi | |
| 5,380,010 A | 1/1995 | Werner et al. | |
| 5,385,346 A | 1/1995 | Carroll et al. | |
| 5,393,056 A | 2/1995 | Richardson | |
| 5,407,196 A | 4/1995 | Busnardo | |
| 5,413,337 A | 5/1995 | Goodman et al. | |
| 5,419,556 A | 5/1995 | Take | |
| 5,419,560 A | 5/1995 | Bamber | |
| 5,429,366 A | 7/1995 | McCabe | |
| 5,435,551 A | 7/1995 | Chen | |
| 5,437,456 A | 8/1995 | Schmidt et al. | |
| 5,447,307 A | 9/1995 | Antonious | |
| 5,451,056 A | 9/1995 | Manning | |
| 5,451,058 A | 9/1995 | Price et al. | |
| D363,749 S | 10/1995 | Kenmi | |
| 5,464,211 A | 11/1995 | Atkins, Sr. | |
| 5,464,217 A | 11/1995 | Shenoha et al. | |
| 5,467,988 A | 11/1995 | Henwood | |
| 5,472,201 A | 12/1995 | Aizawa et al. | |
| 5,472,203 A | 12/1995 | Schmidt et al. | |
| 5,478,082 A * | 12/1995 | De Knight et al. | 473/218 |
| 5,480,152 A | 1/1996 | Schmidt et al. | |
| 5,489,097 A | 2/1996 | Simmons | |
| 5,492,327 A | 2/1996 | Biafore, Jr. | |
| 5,497,995 A | 3/1996 | Swisshelm | |
| 5,505,453 A | 4/1996 | Mack | |
| 5,516,106 A | 5/1996 | Henwood | |
| 5,518,243 A | 5/1996 | Redman | |
| D371,817 S | 7/1996 | Olsavsky et al. | |
| D372,063 S | 7/1996 | Hueber | |
| 5,531,439 A | 7/1996 | Azzarella | |
| 5,533,725 A | 7/1996 | Reynolds, Jr. | |
| 5,533,728 A | 7/1996 | Pehoski et al. | |
| 5,538,245 A | 7/1996 | Moore | |
| 5,547,188 A | 8/1996 | Dumontier et al. | |
| 5,547,427 A | 8/1996 | Rigal et al. | |
| 5,564,705 A | 10/1996 | Kobayashi et al. | |
| D375,987 S | 11/1996 | Lin | |
| 5,570,886 A | 11/1996 | Rigal et al. | |
| 5,580,058 A | 12/1996 | Coughlin | |
| 5,581,993 A | 12/1996 | Strobel | |
| 5,586,947 A | 12/1996 | Hutin | |
| 5,586,948 A | 12/1996 | Mick | |
| 5,595,552 A | 1/1997 | Wright et al. | |
| 5,601,498 A | 2/1997 | Antonious | |
| 5,603,668 A | 2/1997 | Antonious | |
| 5,607,365 A | 3/1997 | Wolf | |
| 5,616,088 A | 4/1997 | Aizawa et al. | |
| 5,616,832 A | 4/1997 | Nauck | |
| 5,626,528 A | 5/1997 | Toulon | |
| 5,626,530 A | 5/1997 | Schmidt et al. | |
| D381,382 S | 7/1997 | Fenton, Jr. | |
| 5,669,829 A | 9/1997 | Lin | |
| 5,681,993 A | 10/1997 | Heitman | |
| D386,550 S | 11/1997 | Wright et al. | |
| D386,551 S | 11/1997 | Solheim et al. | |
| D387,113 S | 12/1997 | Burrows | |
| D387,405 S | 12/1997 | Solheim et al. | |
| 5,692,968 A | 12/1997 | Shine | |
| 5,692,972 A | 12/1997 | Langslet | |
| 5,695,409 A | 12/1997 | Jackson | |
| 5,709,613 A | 1/1998 | Sheraw | |
| 5,709,615 A | 1/1998 | Liang | |
| 5,711,722 A | 1/1998 | Miyajima et al. | |
| 5,718,641 A | 2/1998 | Lin | |
| D392,007 S | 3/1998 | Fox | |
| 5,724,265 A | 3/1998 | Hutchings | |
| 5,728,006 A | 3/1998 | Teitell et al. | |
| 5,735,754 A | 4/1998 | Antonious | |
| 5,746,664 A | 5/1998 | Reynolds, Jr. | |
| 5,749,795 A | 5/1998 | Schmidt et al. | |
| 5,766,094 A | 6/1998 | Mahaffey et al. | |
| 5,772,525 A | 6/1998 | Klein | |
| 5,779,555 A | 7/1998 | Nomura et al. | |
| 5,785,609 A | 7/1998 | Sheets et al. | |
| D397,387 S | 8/1998 | Allen | |
| 5,788,584 A | 8/1998 | Parente et al. | |
| 5,792,000 A * | 8/1998 | Weber et al. | 473/223 |
| D398,687 S | 9/1998 | Miyajima et al. | |
| D398,946 S | 9/1998 | Kenmi | |
| 5,803,830 A | 9/1998 | Austin et al. | |
| D399,274 S | 10/1998 | Bradford | |
| 5,820,481 A | 10/1998 | Raudman | |
| 5,826,874 A | 10/1998 | Teitell et al. | |
| D400,945 S | 11/1998 | Gilbert et al. | |
| 5,839,975 A | 11/1998 | Lundberg | |
| 5,863,261 A | 1/1999 | Eggiman | |
| 5,873,791 A | 2/1999 | Allen | |
| 5,888,148 A | 3/1999 | Allen | |
| 5,908,356 A | 6/1999 | Nagamoto | |
| 5,908,357 A | 6/1999 | Hsieh | |
| 5,928,087 A | 7/1999 | Emberton et al. | |
| 5,941,782 A | 8/1999 | Cook | |
| D414,234 S | 9/1999 | Darrah | |
| 5,947,841 A | 9/1999 | Silvestro | |
| 5,951,410 A | 9/1999 | Butler et al. | |
| 5,955,667 A | 9/1999 | Fyfe | |
| 5,971,868 A | 10/1999 | Kosmatka | |
| 5,997,415 A | 12/1999 | Wood | |
| 6,001,030 A | 12/1999 | Delaney | |
| 6,007,432 A | 12/1999 | Kosmatka | |
| 6,012,988 A | 1/2000 | Burke | |
| 6,015,354 A | 1/2000 | Ahn et al. | |
| 6,018,705 A | 1/2000 | Gaudet et al. | |
| D422,041 S | 3/2000 | Bradford | |
| 6,042,486 A | 3/2000 | Gallagher | |
| 6,044,704 A | 4/2000 | Sacher | |
| 6,045,364 A | 4/2000 | Dugan | |
| 6,048,278 A | 4/2000 | Meyer et al. | |
| 6,052,654 A | 4/2000 | Gaudet et al. | |
| 6,074,309 A | 6/2000 | Mahaffey | |
| 6,080,068 A | 6/2000 | Takeda | |
| 6,086,485 A | 7/2000 | Hamada et al. | |
| 6,095,931 A | 8/2000 | Hettinger et al. | |
| 6,117,022 A | 9/2000 | Crawford et al. | |
| 6,120,384 A | 9/2000 | Drake | |
| 6,149,533 A | 11/2000 | Finn | |
| 6,149,534 A | 11/2000 | Peters et al. | |
| 6,159,109 A | 12/2000 | Langslet | |
| 6,176,791 B1 | 1/2001 | Wright | |
| 6,193,614 B1 | 2/2001 | Sasamoto et al. | |
| 6,196,932 B1 | 3/2001 | Marsh et al. | |
| 6,203,449 B1 | 3/2001 | Kenmi | |
| 6,206,788 B1 | 3/2001 | Krenzler | |

(56) References Cited

U.S. PATENT DOCUMENTS

| | | |
|---|---|---|
| 6,217,461 B1 | 4/2001 | Galy |
| 6,224,493 B1 | 5/2001 | Lee et al. |
| 6,261,102 B1 | 7/2001 | Dugan et al. |
| 6,270,422 B1 | 8/2001 | Fisher |
| 6,270,423 B1 | 8/2001 | Webb |
| 6,299,546 B1 | 10/2001 | Wang |
| 6,299,553 B1 | 10/2001 | Petuchowski et al. |
| 6,302,807 B1 | 10/2001 | Rohrer |
| 6,319,149 B1 | 11/2001 | Lee |
| 6,332,848 B1 | 12/2001 | Long et al. |
| 6,338,683 B1 | 1/2002 | Kosmatka |
| 6,342,018 B1 | 1/2002 | Mason |
| 6,344,000 B1 | 2/2002 | Hamada et al. |
| 6,344,001 B1 | 2/2002 | Hamada et al. |
| 6,348,009 B1 | 2/2002 | Dischler |
| 6,348,013 B1 | 2/2002 | Kosmatka |
| 6,354,956 B1 | 3/2002 | Doong |
| 6,354,961 B1 | 3/2002 | Allen |
| RE37,647 E | 4/2002 | Wolf |
| 6,368,234 B1 | 4/2002 | Galloway |
| 6,386,987 B1 | 5/2002 | Lejeune, Jr. |
| 6,394,910 B1 | 5/2002 | McCarthy |
| 6,402,634 B2 | 6/2002 | Lee et al. |
| 6,402,637 B1 | 6/2002 | Sasamoto et al. |
| 6,402,638 B1 | 6/2002 | Kelley |
| 6,413,167 B1 | 7/2002 | Burke |
| 6,422,951 B1 | 7/2002 | Burrows |
| 6,428,423 B1 | 8/2002 | Merko |
| 6,430,843 B1 | 8/2002 | Potter et al. |
| 6,431,990 B1 | 8/2002 | Manwaring |
| 6,435,982 B1 | 8/2002 | Galloway et al. |
| 6,441,745 B1 | 8/2002 | Gates |
| 6,443,857 B1 | 9/2002 | Chuang |
| 6,447,405 B1 | 9/2002 | Chen |
| 6,454,665 B2 | 9/2002 | Antonious |
| 6,471,603 B1 | 10/2002 | Kosmatka |
| D465,251 S | 11/2002 | Wood et al. |
| 6,478,690 B2 | 11/2002 | Helmstetter et al. |
| 6,482,107 B1 | 11/2002 | Urbanski et al. |
| 6,506,126 B1 | 1/2003 | Goodman |
| 6,506,129 B2 | 1/2003 | Chen |
| 6,514,154 B1 | 2/2003 | Finn |
| 6,524,197 B2 | 2/2003 | Boone |
| 6,524,198 B2 | 2/2003 | Takeda |
| 6,533,679 B1 | 3/2003 | McCabe et al. |
| 6,551,199 B2 | 4/2003 | Viera |
| 6,558,271 B1 | 5/2003 | Beach et al. |
| 6,561,917 B2 | 5/2003 | Manwaring |
| 6,602,149 B1 | 8/2003 | Jacobson |
| 6,605,007 B1 | 8/2003 | Bissonnette et al. |
| 6,607,450 B1 | 8/2003 | Hackman |
| 6,607,451 B2 | 8/2003 | Kosmatka et al. |
| 6,616,547 B2 | 9/2003 | Vincent et al. |
| 6,634,956 B1 | 10/2003 | Pegg |
| 6,638,175 B2 | 10/2003 | Lee et al. |
| D482,089 S | 11/2003 | Burrows |
| D482,090 S | 11/2003 | Burrows |
| D482,420 S | 11/2003 | Burrows |
| 6,641,490 B2 | 11/2003 | Ellemor |
| 6,648,769 B2 | 11/2003 | Lee et al. |
| 6,652,390 B2 | 11/2003 | Bradford |
| 6,652,391 B1 | 11/2003 | Kubica et al. |
| D484,208 S | 12/2003 | Burrows |
| 6,663,503 B1 | 12/2003 | Kenmi |
| 6,676,533 B1 | 1/2004 | Hsien |
| 6,688,989 B2 | 2/2004 | Best |
| 6,695,715 B1 | 2/2004 | Chikaraishi |
| 6,719,641 B2 | 4/2004 | Dabbs et al. |
| 6,719,645 B2 | 4/2004 | Kouno |
| 6,739,983 B2 | 5/2004 | Helmstetter et al. |
| 6,743,112 B2 | 6/2004 | Nelson |
| 6,767,292 B1 | 7/2004 | Skalla, Sr. |
| 6,773,360 B2 | 8/2004 | Willett et al. |
| 6,780,123 B2 | 8/2004 | Hasebe |
| 6,800,037 B2 | 10/2004 | Kosmatka |
| 6,800,038 B2 | 10/2004 | Willett et al. |
| 6,800,039 B1 | 10/2004 | Tseng |
| D498,508 S | 11/2004 | Antonious |
| 6,811,496 B2 | 11/2004 | Wahl et al. |
| 6,819,247 B2 | 11/2004 | Birnbach et al. |
| 6,821,209 B2 | 11/2004 | Manwaring et al. |
| D501,036 S | 1/2005 | Burrows |
| 6,837,800 B2 | 1/2005 | Rollinson et al. |
| 6,840,872 B2 | 1/2005 | Yoneyama |
| D502,232 S | 2/2005 | Antonious |
| 6,863,620 B2 | 3/2005 | Tucker, Sr. |
| 6,876,947 B1 | 4/2005 | Darley et al. |
| 6,878,071 B1 | 4/2005 | Schwieger et al. |
| 6,882,955 B1 | 4/2005 | Ohlenbusch et al. |
| 6,887,165 B2 | 5/2005 | Tsurumaki |
| 6,899,638 B2 | 5/2005 | Iwata et al. |
| 6,923,733 B2 | 8/2005 | Chen |
| 6,926,618 B2 | 8/2005 | Sanchez et al. |
| 6,929,558 B2 | 8/2005 | Manwaring et al. |
| 6,960,142 B2 | 11/2005 | Bissonnette et al. |
| 6,991,552 B2 | 1/2006 | Burke |
| 6,991,555 B2 | 1/2006 | Reese |
| 6,991,560 B2 | 1/2006 | Tseng |
| D515,642 S | 2/2006 | Antonious |
| 6,994,635 B2 | 2/2006 | Poynor |
| 7,018,303 B2 | 3/2006 | Yamamoto |
| 7,018,304 B2 | 3/2006 | Bradford |
| 7,025,692 B2 | 4/2006 | Erickson et al. |
| 7,041,003 B2 | 5/2006 | Bissonnette et al. |
| 7,041,014 B2 | 5/2006 | Wright et al. |
| 7,048,646 B2 | 5/2006 | Yamanaka et al. |
| D523,498 S | 6/2006 | Chen et al. |
| 7,056,229 B2 | 6/2006 | Chen |
| 7,066,835 B2 | 6/2006 | Evans et al. |
| D524,392 S | 7/2006 | Madore et al. |
| 7,070,513 B2 | 7/2006 | Takeda et al. |
| 7,070,515 B1 | 7/2006 | Liu |
| 7,083,530 B2 | 8/2006 | Wahl et al. |
| 7,086,964 B2 | 8/2006 | Chen et al. |
| 7,090,590 B2 | 8/2006 | Chen |
| 7,121,956 B2 | 10/2006 | Lo |
| 7,125,340 B1 | 10/2006 | Priester |
| 7,128,660 B2 | 10/2006 | Gillig |
| 7,128,663 B2 | 10/2006 | Bamber |
| 7,134,971 B2 | 11/2006 | Franklin et al. |
| 7,137,907 B2 | 11/2006 | Gibbs et al. |
| 7,140,975 B2 | 11/2006 | Bissonnette et al. |
| 7,140,977 B2 | 11/2006 | Atkins, Sr. |
| 7,147,569 B2 | 12/2006 | Tang et al. |
| 7,156,750 B2 | 1/2007 | Nishitani et al. |
| 7,160,200 B2 | 1/2007 | Grober |
| 7,163,468 B2 | 1/2007 | Gibbs et al. |
| 7,163,470 B2 | 1/2007 | Galloway et al. |
| 7,169,059 B2 | 1/2007 | Rice et al. |
| 7,175,511 B2 | 2/2007 | Ueda et al. |
| 7,175,541 B2 | 2/2007 | Lo |
| 7,186,185 B2 | 3/2007 | Nagy |
| 7,186,188 B2 | 3/2007 | Gilbert et al. |
| 7,192,364 B2 | 3/2007 | Long |
| 7,201,668 B1 | 4/2007 | Pamias |
| 7,207,898 B2 | 4/2007 | Rice et al. |
| 7,211,006 B2 | 5/2007 | Chang |
| 7,226,366 B2 | 6/2007 | Galloway |
| 7,241,230 B2 | 7/2007 | Tsunoda |
| 7,244,189 B1 | 7/2007 | Stobbe |
| 7,247,104 B2 | 7/2007 | Poynor |
| 7,255,653 B2 | 8/2007 | Saso |
| 7,258,631 B2 | 8/2007 | Galloway et al. |
| 7,261,643 B2 | 8/2007 | Rice et al. |
| D551,310 S | 9/2007 | Kuan et al. |
| 7,264,554 B2 | 9/2007 | Bentley |
| 7,264,555 B2 | 9/2007 | Lee et al. |
| D552,701 S | 10/2007 | Ruggiero et al. |
| 7,278,926 B2 | 10/2007 | Frame |
| 7,294,064 B2 | 11/2007 | Tsurumaki et al. |
| 7,297,071 B2 | 11/2007 | Hyman |
| 7,297,073 B2 | 11/2007 | Jung |
| 7,326,121 B2 | 2/2008 | Roake |
| 7,335,112 B1 | 2/2008 | Bitondo |

(56) References Cited

U.S. PATENT DOCUMENTS

| | | | |
|---|---|---|---|
| D566,214 S | 4/2008 | Evans et al. |
| 7,351,157 B2 | 4/2008 | Priester et al. |
| 7,351,161 B2 | 4/2008 | Beach |
| 7,367,898 B2 | 5/2008 | Hawkins et al. |
| 7,387,579 B2 | 6/2008 | Lin et al. |
| 7,396,289 B2 | 7/2008 | Soracco et al. |
| 7,396,293 B2 | 7/2008 | Soracco |
| 7,396,296 B2 | 7/2008 | Evans |
| 7,407,443 B2 | 8/2008 | Franklin et al. |
| 7,431,660 B2 | 10/2008 | Hasegawa |
| 7,431,663 B2 | 10/2008 | Pamias |
| 7,435,189 B2 | 10/2008 | Hirano |
| 7,442,132 B2 | 10/2008 | Nishio |
| 7,445,563 B1 | 11/2008 | Werner |
| 7,470,201 B2 | 12/2008 | Nakahara et al. |
| 7,473,186 B2 | 1/2009 | Best et al. |
| 7,476,161 B2 | 1/2009 | Williams et al. |
| 7,494,426 B2 | 2/2009 | Nishio et al. |
| D588,223 S | 3/2009 | Kuan |
| 7,500,924 B2 | 3/2009 | Yokota |
| 7,509,842 B2 | 3/2009 | Kostuj |
| 7,520,820 B2 | 4/2009 | Dimarco |
| 7,530,901 B2 | 5/2009 | Imamoto et al. |
| 7,540,810 B2 | 6/2009 | Hettinger et al. |
| 7,559,850 B2 | 7/2009 | Gilbert et al. |
| 7,563,176 B2 | 7/2009 | Roberts et al. |
| 7,572,193 B2 | 8/2009 | Yokota |
| 7,575,523 B2 | 8/2009 | Yokota |
| 7,575,524 B2 | 8/2009 | Willett et al. |
| 7,582,024 B2 | 9/2009 | Shear |
| 7,602,301 B1 | 10/2009 | Stirling et al. |
| 7,618,331 B2 | 11/2009 | Hirano |
| 7,621,820 B2 | 11/2009 | Clausen et al. |
| 7,627,451 B2 | 12/2009 | Vock et al. |
| 7,632,193 B2 | 12/2009 | Thielen |
| 7,641,568 B2 | 1/2010 | Hoffman et al. |
| 7,641,569 B2 | 1/2010 | Best et al. |
| 7,647,071 B2 | 1/2010 | Rofougaran |
| 7,651,409 B1 | 1/2010 | Mier |
| 7,691,004 B1 | 4/2010 | Lueders |
| 7,713,138 B2 | 5/2010 | Sato et al. |
| 7,717,803 B2 | 5/2010 | DiMarco |
| 7,717,807 B2 | 5/2010 | Evans et al. |
| 7,722,478 B2 | 5/2010 | Ebner |
| 7,736,242 B2 | 6/2010 | Stites et al. |
| D619,666 S | 7/2010 | DePaul |
| 7,749,101 B2 | 7/2010 | Imamoto et al. |
| 7,753,809 B2 | 7/2010 | Cackett et al. |
| 7,758,452 B2 | 7/2010 | Soracco |
| 7,766,760 B2 | 8/2010 | Priester |
| 7,771,263 B2 | 8/2010 | Telford |
| 7,771,285 B2 | 8/2010 | Porter |
| 7,771,290 B2 | 8/2010 | Bezilla et al. |
| 7,780,535 B2 | 8/2010 | Hagood et al. |
| 7,789,742 B1 | 9/2010 | Murdock et al. |
| 7,800,480 B1 | 9/2010 | Joseph et al. |
| 7,801,575 B1 | 9/2010 | Balardeta et al. |
| 7,803,066 B2 | 9/2010 | Solheim et al. |
| 7,804,404 B1 | 9/2010 | Balardeta et al. |
| 7,811,182 B2 | 10/2010 | Ligotti, III et al. |
| 7,821,407 B2 | 10/2010 | Shears et al. |
| 7,824,277 B2 | 11/2010 | Bennett et al. |
| 7,825,815 B2 | 11/2010 | Shears et al. |
| 7,831,212 B1 | 11/2010 | Balardeta et al. |
| 7,837,574 B2 | 11/2010 | Brunner |
| 7,837,575 B2 | 11/2010 | Lee et al. |
| 7,837,577 B2 | 11/2010 | Evans |
| 7,846,036 B2 | 12/2010 | Tanaka |
| 7,853,211 B1 | 12/2010 | Balardeta et al. |
| 7,857,705 B1 | 12/2010 | Galloway |
| 7,857,711 B2 | 12/2010 | Shear |
| 7,867,105 B2 | 1/2011 | Moon |
| 7,871,336 B2 | 1/2011 | Breier et al. |
| 7,878,924 B2 | 2/2011 | Clausen et al. |
| 7,883,428 B1 | 2/2011 | Balardeta et al. |
| 7,887,440 B2 | 2/2011 | Wright et al. |
| 7,892,102 B1 | 2/2011 | Galloway |
| 7,896,753 B2 | 3/2011 | Boyd et al. |
| 7,918,745 B2 | 4/2011 | Morris et al. |
| 7,922,596 B2 | 4/2011 | Vanderbilt et al. |
| 7,922,603 B2 | 4/2011 | Boyd et al. |
| 7,927,231 B2 | 4/2011 | Sato et al. |
| 7,931,545 B2 | 4/2011 | Soracco et al. |
| 7,934,998 B2 | 5/2011 | Yokota |
| 7,935,003 B2 | 5/2011 | Matsunaga et al. |
| 7,938,739 B2 | 5/2011 | Cole et al. |
| 7,941,097 B1 | 5/2011 | Balardeta et al. |
| 7,946,926 B1 | 5/2011 | Balardeta et al. |
| 7,957,767 B2 | 6/2011 | Rofougaran |
| 7,959,519 B2 | 6/2011 | Zielke et al. |
| 7,959,523 B2 | 6/2011 | Rae et al. |
| 7,967,699 B2 | 6/2011 | Soracco |
| 7,978,081 B2 | 7/2011 | Shears et al. |
| 7,988,565 B2 | 8/2011 | Abe |
| 7,993,211 B2 | 8/2011 | Bardha |
| 7,993,213 B1 | 8/2011 | D'Eath |
| 7,997,999 B2 | 8/2011 | Roach et al. |
| 8,007,371 B2 | 8/2011 | Breier et al. |
| 8,012,041 B2 | 9/2011 | Gibbs et al. |
| 8,016,694 B2 | 9/2011 | Llewellyn et al. |
| 8,025,586 B2 | 9/2011 | Teramoto |
| 8,043,166 B2 | 10/2011 | Cackett et al. |
| 8,052,539 B2 | 11/2011 | Kimber |
| 8,070,622 B2 | 12/2011 | Schmidt |
| 8,074,495 B2 | 12/2011 | Kostuj |
| 8,092,316 B2 | 1/2012 | Breier et al. |
| 8,100,779 B2 | 1/2012 | Solheim et al. |
| 8,105,175 B2 | 1/2012 | Breier et al. |
| 8,117,903 B2 | 2/2012 | Golden et al. |
| 8,172,697 B2 | 5/2012 | Cackett et al. |
| 8,177,661 B2 | 5/2012 | Beach et al. |
| 8,177,664 B2 | 5/2012 | Horii et al. |
| 8,182,364 B2 | 5/2012 | Cole et al. |
| 8,187,116 B2 | 5/2012 | Boyd et al. |
| 8,206,241 B2 | 6/2012 | Boyd et al. |
| 8,226,495 B2 | 7/2012 | Savarese et al. |
| 8,235,841 B2 | 8/2012 | Stites et al. |
| 8,235,844 B2 | 8/2012 | Albertsen et al. |
| 8,241,143 B2 | 8/2012 | Albertsen et al. |
| 8,241,144 B2 | 8/2012 | Albertsen et al. |
| 8,251,834 B2 | 8/2012 | Curtis et al. |
| 8,251,836 B2 | 8/2012 | Brandt |
| 8,257,195 B1 | 9/2012 | Erickson |
| 8,257,196 B1 | 9/2012 | Abbott et al. |
| 8,272,974 B2 | 9/2012 | Mickelson et al. |
| 8,277,337 B2 | 10/2012 | Shimazaki |
| 8,282,506 B1 | 10/2012 | Holt |
| 8,303,434 B1 | 11/2012 | DePaul |
| 8,308,583 B2 | 11/2012 | Morris et al. |
| 8,328,659 B2 | 12/2012 | Shear |
| 8,330,284 B2 | 12/2012 | Weston et al. |
| 8,337,325 B2 | 12/2012 | Boyd et al. |
| 8,337,335 B2 | 12/2012 | Dugan |
| 8,353,782 B1 | 1/2013 | Beach et al. |
| 8,353,786 B2 | 1/2013 | Beach et al. |
| D675,691 S | 2/2013 | Oldknow et al. |
| D675,692 S | 2/2013 | Oldknow et al. |
| D676,512 S | 2/2013 | Oldknow et al. |
| D676,909 S | 2/2013 | Oldknow et al. |
| D676,913 S | 2/2013 | Oldknow et al. |
| D676,914 S | 2/2013 | Oldknow et al. |
| D676,915 S | 2/2013 | Oldknow et al. |
| 8,382,604 B2 | 2/2013 | Billings |
| D677,353 S | 3/2013 | Oldknow et al. |
| D678,913 S | 3/2013 | Chu |
| D678,964 S | 3/2013 | Oldknow et al. |
| D678,965 S | 3/2013 | Oldknow et al. |
| D678,968 S | 3/2013 | Oldknow et al. |
| D678,969 S | 3/2013 | Oldknow et al. |
| D678,970 S | 3/2013 | Oldknow et al. |
| D678,971 S | 3/2013 | Oldknow et al. |
| D678,972 S | 3/2013 | Oldknow et al. |
| D678,973 S | 3/2013 | Oldknow et al. |
| 8,403,771 B1 | 3/2013 | Rice et al. |

(56) References Cited

U.S. PATENT DOCUMENTS

| | | |
|---|---|---|
| D679,354 S | 4/2013 | Oldknow et al. |
| 8,430,763 B2 | 4/2013 | Beach et al. |
| 8,430,764 B2 | 4/2013 | Bennett et al. |
| 8,435,134 B2 | 5/2013 | Tang et al. |
| 8,435,135 B2 | 5/2013 | Stites et al. |
| 8,491,416 B1 | 7/2013 | Demille et al. |
| 8,517,855 B2 | 8/2013 | Beach et al. |
| 8,517,860 B2 | 8/2013 | Albertsen et al. |
| 8,562,453 B2 | 10/2013 | Sato |
| 8,579,728 B2 | 11/2013 | Morales et al. |
| 8,591,351 B2 | 11/2013 | Albertsen et al. |
| 8,591,352 B2 | 11/2013 | Hirano |
| 8,591,353 B1 | 11/2013 | Honea et al. |
| 8,593,286 B2 | 11/2013 | Razoumov et al. |
| 8,608,587 B2 | 12/2013 | Henrikson et al. |
| D697,152 S | 1/2014 | Harbert et al. |
| 8,628,433 B2 | 1/2014 | Stites et al. |
| 8,632,419 B2 | 1/2014 | Tang et al. |
| 8,641,555 B2 | 2/2014 | Stites et al. |
| 8,663,027 B2 | 3/2014 | Morales et al. |
| 8,690,704 B2 | 4/2014 | Thomas |
| 8,696,450 B2 | 4/2014 | Rose et al. |
| 8,696,491 B1 | 4/2014 | Myers |
| 8,702,531 B2 | 4/2014 | Boyd et al. |
| 8,715,096 B2 | 5/2014 | Cherbini |
| 8,734,265 B2 | 5/2014 | Soracco |
| D707,768 S | 6/2014 | Oldknow et al. |
| D707,769 S | 6/2014 | Oldknow et al. |
| D707,773 S | 6/2014 | Oldknow et al. |
| D708,281 S | 7/2014 | Oldknow et al. |
| D709,575 S | 7/2014 | Oldknow et al. |
| 8,784,228 B2 | 7/2014 | Morin et al. |
| 8,827,831 B2 | 9/2014 | Burnett et al. |
| 8,827,836 B2 | 9/2014 | Thomas |
| 8,834,289 B2 | 9/2014 | de la Cruz et al. |
| 8,834,290 B2 | 9/2014 | Bezilla et al. |
| D714,893 S | 10/2014 | Atwell |
| 8,941,723 B2 | 1/2015 | Bentley et al. |
| D722,122 S | 2/2015 | Greensmith |
| 8,994,826 B2 | 3/2015 | Bentley |
| 2001/0005695 A1 | 6/2001 | Lee et al. |
| 2001/0041628 A1 | 11/2001 | Thorne et al. |
| 2001/0053720 A1 | 12/2001 | Lee et al. |
| 2002/0019265 A1 | 2/2002 | Allen |
| 2002/0052246 A1 | 5/2002 | Burke |
| 2002/0077189 A1 | 6/2002 | Tuer et al. |
| 2002/0107085 A1 | 8/2002 | Lee et al. |
| 2002/0123386 A1 | 9/2002 | Perlmutter |
| 2002/0137576 A1 | 9/2002 | Dammen |
| 2002/0160848 A1 | 10/2002 | Burke |
| 2002/0173364 A1 | 11/2002 | Boscha |
| 2002/0173365 A1 | 11/2002 | Boscha |
| 2002/0183134 A1 | 12/2002 | Allen et al. |
| 2002/0183657 A1 | 12/2002 | Socci et al. |
| 2002/0189356 A1 | 12/2002 | Bissonnette et al. |
| 2003/0009913 A1 | 1/2003 | Potter et al. |
| 2003/0013545 A1 | 1/2003 | Vincent et al. |
| 2003/0040380 A1 | 2/2003 | Wright et al. |
| 2003/0045371 A1 | 3/2003 | Wood |
| 2003/0054900 A1 | 3/2003 | Tindale |
| 2003/0190975 A1 | 10/2003 | Fagot |
| 2003/0207718 A1 | 11/2003 | Perlmutter |
| 2003/0220154 A1 | 11/2003 | Anelli |
| 2004/0009829 A1 | 1/2004 | Kapilow |
| 2004/0018890 A1 | 1/2004 | Stites et al. |
| 2004/0023729 A1 | 2/2004 | Nagai et al. |
| 2004/0106460 A1 | 6/2004 | Lee et al. |
| 2004/0121852 A1 | 6/2004 | Tsurumaki |
| 2004/0142603 A1 | 7/2004 | Walker |
| 2004/0177531 A1 | 9/2004 | Dibenedetto et al. |
| 2004/0180730 A1 | 9/2004 | Franklin et al. |
| 2004/0192463 A1 | 9/2004 | Tsurumaki et al. |
| 2004/0204257 A1 | 10/2004 | Boscha |
| 2004/0219991 A1 | 11/2004 | Suprock et al. |
| 2004/0225199 A1 | 11/2004 | Evanyk et al. |
| 2004/0259651 A1 | 12/2004 | Storek |
| 2005/0009630 A1 | 1/2005 | Chao et al. |
| 2005/0017454 A1 | 1/2005 | Endo et al. |
| 2005/0032582 A1 | 2/2005 | Mahajan et al. |
| 2005/0032586 A1 | 2/2005 | Willett et al. |
| 2005/0037862 A1 | 2/2005 | Hagood et al. |
| 2005/0049075 A1 | 3/2005 | Chen et al. |
| 2005/0054457 A1 | 3/2005 | Eyestone et al. |
| 2005/0070371 A1 | 3/2005 | Chen et al. |
| 2005/0079922 A1 | 4/2005 | Priester |
| 2005/0096151 A1 | 5/2005 | Hou et al. |
| 2005/0101407 A1 | 5/2005 | Hirano |
| 2005/0119068 A1 | 6/2005 | Onoda et al. |
| 2005/0119070 A1 | 6/2005 | Kumamoto |
| 2005/0124435 A1 | 6/2005 | Gambetta et al. |
| 2005/0137024 A1 | 6/2005 | Stites et al. |
| 2005/0192118 A1 | 9/2005 | Rice et al. |
| 2005/0215340 A1 | 9/2005 | Stites et al. |
| 2005/0215350 A1 | 9/2005 | Reyes et al. |
| 2005/0227775 A1 | 10/2005 | Cassady et al. |
| 2005/0227780 A1 | 10/2005 | Cover et al. |
| 2005/0227781 A1 | 10/2005 | Huang et al. |
| 2005/0261073 A1 | 11/2005 | Farrington et al. |
| 2005/0266933 A1 | 12/2005 | Galloway |
| 2005/0288119 A1 | 12/2005 | Wang et al. |
| 2006/0000528 A1 | 1/2006 | Galloway |
| 2006/0019770 A1 | 1/2006 | Meyer et al. |
| 2006/0025229 A1 | 2/2006 | Mahajan et al. |
| 2006/0029916 A1 | 2/2006 | Boscha |
| 2006/0035718 A1 | 2/2006 | Soracco et al. |
| 2006/0040765 A1 | 2/2006 | Sano |
| 2006/0046868 A1 | 3/2006 | Murphy |
| 2006/0052173 A1 | 3/2006 | Telford |
| 2006/0063600 A1 | 3/2006 | Grober |
| 2006/0068932 A1 | 3/2006 | Rice et al. |
| 2006/0073908 A1 | 4/2006 | Tavares et al. |
| 2006/0073910 A1 | 4/2006 | Imamoto et al. |
| 2006/0079349 A1 | 4/2006 | Rae et al. |
| 2006/0084516 A1 | 4/2006 | Eyestone et al. |
| 2006/0084525 A1 | 4/2006 | Imamoto et al. |
| 2006/0090549 A1 | 5/2006 | Kostuj |
| 2006/0094520 A1 | 5/2006 | Kostuj |
| 2006/0094524 A1 | 5/2006 | Kostuj |
| 2006/0094531 A1 | 5/2006 | Bissonnette et al. |
| 2006/0105849 A1 | 5/2006 | Brunner |
| 2006/0105857 A1 | 5/2006 | Stark |
| 2006/0111201 A1 | 5/2006 | Nishio et al. |
| 2006/0122004 A1 | 6/2006 | Chen et al. |
| 2006/0166737 A1 | 7/2006 | Bentley |
| 2006/0166738 A1 | 7/2006 | Eyestone et al. |
| 2006/0183564 A1 | 8/2006 | Park |
| 2006/0184336 A1 | 8/2006 | Kolen |
| 2006/0194644 A1 | 8/2006 | Nishio |
| 2006/0224306 A1 | 10/2006 | Workman et al. |
| 2006/0276256 A1 | 12/2006 | Storek |
| 2006/0281582 A1 | 12/2006 | Sugimoto |
| 2006/0287118 A1 | 12/2006 | Wright et al. |
| 2007/0010341 A1 | 1/2007 | Miettinen et al. |
| 2007/0011919 A1 | 1/2007 | Case |
| 2007/0015601 A1 | 1/2007 | Tsunoda et al. |
| 2007/0021234 A1 | 1/2007 | Tsurumaki et al. |
| 2007/0026961 A1 | 2/2007 | Hou |
| 2007/0049400 A1 | 3/2007 | Imamoto et al. |
| 2007/0049407 A1 | 3/2007 | Tateno et al. |
| 2007/0049417 A1 | 3/2007 | Shear |
| 2007/0111811 A1 | 5/2007 | Grober |
| 2007/0117648 A1 | 5/2007 | Yokota |
| 2007/0149309 A1 | 6/2007 | Ford |
| 2007/0155538 A1 | 7/2007 | Rice et al. |
| 2007/0225085 A1 | 9/2007 | Koide et al. |
| 2007/0238538 A1 | 10/2007 | Priester |
| 2007/0238551 A1 | 10/2007 | Yokota |
| 2007/0270214 A1 | 11/2007 | Bentley |
| 2008/0009360 A1 | 1/2008 | Purtill |
| 2008/0015047 A1 | 1/2008 | Rice et al. |
| 2008/0032817 A1 | 2/2008 | Lo |
| 2008/0039228 A1 | 2/2008 | Breier et al. |
| 2008/0051208 A1 | 2/2008 | Lee et al. |
| 2008/0064523 A1 | 3/2008 | Chen |

(56) References Cited

U.S. PATENT DOCUMENTS

| | | |
|---|---|---|
| 2008/0076580 A1 | 3/2008 | Murdock et al. |
| 2008/0085778 A1 | 4/2008 | Dugan |
| 2008/0125239 A1 | 5/2008 | Clausen et al. |
| 2008/0125244 A1 | 5/2008 | Meyer et al. |
| 2008/0125246 A1 | 5/2008 | Matsunaga |
| 2008/0125288 A1 | 5/2008 | Case |
| 2008/0139339 A1 | 6/2008 | Cheng |
| 2008/0146370 A1 | 6/2008 | Beach et al. |
| 2008/0171610 A1 | 7/2008 | Shin |
| 2008/0182682 A1 | 7/2008 | Rice et al. |
| 2008/0188310 A1 | 8/2008 | Murdock et al. |
| 2008/0200275 A1 | 8/2008 | Wagen et al. |
| 2008/0218343 A1 | 9/2008 | Lee et al. |
| 2008/0242354 A1 | 10/2008 | Rofougaran |
| 2008/0248896 A1 | 10/2008 | Hirano |
| 2008/0287205 A1 | 11/2008 | Katayama |
| 2009/0018795 A1 | 1/2009 | Priester |
| 2009/0048070 A1 | 2/2009 | Vincent et al. |
| 2009/0062032 A1 | 3/2009 | Boyd et al. |
| 2009/0075751 A1 | 3/2009 | Gilbert et al. |
| 2009/0098949 A1 | 4/2009 | Chen |
| 2009/0111602 A1 | 4/2009 | Savarese et al. |
| 2009/0120197 A1 | 5/2009 | Golden et al. |
| 2009/0131190 A1 | 5/2009 | Kimber |
| 2009/0131191 A1 | 5/2009 | Priester et al. |
| 2009/0163285 A1 | 6/2009 | Kwon et al. |
| 2009/0163294 A1 | 6/2009 | Cackett et al. |
| 2009/0165530 A1 | 7/2009 | Golden et al. |
| 2009/0165531 A1 | 7/2009 | Golden et al. |
| 2009/0186717 A1 | 7/2009 | Stites et al. |
| 2009/0203460 A1 | 8/2009 | Clark |
| 2009/0209358 A1 | 8/2009 | Niegowski |
| 2009/0221380 A1 | 9/2009 | Breier et al. |
| 2009/0221381 A1 | 9/2009 | Breier et al. |
| 2009/0247312 A1 | 10/2009 | Sato et al. |
| 2009/0254204 A1 | 10/2009 | Kostuj |
| 2009/0264214 A1 | 10/2009 | De La Cruz et al. |
| 2009/0270743 A1 | 10/2009 | Dugan et al. |
| 2009/0286611 A1 | 11/2009 | Beach et al. |
| 2009/0318245 A1 | 12/2009 | Yim et al. |
| 2010/0016095 A1 | 1/2010 | Burnett et al. |
| 2010/0029402 A1 | 2/2010 | Noble et al. |
| 2010/0035701 A1 | 2/2010 | Kusumoto |
| 2010/0048314 A1 | 2/2010 | Hsu et al. |
| 2010/0049468 A1 | 2/2010 | Papadourakis |
| 2010/0056298 A1 | 3/2010 | Jertson et al. |
| 2010/0067566 A1 | 3/2010 | Rofougaran |
| 2010/0069171 A1 | 3/2010 | Clausen et al. |
| 2010/0093457 A1 | 4/2010 | Ahern et al. |
| 2010/0093458 A1 | 4/2010 | Davenport et al. |
| 2010/0093463 A1 | 4/2010 | Davenport et al. |
| 2010/0099509 A1 | 4/2010 | Ahern et al. |
| 2010/0113174 A1 | 5/2010 | Ahern |
| 2010/0113183 A1 | 5/2010 | Soracco |
| 2010/0113184 A1 | 5/2010 | Kuan et al. |
| 2010/0117837 A1 | 5/2010 | Stirling et al. |
| 2010/0121227 A1 | 5/2010 | Stirling et al. |
| 2010/0121228 A1 | 5/2010 | Stirling et al. |
| 2010/0130298 A1 | 5/2010 | Dugan et al. |
| 2010/0144455 A1 | 6/2010 | Ahern |
| 2010/0144456 A1 | 6/2010 | Ahern |
| 2010/0190573 A1 | 7/2010 | Boyd |
| 2010/0197423 A1 | 8/2010 | Thomas et al. |
| 2010/0197426 A1 | 8/2010 | De La Cruz et al. |
| 2010/0201512 A1 | 8/2010 | Stirling et al. |
| 2010/0210371 A1 | 8/2010 | Sato et al. |
| 2010/0216563 A1 | 8/2010 | Stites et al. |
| 2010/0216564 A1 | 8/2010 | Stites et al. |
| 2010/0216565 A1 | 8/2010 | Stites et al. |
| 2010/0222152 A1 | 9/2010 | Jaekel et al. |
| 2010/0234127 A1 | 9/2010 | Snyder et al. |
| 2010/0255922 A1 | 10/2010 | Lueders |
| 2010/0261546 A1 | 10/2010 | Nicodem |
| 2010/0273569 A1 | 10/2010 | Soracco |
| 2010/0292024 A1 | 11/2010 | Hagood et al. |
| 2010/0304877 A1 | 12/2010 | Iwahashi et al. |
| 2010/0304887 A1 | 12/2010 | Bennett et al. |
| 2010/0308105 A1 | 12/2010 | Savarese et al. |
| 2011/0021284 A1 | 1/2011 | Stites et al. |
| 2011/0028230 A1 | 2/2011 | Balardeta et al. |
| 2011/0053698 A1 | 3/2011 | Stites et al. |
| 2011/0081978 A1 | 4/2011 | Murdock et al. |
| 2011/0082571 A1 | 4/2011 | Murdock et al. |
| 2011/0087344 A1 | 4/2011 | Murdock et al. |
| 2011/0092260 A1 | 4/2011 | Murdock et al. |
| 2011/0092310 A1 | 4/2011 | Breier et al. |
| 2011/0098127 A1 | 4/2011 | Yamamoto |
| 2011/0098128 A1 | 4/2011 | Clausen et al. |
| 2011/0118051 A1 | 5/2011 | Thomas |
| 2011/0130223 A1 | 6/2011 | Murdock et al. |
| 2011/0151977 A1 | 6/2011 | Murdock et al. |
| 2011/0152001 A1 | 6/2011 | Hirano |
| 2011/0195798 A1 | 8/2011 | Sander et al. |
| 2011/0212757 A1 | 9/2011 | Murdock et al. |
| 2011/0217757 A1 | 9/2011 | Chaplin et al. |
| 2011/0218053 A1 | 9/2011 | Tang et al. |
| 2011/0224011 A1 | 9/2011 | Balardeta et al. |
| 2011/0224025 A1 | 9/2011 | Balardeta et al. |
| 2011/0256951 A1 | 10/2011 | Soracco et al. |
| 2011/0256954 A1 | 10/2011 | Soracco |
| 2011/0281621 A1 | 11/2011 | Murdock et al. |
| 2011/0294599 A1 | 12/2011 | Albertsen et al. |
| 2012/0019140 A1 | 1/2012 | Maxik et al. |
| 2012/0052972 A1 | 3/2012 | Bentley |
| 2012/0077615 A1 | 3/2012 | Schmidt |
| 2012/0083362 A1 | 4/2012 | Albertsen et al. |
| 2012/0083363 A1 | 4/2012 | Albertsen et al. |
| 2012/0120572 A1 | 5/2012 | Bentley |
| 2012/0122601 A1 | 5/2012 | Beach et al. |
| 2012/0142447 A1 | 6/2012 | Boyd et al. |
| 2012/0142452 A1 | 6/2012 | Burnett et al. |
| 2012/0165110 A1 | 6/2012 | Cheng |
| 2012/0165111 A1 | 6/2012 | Cheng |
| 2012/0184393 A1 | 7/2012 | Franklin |
| 2012/0191405 A1 | 7/2012 | Molyneux et al. |
| 2012/0196701 A1 | 8/2012 | Stites et al. |
| 2012/0202615 A1 | 8/2012 | Beach et al. |
| 2012/0289354 A1 | 11/2012 | Cottam et al. |
| 2012/0302366 A1 | 11/2012 | Murphy |
| 2013/0041590 A1 | 2/2013 | Burich et al. |
| 2013/0065705 A1 | 3/2013 | Morales et al. |
| 2013/0065711 A1 | 3/2013 | Ueda et al. |
| 2013/0102410 A1 | 4/2013 | Stites et al. |
| 2013/0260922 A1 | 10/2013 | Yontz et al. |
| 2014/0018184 A1 | 1/2014 | Bezilla et al. |
| 2014/0080629 A1 | 3/2014 | Sargent et al. |
| 2014/0228649 A1 | 8/2014 | Rayner et al. |
| 2014/0364246 A1 | 12/2014 | Davenport |

FOREIGN PATENT DOCUMENTS

| | | |
|---|---|---|
| CN | 2431912 Y | 5/2001 |
| CN | 1602981 A | 4/2005 |
| CN | 1984698 A | 6/2007 |
| CN | 101352609 A | 1/2009 |
| CN | 101927084 A | 12/2010 |
| DE | 202007013632 U1 | 12/2007 |
| EP | 2332619 A1 | 6/2011 |
| EP | 2377586 A2 | 10/2011 |
| FR | 2672226 A1 | 8/1992 |
| FR | 2717701 A1 | 9/1995 |
| FR | 2717702 A1 | 9/1995 |
| GB | 2280380 A | 2/1995 |
| GB | 2388792 A | 11/2003 |
| GB | 2422554 A | 8/2006 |
| JP | S5163452 U | 5/1976 |
| JP | H05317465 A | 12/1993 |
| JP | H06237 | 1/1994 |
| JP | H06114127 A | 4/1994 |
| JP | H0639036U U | 6/1994 |
| JP | 07-255886 A | 10/1995 |
| JP | H07275407 A | 10/1995 |
| JP | H07284546 A | 10/1995 |
| JP | H08000785 | 1/1996 |

(56) References Cited

FOREIGN PATENT DOCUMENTS

| | | |
|---|---|---|
| JP | H08131599 A | 5/1996 |
| JP | H08141117 A | 6/1996 |
| JP | H0947528 A | 2/1997 |
| JP | H9-135932 | 5/1997 |
| JP | H8-243195 | 7/1997 |
| JP | H9-239074 | 9/1997 |
| JP | H9-239075 | 9/1997 |
| JP | H9-299521 | 11/1997 |
| JP | H10277180 A | 10/1998 |
| JP | 10305119 | 11/1998 |
| JP | H1157082 A | 3/1999 |
| JP | H11169493 A | 6/1999 |
| JP | H11244431 A | 9/1999 |
| JP | 2980002 B2 | 11/1999 |
| JP | 11299938 | 11/1999 |
| JP | 2000-126340 A | 5/2000 |
| JP | 11114102 | 6/2000 |
| JP | 2000176056 A | 6/2000 |
| JP | 2000197718 | 7/2000 |
| JP | 2000271253 A | 10/2000 |
| JP | 2001009069 | 1/2001 |
| JP | 2001054596 A | 2/2001 |
| JP | 2001058015 | 3/2001 |
| JP | 2001062004 | 3/2001 |
| JP | 2001137396 | 5/2001 |
| JP | 2001145712 | 5/2001 |
| JP | 2001-293113 A | 10/2001 |
| JP | 3216041 B2 | 10/2001 |
| JP | 2002017908 A | 1/2002 |
| JP | 2002017912 A | 1/2002 |
| JP | 2002052099 | 2/2002 |
| JP | 2002165905 A | 6/2002 |
| JP | 2002177416 A | 6/2002 |
| JP | 2002239040 A | 8/2002 |
| JP | 2002248183 A | 9/2002 |
| JP | 2002306646 | 10/2002 |
| JP | 2002306647 A | 10/2002 |
| JP | 2002320692 | 11/2002 |
| JP | 2003000774 | 1/2003 |
| JP | 2003079769 | 3/2003 |
| JP | 2003093554 A | 4/2003 |
| JP | 2003180887 A | 7/2003 |
| JP | 2003210627 | 7/2003 |
| JP | 2004174224 A | 6/2004 |
| JP | 2004216131 A | 8/2004 |
| JP | 2004313762 | 11/2004 |
| JP | 2004329544 | 11/2004 |
| JP | 2004351173 | 12/2004 |
| JP | 2005013529 A | 1/2005 |
| JP | 2005131280 A | 5/2005 |
| JP | 2005193069 | 7/2005 |
| JP | 2005253973 A | 9/2005 |
| JP | 2005305178 A | 11/2005 |
| JP | 2006000435 A | 1/2006 |
| JP | 2006020817 A | 1/2006 |
| JP | 2006175135 A | 7/2006 |
| JP | 2006198251 A | 8/2006 |
| JP | 2006223701 A | 8/2006 |
| JP | 2007209722 A | 8/2007 |
| JP | 2007530151 A | 11/2007 |
| JP | 2008036050 A | 2/2008 |
| JP | 2008036315 A | 2/2008 |
| JP | 2008506421 A | 3/2008 |
| JP | 2008073210 A | 4/2008 |
| JP | 2008515560 A | 5/2008 |
| JP | 2008237689 A | 10/2008 |
| JP | 2008289866 A | 12/2008 |
| JP | 2009201744 A | 9/2009 |
| JP | 2009534546 A | 9/2009 |
| JP | 2010148652 A | 7/2010 |
| JP | 2010148653 A | 7/2010 |
| JP | 2010154875 | 7/2010 |
| JP | 2010154887 A | 7/2010 |
| JP | 2010279847 A | 12/2010 |
| JP | 2011024999 A | 2/2011 |
| KR | 1020060114969 | 11/2006 |
| KR | 20090129246 A | 12/2009 |
| TW | 498774 U | 8/2002 |
| TW | 1292575 | 1/2008 |
| TW | 1309777 | 5/2009 |
| WO | 9920358 A1 | 4/1999 |
| WO | 0149376 A1 | 7/2001 |
| WO | 0215993 | 2/2002 |
| WO | 2004056425 | 8/2004 |
| WO | 2005005842 A1 | 1/2005 |
| WO | 2005035073 A1 | 4/2005 |
| WO | 2005058427 A2 | 6/2005 |
| WO | 2005079933 A1 | 9/2005 |
| WO | 2005094953 | 10/2005 |
| WO | 2005118086 | 12/2005 |
| WO | 2006073930 A2 | 7/2006 |
| WO | 2007123970 A2 | 11/2007 |
| WO | 2008093710 A1 | 8/2008 |
| WO | 2008157691 A2 | 12/2008 |
| WO | 2009035345 A1 | 3/2009 |
| WO | 2009091636 A1 | 7/2009 |
| WO | 2010090814 A1 | 8/2010 |
| WO | 2012027726 | 3/2012 |
| WO | 2012149385 A1 | 11/2012 |

OTHER PUBLICATIONS

International Search Report in related International Application No. PCT/US2012/03542; dated Sep. 10, 2012.
Office Action dated Feb. 8, 2013 for U.S. Appl. No. 13/250,051.
Office Action dated Jun. 17, 2013 for U.S. Appl. No. 13/250,051.
International Search Report and Written Opinion recevied in corresponding PCT Application No. PCT/US2010/021355 issued on Jul. 7, 2010.
Partial Search Report received in corresponding PCT Application No. PCT/US2010/021355 issued on Apr. 12, 2010.
International Search Report and Written Opinion issued Sep. 9, 2011 in corresponding PCT Application No. PCT/US2011/023678.
PCT/US2013/025615, International Search Report and Written Opinion mailed Aug. 14, 2013.
United States Golf Association; Procedure For Measuring The Flexibility Of A Golf Clubhead, USGA-TPX3004; Revision 1.0.0; May 1, 2008; p. 1-11.
International Search Report received in PCT Patent Application No. PCT/US2013/043700 dated Jul. 31, 2013.
Japan Office Action Dated Jan. 20, 2014 for Japan App. No. 2013-500052.
International Search Report in International Application No. PCT/US2013/043656; dated Aug. 2, 2013.
Written Opinion issued Jul. 31, 2013 in corresponding PCT Application No. PCT/U52013/043700.
Feb. 4, 2015—(JP) Office Action—App. 2014-508612.
Feb. 25, 2015—(JP) Office Action, App. No. 2014-508129.
Mar. 13, 2015—(CN) Office Action—App. 201280032121.3.
Mar. 19, 2015—(CN) Office Action—App. 201280032016.X.
Mar. 16, 2015—(JP) Office Action—App. 2014-508605.
Mar. 20, 2015—(CN) Office Action—App. 201280032229.2.
"Photographs 1, 2 and 3", presented in parent U.S. Appl. No. 12/842,650, of unknown soure, taken after the filed of the parent application, depicting a golf club product; presented to the Patent Office for consideration on Oct. 7, 2011.
Jan. 22, 2009—(WO) Partial International Search Report and Written Opinion—App. PCT/US2008/067499.
May 19, 2009—(WO) International Search Report and Written Opinion App. No. PCT/US2008/067499.
Jan. 7, 2010—(WO) International Preliminary Report on Patentability App. PCT/US2008/067499.
Nov. 26, 2010—(WO) International Search Report and Written Opinion App. No. PCT/US2010/043073.
Nov. 5, 2010—(WO) International Search Report & Written Opinion, App. No. PCT/US2009/064164.
May 6, 2011—(WO) International Search Report and Written Opinion—App. PCT/US2011/023968.
Dec. 18, 2012—(WO) International Search Report and Written Opinion App. No. PCT/US2012/057490.

(56) References Cited

OTHER PUBLICATIONS

May 30, 2012—(WO) International Search Report and Written Opinion App. No. PCT/US2012/022027.
Nov. 30, 2012—(WO) International Search Report and Written Opinion App. PCT/US2012/052107.
Apr. 12, 2013—(EP) Communication Pursuant to Article 94(3), App. No. 10700927.6.
Aug. 7, 2013—(TW) Search Report with English Translation, App. No. 100104424.
Aug. 8, 2013—(WO) International Preliminary Report on Patentability App. No. PCT/US2012/022027.
Dec. 4, 2013—(EP) Office Action—App. 10700927.6, pp. 1-5.
Dec. 9, 2013—(EP) Communication from European Patent Office, App. No. 09756099.9.
Feb. 20, 2013—(CN) Office Action, App. No. CN200980146633.0.
Feb. 27, 2013—(WO) International Search Report and Written Opinion—App. PCT/US2012/067050.
Jun. 19, 2013—(JP) Notice of Reasons for Rejection (with English translation) App. No. 2011-537510.
Mar. 1, 2013—(JP) Third-Party Submission of Information, App. No. 2011-537510.
Nov. 6, 2013—(WO) Partial Search Report, App. No. PCT/US2013/043641.
Sep. 2, 2013—(JP) Notice of Reasons for Rejection (with English translation) App. No. 2012-521833.
Dec. 16, 2014—(KR) Office Action—App. 10-2013-7030795.
Dec. 16, 2014—(KR) Office Action—App. 10-2013-7030898.
Dec. 16, 2014—(KR) Office Action—App. 10-2013-7030950.
Dec. 16, 2014—(KR) Office Action—App. 10-2013-7030958.
Mar. 20, 2014—(WO) International Search Report and Written Opinion App. No. PCT/US2013/043641.
Mar. 24, 2014—(WO) International Search Report and Written Opinion—App. PCT/US2013/061812.
Sep. 4, 2014—(WO) International Search Report and Written Opinion—App. PCT/US2014/029044.
Mar. 12, 2015—(JP) Office Action—App. 2014-508604.
Feb. 10, 2015—(CN) Office Action—App. 201280032219.9.

* cited by examiner

GOLF CLUBS AND GOLF CLUB HEADS

CROSS-REFERENCE TO RELATED APPLICATION

This application is a non-provisional application which claims priority to U.S. Provisional Application Ser. No. 61/480,322, filed Apr. 28, 2011, the disclosure of which is hereby incorporated by reference in its entirety.

FIELD OF THE DISCLOSURE

The present disclosure relates to golf clubs and golf club heads. Particular example aspects of this disclosure relate to the golf clubs and golf club heads which may include monitoring devices for monitoring aspects of a golfer's swing or overall golf game.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

Being the sole instrument that sets a golf ball in motion during play, golf clubs also have been the subject of much technological research and advancement in recent years. For example, the market has seen dramatic changes and improvements in putter designs, golf club head designs, shafts, and grips in recent years. Additionally, other technological advancements have been made in an effort to better match the various elements and/or characteristics of the golf club and characteristics of a golf ball to a particular user's swing features or characteristics (e.g., club fitting technology, ball launch angle measurement technology, ball spin rates, etc.). Further technological advancement in golf club design has also involved the incorporation of various types of monitoring devices or sensors in the golf club. Many such designs, however, have been cumbersome and unreliable. In addition, further processing of the data recorded by the sensors has been limited or not performed in a suitable manner to be most useful to golfers.

While the industry has witnessed dramatic changes and improvements to golf equipment in recent years, there is room in the art for further advances in golf club technology. Thus, while golf equipment according to the prior art provide a number of advantageous features, they nevertheless have certain limitations. The present invention seeks to overcome certain of these limitations and other drawbacks of the prior art, and to provide new features not heretofore available.

SUMMARY OF THE DISCLOSURE

The following presents a general summary of aspects of the disclosure in order to provide a basic understanding of the disclosure and various aspects of it. This summary is not intended to limit the scope of the disclosure in any way, but it simply provides a general overview and context for the more detailed description that follows.

It would be advantageous to have the ability to monitor and analyze aspects of a golfer's golf game, such as a golfer's golf swing. For example, it would be beneficial to be able to monitor and analyze golf swings a golfer takes during practice (such as in a teaching facility or on a driving range) or golf swings a golfer takes while actually playing a round of golf on a golf course. Therefore, particular aspects of the disclosure are directed to a golf club which includes a monitoring device.

According to aspects of the disclosure, golf clubs may include a golf club head and a shaft configured to engage with the golf club head which includes a grip engaged with the shaft. The golf club may include a monitoring device, which may include a sensor and a transmitter. Additionally, the monitoring device may be configured to determine data related to the characteristics of a golf swing. Further, the monitoring device may be configured to transmit the data related to the characteristics of a golf swing to a remote computer.

According to aspects of the disclosure, the monitoring device may include one or more sensors for monitoring data related to aspects of a golfer's golf game (such as the golfer's golf swing) and a transmitter/transceiver configured to transmit such data. According to aspects of the disclosure, the transmitted data may be analyzed (as will be described in below) and used to aid a golfer in improving the golfer's abilities (e.g., the golfer's golf swing). It is noted that according to particular example aspects of the disclosure, other data (e.g., particular club data, on-course data (such as particular golf swings and the approximate location where the swings were taken on a golf course) may be monitored, transmitted and coordinated with the data regarding the aspects of a golfer's golf game (such as the golfer's golf swing) and analyzed as well. Further aspects of the disclosure may include sensing impact location on the golf club face upon a golfer impacting a golf ball during a golf swing. Communication of sensed data may be transmitted, wirelessly or via other means, to a remote location for further processing and display to the golfer.

BRIEF DESCRIPTION OF THE DRAWINGS

The present disclosure is illustrated by way of example and not limited in the accompanying figures, in which like reference numerals indicate similar elements throughout, and in which.

Figure 1:
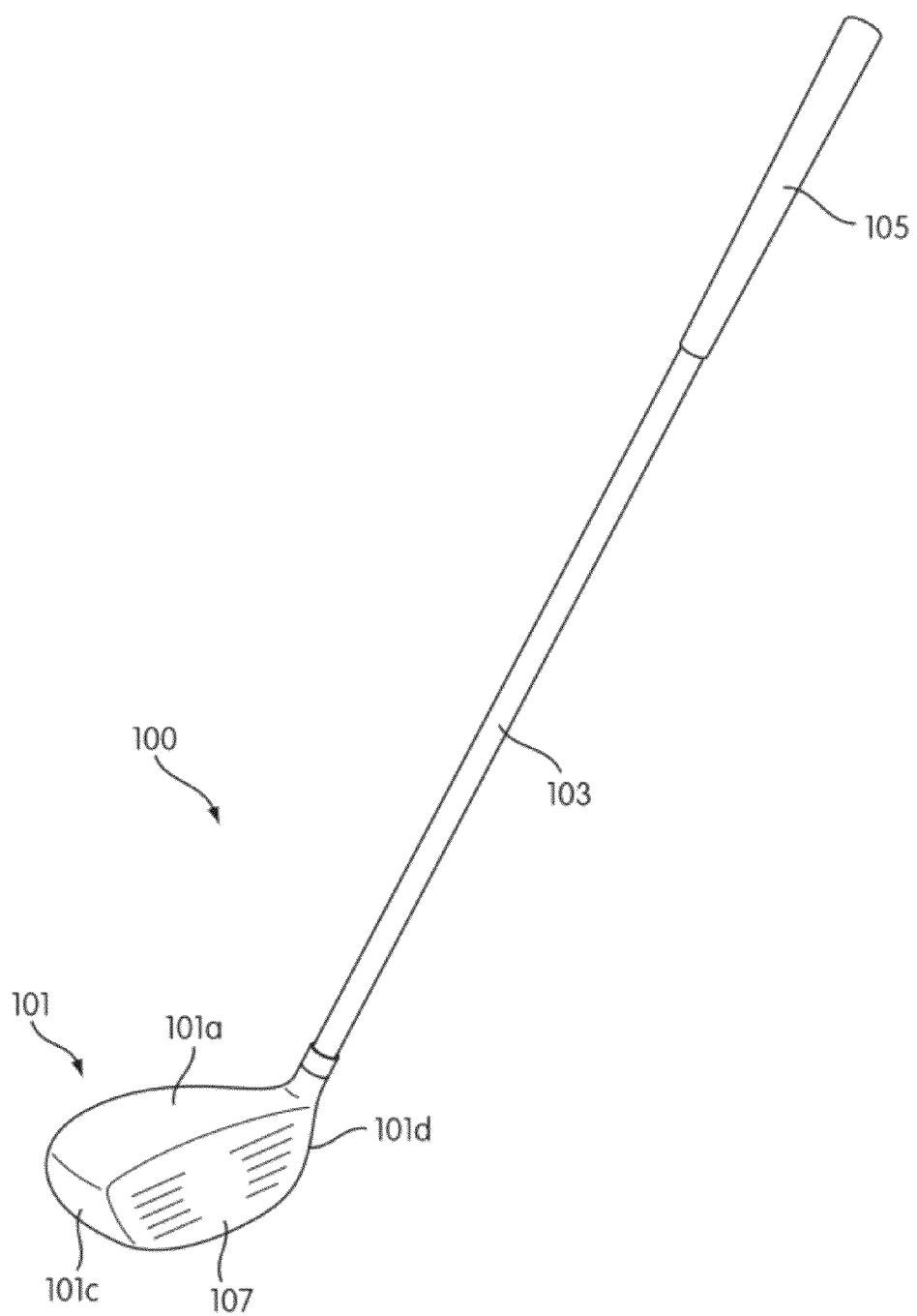
FIG. 1 is an illustrative embodiment of a wood-type golf club structure according to aspects of the disclosure.

The reader is advised that the various parts shown in these drawings are not necessarily drawn to scale.

DETAILED DESCRIPTION

The following description and the accompanying figures disclose features of golf club heads and golf clubs in accordance with examples of the present disclosure.

I. General Description of Example Golf Club Heads, Golf Clubs, and Methods in Accordance with this Disclosure Aspects of this disclosure relate to golf club heads and golf clubs. Golf club heads according to at least some example aspects of this disclosure may include: (a) a golf club head body; and (b) a removable section or member which may include a monitoring device. Golf club heads according to at least some example aspects of this disclosure may also include: (c) one or more sensors and (d) a transmitter for transmitting data obtained by the one or more sensors. For example, the one or more sensors and the transmitter may be included in the monitoring device. According to some aspects of the disclosure, the golf club head may be configured to receive the removable section. Further, according to some aspects of the disclosure the golf club head may be configured to receive the monitoring device directly, without a removable section. Further, golf club heads of at least some example aspects of this disclosure may include wood-type golf club heads, iron-type golf club heads and putter type golf club heads.

Aspects of this disclosure also relate to golf club shafts and golf club grips. Golf club shafts according to at least some example aspects of this disclosure may include: (a) a grip portion; and (b) a removable section which may include a monitoring device. The monitoring device according to at least some example aspects of this disclosure may also include: (c) one or more sensors and (d) a transmitter for transmitting data obtained by the one or more sensors. According to some aspects of the disclosure, the grip portion or other portion of the shaft may be configured to receive the removable section. Further, according to some aspects of the disclosure the golf club shaft (e.g., the grip portion) may be configured to receive the monitoring device directly, without a removable section. Golf club shafts of at least some example aspects of this disclosure may include metal shafts, carbon fiber shafts, etc. and be directed to wood-type golf clubs, iron-type golf clubs and putter type golf clubs.

Additional aspects of this disclosure relate to golf club structures that include golf club heads or golf club shafts, e.g., of the types described above. Such golf club structures further may include one or more of: a shaft attached to the golf club head (optionally via a shaft engaging member (e.g., a hosel) or directly inserted otherwise engaged with the shaft); a grip or handle attached to the shaft; etc.

Still additional aspects of this disclosure relate to methods for producing golf club heads and golf club structures in accordance with examples of this disclosure. Such methods may include, for example, one or more of the following steps in any desired order and/or combinations: (a) providing a golf club head of the various types described above (including any or all of the various structures, features, and/or arrangements described above), e.g., by manufacturing or otherwise constructing the golf club head body, by obtaining it from a third party source, etc.; (b) engaging a shaft of the various types described above (including any or all of the various structures, features, and/or arrangements described above) with the golf club head; and (c) engaging a grip of the various types described above (including any or all of the various structures, features, and/or arrangements described above) with the shaft.

Given the general description of various example aspects of the disclosure provided above, more detailed descriptions of various specific examples of golf clubs and golf club head structures according to the disclosure are provided below.

II. Detailed Description of Example Golf Club Heads, Golf Club Structures, and Methods According to the Disclosure As discussed above, it would be advantageous to have the ability to monitor and analyze aspects of a golfer's golf game, such as a golfer's golf swing. Therefore, particular aspects of the disclosure are directed to a golf club which includes a monitoring device. According to aspects of the disclosure, the monitoring device may include one or more sensors for monitoring data related to aspects of a golfer's golf game (such as the golfer's golf swing) and a transmitter configured to transmit such data. It is further understood that the data may be further processed if necessary or desired. According to aspects of the disclosure, the transmitted data may be analyzed (as will be described in below) and used to aid a golfer in improving the golfer's abilities (e.g., the golfer's golf swing). It is noted that in according to particular example aspects of the disclosure, other data (e.g., particular club data, on the course data (such as particular golf swings and the approximate location where the swings were taken on a golf course) may be monitored, transmitted and analyzed as well.

Further, it would also be beneficial to configure the golf club such that the monitoring device is able to be removable from the golf club. For example, if a golfer wanted to use the monitoring device during practice (e.g., on a driving range) and did not want to use it during play on a golf course, it would be beneficial to have a golf club configured to allow the monitoring device to be easily engageable with, and removable from, the golf club in order to allow the golfer to selectively configure the golf club to their particular preference at a given time. If the golfer did not wish to use the monitoring device during an actual round of golf, the cartridge with monitoring device could be removed from the club and replaced with a replacement member without a monitoring device wherein the monitoring device had characteristics such as weighting and aerodynamic features so as to not change the overall characteristics of the golf club from when the monitoring device was installed on the golf club.

Therefore, aspects of the disclosure are directed to a golf club which is configured to receive and secure the monitoring device, and is also configured to release the monitoring device. For example, aspects of the disclosure relate to a golf club which includes a golf club head which is configured to receive and secure the monitoring device in the golf club head. Further, example embodiments of the disclosure relate to golf club heads configured to receive and secure a removable section or a cartridge (e.g., a cartridge containing the monitoring device). Other aspects of the disclosure relate to a golf club which includes a golf club shaft which is configured to receive and secure the monitoring device in the golf club shaft. For example, the grip of the golf club shaft may be configured to receive and secure the monitoring device in the grip of the golf club shaft. Further, example embodiments of the disclosure relate to a golf club shaft configured to receive and secure a removable section or a cartridge (e.g., a cartridge containing the monitoring device).

The following discussion and accompanying figures describe various example golf clubs and golf club head structures in accordance with the present disclosure. When the same reference number appears in more than one drawing, that reference number is used consistently in this specification and the drawings to refer to the same or similar parts throughout.

More specific examples and features of golf club heads and golf club structures according to this disclosure will be described in detail below in conjunction with the example golf club structures illustrated in FIGS. 1-18.

FIG. 1 generally illustrates an example of a wood-type golf club 100 according to aspects of the disclosure. As seen in FIG. 1, the wood-type golf club may include a wood-type golf club head 101 in accordance with the present disclosure.

In addition to the golf club head 101, the overall golf club structure 100 may include a shaft 103 and a grip or handle 105 attached to the shaft 103. The shaft 103 may be received in, engaged with, and/or attached to the golf club head 101 in any suitable or desired manner, including in conventional manners known and used in the art, without departing from the disclosure. As more specific examples, the shaft 103 may be engaged with the golf club head 101 through a shaft-receiving sleeve or element extending into the club head 101 (e.g., a hosel), and/or directly to the club head structure 101, e.g., via adhesives, cements, welding, soldering, mechanical connectors (such as threads, retaining elements, or the like). If desired, the shaft 103 may be connected to the golf club head 101 in a releasable manner using mechanical connectors to allow easy interchange of one shaft for another on the head. The shaft 103 may be made from any suitable or desired materials, including conventional materials known and used in the art, such as graphite based materials, composite or other non-metal materials, steel materials (including stainless steel), aluminum materials, other metal alloy materials, polymeric materials, combinations of various materials, and the like.

The grip or handle 105 may be attached to, engaged with, and/or extend from the shaft 103 in any suitable or desired manner, including in conventional manners known and used in the art, e.g., using adhesives or cements, etc. As another example, if desired, the grip or handle 105 may be integrally formed as a unitary, one-piece construction with the shaft 103. Additionally, any desired grip or handle materials may be used without departing from this disclosure, including, for example: rubber materials, leather materials, rubber or other materials including cord or other fabric material embedded therein, polymeric materials, and the like.

Further, according to aspects of the disclosure, the golf club 100 may include a hosel. According to aspects of the disclosure, the shaft 103 may be received in and/or inserted into and/or through the hosel. If desired, the hosel may be configured such that the shaft 103 may be engaged with the hosel in a releasable manner using mechanical connectors to allow easy interchange of one shaft for another on the head. For example, threads, locking mechanisms, etc. may be incorporated into the hosel and the end of the shaft 103 that is to be engaged with the hosel may be configured with a corresponding configuration. Also, the shaft 103 may be secured to the hosel via bonding with adhesives or cements, welding (e.g., laser welding), soldering, brazing, or other fusing techniques, etc. Further, optionally, if desired, the hosel may be eliminated and the shaft 103 may be directly attached to the golf club head 101. For example, the shaft 103 may be directly engaged with the golf club head 101 (e.g., by bonding with adhesives or cements, welding (e.g., laser welding), soldering, brazing, or other fusing techniques, etc.).

According to aspects of the disclosure, the golf club head 101 may include a ball striking face (e.g., a ball striking face which includes a face plate) 107. The ball striking face 107 may be provided integrally with the golf club head 101. Also, the ball striking face 107 may include a separate element, such as a face plate, which is configured to be engaged with the golf club head. For example, the golf club head may include a structure, such as a recess, notch or other configuration for receiving the face plate. The face plate may be engaged with the golf club head in a variety of ways. For example, the face plate may be engaged with the golf club head by press fitting, bonding with adhesives or cements, welding (e.g., laser welding), soldering, brazing, or other fusing techniques, mechanical connectors, etc.

The ball striking face 107 may be comprised of one or more materials. The material(s) of the ball striking face should be relatively durable to withstand the repeated impacts with the golf ball. For example, the ball striking face 107 may comprise a high strength steel. Further, other materials, such as titanium or other metals or alloys may be used as well. Further, the ball striking face 107 may include one or more score lines which extend generally horizontally across the ball striking face 107.

According to aspects of the disclosure, the golf club head may include a crown 101a, a sole 101b, a toe 01c, and a heel 101d. Further, the golf club head 101 may be constructed in any suitable or desired manner and/or from any suitable or desired materials without departing from this disclosure, including from conventional materials and/or in conventional manners known and used in the art. In fact, it is noted that wide varieties of overall club head constructions are possible without departing from this disclosure. For example, if desired, some or all of the various individual parts of the club head body described above may be made from multiple pieces that are connected together (e.g., by adhesives or cements; by welding, soldering, brazing, or other fusing techniques; by mechanical connectors; etc.). The various parts (e.g., crown, sole, face, etc.) may be made from any desired materials and combinations of different materials, including materials that are conventionally known and used in the art, such as metal materials, including lightweight metal materials (e.g., titanium, titanium alloys, aluminum, aluminum alloys, magnesium, magnesium alloys, etc.), composite materials, polymer materials, etc. The club head 101 and/or its various parts may be made by forging, casting, molding, machining, and/or using other techniques and processes, including techniques and processes that are conventional and known in the art.

It is noted that a wide variety of overall club head constructions are possible without departing from this disclosure. For example, it is noted that the dimensions and/or other characteristics of the golf club head 101 according to examples of this disclosure may vary significantly without departing from the disclosure. For example, the above described features and configurations may be incorporated into any wood-type club heads including, for example: wood-type hybrid clubs, fairway woods, drivers, etc.

Figure 2:
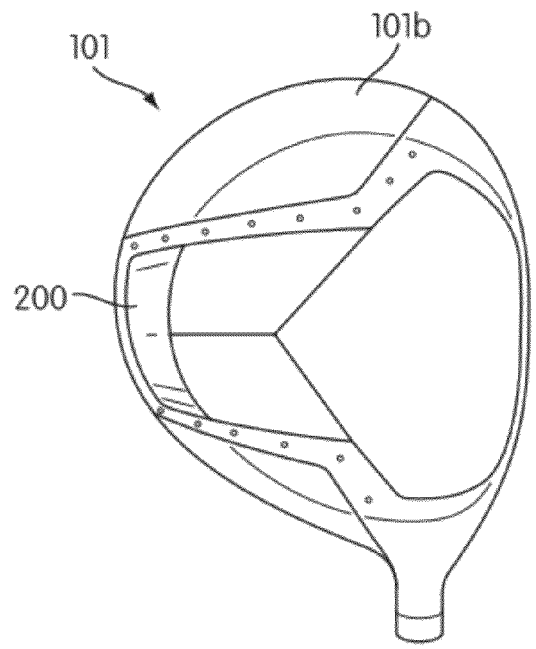
FIG. 2 is an enlarged bottom view of the wood-type golf club head shown in FIG. 1.
Figure 3:
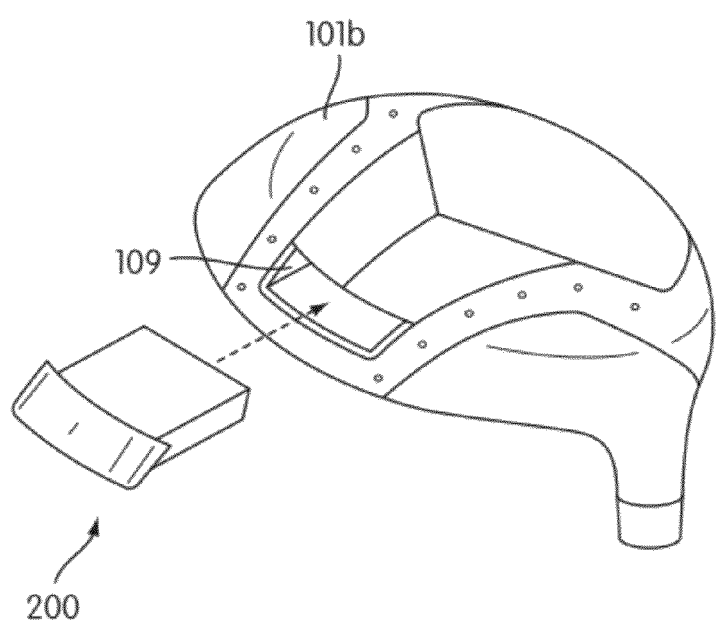
FIG. 3 is an exploded view of the wood-type golf club head shown in FIG. 2 and showing a monitoring device.

The depicted golf club 100 is an illustrative embodiment of a golf club which includes aspects of the disclosure. As seen in FIGS. 2 and 3, the golf club head 101 may include a port 109 configured to receive a section, member or cartridge, 200. The cartridge 200 may be configured to house the monitoring device 201. The monitoring device 201 may be configured to house at least one sensor 202 (FIG. 4) for determining various aspects of a golf swing. Further, if desired, the monitoring device 201 may be configured to house a transmitter 203 (or a transceiver). Such features of the golf club 100 will be described in detail below.

As seen in FIG. 3, the cartridge 200 may be configured to engage with the port 109 of the golf club head 100. For example, the cartridge 200 may be sized to directly engage with interior walls of the port 109, such that the cartridge 200 is firmly secured within the golf club head 101.

According to example embodiments of the disclosure, the cartridge 200 may be configured such that when the cartridge 200 is engaged with the port 109, the cartridge 200 becomes an exterior surface of the golf club head 101. For example, the cartridge 200 may be configured with a first portion (e.g., an exterior portion) 200a which is shaped so as to not protrude from the golf club head 101 and, instead, to fit seamlessly, or relatively seamlessly, with the exterior of the golf club head 101, once the cartridge 200 is engaged with the golf club head 101. For example, the first portion 200a of the golf club head 101 may form an exterior portion of the rear of the golf club head 101. Further, the first portion 200a of the golf club head 101 may form an exterior portion of crown 101a, sole 101b, toe 101c, heel 101d, etc. of the golf club head 101 or some combination thereof (e.g., the exterior of a rear portion and a sole portion of the golf club head 101), and depending on the location of the port 109. In such a configuration, wherein the first portion 200a, fits seamlessly, or relatively seamlessly, with the exterior of the golf club head 101, the aerodynamics of the golf club head 101 will be improved as compared with a golf club head wherein a sensor or transmitter protrudes beyond the surface of the exterior of the golf club head 101.

Further, according to example aspects of the disclosure, the cartridge 200 may include a second portion (e.g., an insert portion) 200b which is configured to be inserted into the interior of the port 109 of the golf club head 101. The second portion 200b may be configured to house a monitoring device 201 which, in turn, houses the at least one sensor 202 and the transmitter 203. As seen in the depicted embodiment, the monitoring device 201 may be secured within the second portion 200b such that the sensor 202 and the transmitter 203 are stationary with regard to the second portion 200b. In such a configuration wherein the sensor 202 and the transmitter 203 are held stationary with the second portion 200b and the second portion 200b is housed within the interior of the golf club head 101, the sensor 202 and transmitter 203 are relatively well protected (e.g., from the elements (water and other environmental conditions) encountered during use and from potential impacts the golf club head incurs during use of the golf club 100 or during typical storage or transport of the golf club 100 (e.g., in a golf bag).

According to aspects of the disclosure, the cartridge 200 may be made from any desired materials and combinations of different materials, including materials that are conventionally known and used in the art, such as metal materials, including lightweight metal materials (e.g., titanium, titanium alloys, aluminum, aluminum alloys, magnesium, magnesium alloys, etc.), composite materials, polymer materials, etc. For example, according to aspects of the disclosure, the first portion 200a of the cartridge 200 may be made from the same material from which the exterior of the golf club head 101 is made. In this way, when the cartridge 200 is engaged with the golf club head 101, the first portion of the cartridge 200 facilitates the appearance of the seamless, or relatively seamless, fit described above between the first portion of the cartridge 200 with the exterior of the golf club head 101. Further, the second portion 200b of the cartridge 200 may be a plastic or polymer. The second portion 200b may be configured to receive the monitoring device 201. Alternatively, if desired, the second portion 200b and the monitoring device 201 may be integral. Alternatively, if desired, the monitoring device 201 may be the second portion 200b. The sensor 201 and the transmitter 202 may be encased within the monitoring device 201 or the second portion 200b. Further, if desired, shock absorbers may be positioned in the monitoring device 201 or second portion 200b and configured to surround, or contact, the sensor 201 and the transmitter 202.

According to aspects of the disclosure, the first portion 200a may be curved to match the exterior portion of the portion of golf club head 101 with which it is engaged. Further, the first portion 200a may have a length of 1 inch, a width of ¾ inch and a thickness of 1/10 inch. According to aspects of the disclosure, the second portion 200b may be rectangular, or generally rectangular, extend from the center, or the relative center of the first portion 200a and may have a length of 1 inch, a width of ¾ inch and a height of ½ inch. Further, according to aspects of the disclosure, the cartridge 200 may have a relatively light weight.

According to aspects of the disclosure, the cartridge 200 may include one or more Light Emitting Diodes (LEDs). For example, the first portion 200a may be configured to be translucent and the one or more LEDs may be configured to emit light through the translucent first portion 200a. It is noted that, if desired, one or more indicators may be positioned on the cartridge. For example, logos may be inscribed on the first portion 200a of the cartridge 200. Further, such logos may be illuminated by the LEDs in particular embodiments of the disclosure.

As seen in the exploded view of FIG. 3, in the depicted embodiment, the port 109 is positioned in the rear or the sole 101b of the golf club head 101. However, the port 109 may be positioned in other areas of the golf club head 101 as well (e.g., the crown 101a). It is noted that according to aspects of the disclosure, the port 109 may be positioned within the golf club head 101 such that when the cartridge 200 is engaged with the golf club head, it less like to be contacted during use or transport. For example, the port 109 may be positioned near the rear of the golf club head wherein the cartridge 200 is less likely to contact the ground during a golf swing or when the golf club head 101 is inverted during transport in a golf bag. Such a configuration, wherein the cartridge is less likely to be contacted during the use or transport, reduces the likelihood that the cartridge 200 may be impacted or inadvertently dislodged from its engaged position.

Further, according to aspects of the disclosure, the port 109 may be configured with any size and shape adequate to receive the cartridge 200. For example, as seen in the depicted embodiment, the port 109 may be relatively rectangular. Further, according to particular embodiments of the disclosure, the port 109 may include a length of 1 inch, a width of ¾ inch and a height of ½ inch. Of course, such dimensions are merely exemplary and other sizes may be used as well. As long as the port 109 is configured to receive and securely hold the cartridge 200, the shape and size of the port 109 can be configured as desired.

It is noted that the port 109 may be configured with a recessed or lipped portion 109a at its exterior that is configured to receive or, engage with, the first portion 200a of the cartridge. In this way, the above described seamless, or relatively seamless, fit between with the exterior of the golf club head 101 and the cartridge 200 may be achieved when the cartridge 200 is engaged with the golf club head 101.

According to aspects of the disclosure, the port 109 may be made from any desired materials and combinations of different materials, including the materials described above with reference to the golf club head 101, such as metal materials, including lightweight metal materials (e.g., titanium, titanium alloys, aluminum, aluminum alloys, magnesium, magnesium alloys, etc.), composite materials, polymer materials, etc. It is noted that port 109 may be configured separately and then engaged wit+ h the golf club head 101 (e.g., by adhesives or cements; by welding, soldering, brazing, or other fusing techniques; by mechanical connectors; etc.) or, also, the port 109 may be integral with the golf club head (e.g., made during the manufacture of the golf club head 101 by forging, casting, molding, machining, and/or using other techniques and processes, including techniques and processes that are conventional and known in the art).

The cartridge 200 may be secured in the port 109 of the golf club head 101 in a variety of ways. For example, as discussed above, according to aspects of the disclosure, the cartridge 200 may be removably engaged with the golf club head 101. Therefore, mechanical fasteners may be used to secure the cartridge 200 in the port 109. For example, example embodiments of the disclosure may include a cartridge 200 which is configured to be engaged with the golf club head 101 via press fitting, snap fit mechanisms (e.g., spring loaded protrusions and corresponding detents), threaded fasteners, etc.

Further, one of the advantages of the golf club head 101 is that the cartridge 200 is easily removable from the golf club head 101. Therefore, according to aspects of the disclosure, the golf club head 101 may include a release mechanism for releasing the cartridge 200 from is secured position within the port 109. For example, according a particular embodiment of the disclosure, the port 109 and cartridge 200 are engaged via a mechanism which includes a spring loaded feature. The spring loaded feature of the release mechanism is configured such that when the cartridge 200 is secured in the port 109, the first portion 200a of the cartridge 200 is seamlessly, or relatively seamlessly, engaged with the exterior of the golf club head 101 as described above. In order to disengage the cartridge 200 from the port 109, the user will press the cartridge 200 which will be depressed a short distance into the golf club head 101. For example, the port 109 may include recessed portion along its exterior opening which allows the cartridge 200 to be depressed a short distance into the port 109. This movement of the cartridge 200 a short predetermined distance into the golf club head 101 disengages the cartridge 200 from its secured position within the golf club head 101. Subsequent to the user depressing the cartridge 200 the predetermined, short distance into the golf club head 101, the user releases the cartridge 200, and the spring loaded release mechanism ejects the cartridge 200 to a short, predetermined distance such that at least a portion of the cartridge 200 protrudes outside the golf club head 101 so that the user can easily grasp and remove the cartridge 200 from the golf club head 101.

As discussed above, the golf club head 101 may include other engagement and release mechanisms. Further, it is noted that the cartridge 200 and the port 109 may include guide features. For example, the port 109 may include one or more grooves and the cartridge 200 may include one or more protrusions which are configured to engage with and be guided by the grooves of the port 109. In example embodiments of the disclosure, the port 109 may include a groove on two or four of the interior walls of the port 109 and the second portion 200b of the cartridge 200 may include a corresponding number of protrusions.

As described above, aspects of the disclosure, are directed to a golf club configured to allow the one or more sensors and transmitter to be easily removable from the golf club head, so that the golfer can choose whether or not the golfer wants to have the one or more sensors and the transmitter engaged with the golf club head during golf swings. For example, as described above, a golfer may only want to use the one or more sensors and transmitter during practice (e.g., on a driving range or in a practice round) and not want the one or more sensors and transmitter engaged with the golf club head during play on a golf course during a round of golf.

Therefore, aspects of the disclosure relate to a weight cartridge 200' which is configured to be engaged with the port 109. The weight cartridge may be configured similarly to the cartridge 200 described above with the exception that the weight cartridge does not include a monitoring device 201 or a sensor 202 or a transmitter 203. Since the configuration of the weight cartridge is similar to the above described cartridge 200, the structure of the weight cartridge will not be recited here again for the sake or brevity. Further, it is noted that the weight cartridge may be configured to engage with the port 109 in the same manner as the corresponding cartridge 200. Hence, again, for the sake of brevity, the engaging and releasing structure of the weight cartridge and the port 109 will not be elaborated on here.

According to aspects of the disclosure, when the golfer does not want to have the monitoring device 201 housed within the golf club 100, the golfer may disengage and remove the cartridge 200 from the port 109 of the golf club head 101 and engage and secure the weight cartridge with the port 109 of the golf club head 101. By replacing the cartridge 200 with the weight cartridge 200', the golf club head 101 may retain the same exterior shape of the golf club head 101. The golf club 100 will also have the same weighting characteristics as the weight cartridge 200' is also weighted to correspond to the overall weight of the cartridge 200. Hence, the golf club 100 may be used just as it would be for any golf swing when the cartridge 200 is engaged with the golf club head 101 and the aerodynamics and weighting of the golf club head 101 will not be altered.

It is noted that the term weight cartridge is used merely to distinguish the weight cartridge from the cartridge 200 and does not necessarily imply that the cartridge 200 must be weighted. For example, according to aspects of the disclosure, the weight cartridge may have the same mass and weight as the cartridge 200. In such a configuration, the golfer's golf swing will not be affected regardless of which cartridge is engaged with the golf club head 101. However, if desired, the weight cartridge may include one or more weighted portions.

Therefore, based on the above disclosure, it is understood that aspects of the disclosure are directed to a golf club which is configured to receive interchangeable sections or cartridges, wherein one of the interchangeable cartridges may house the one or more sensors and the transmitter and a second of the interchangeable cartridges does not house a sensor or a transmitter. In this way, the golfer may selectively configure the golf club to include, or not include, the one or more sensors and the transmitter, at the golfer's discretion.

The monitoring device 201 may be configured to measure a multitude of different aspects of a golfer's golf game. For example, the monitoring device 201 may be configured to measure golf swing data. According to aspects of the disclosure, golf swing data may include information on a variety of different characteristics of a golf swing. Further, according to particular embodiments of the disclosure, the monitoring device 201 may also be configured to identify the particular golf club in which the sensor is positioned. For example, an RFID tag may be used. Further, according to particular embodiments of the disclosure, the monitoring device 201 may also be configured to indentify a location where a particular golf swing was taken. For example, the monitoring device 201 may include Global Positioning Satellite (GPS) technology. Such information may be incorporated with maps of the golf course on which the golf shots were taken in order to provide a golfer with information on each shot during a round of golf. Each of these features will be described in further detail below.

Figure 4:
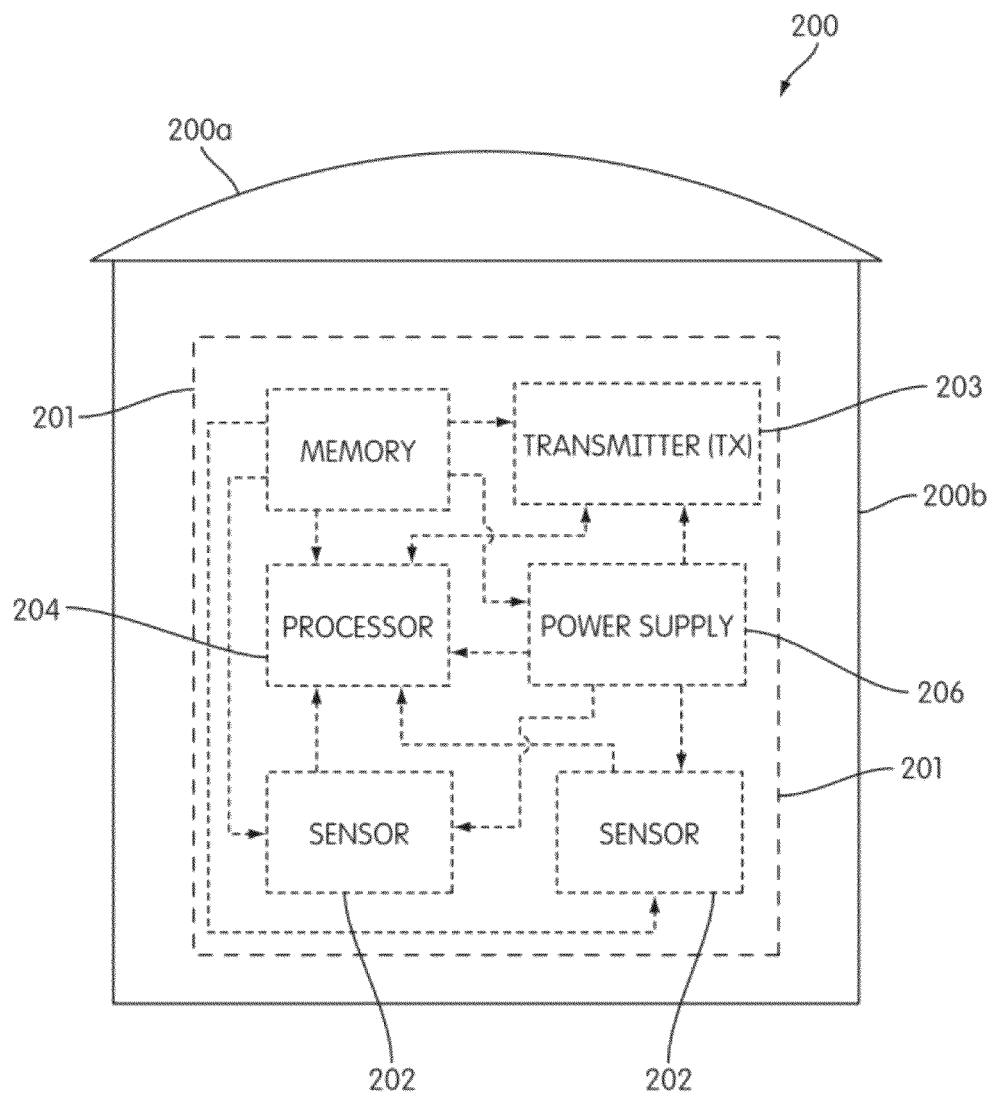
FIG. 4 is a cartridge according to an illustrative embodiment of the disclosure.

FIG. 4 illustrates one example of a monitoring device 201 that may be employed according to various examples of the disclosure to measure various aspects of a golfer's abilities and game. The monitoring device 201 may include a processor 204 for processing the electrical signals output by the sensors 202. With some implementations of the disclosure, the processor 204 may be a programmable microprocessor. For still other implementations of the invention, however, the processor 204 may be a purpose-specific circuit device, such as an ASIC. The processor 204 may be configured to perform any desired operation on the signals output from the sensors 202, such as curve smoothing, noise filtering, outlier removal, amplification, summation, integration, or the like. The processor 204 may be configured to provide the processed signals to transmitter 203 (or transceiver). Further, the monitoring device 201 may be configured to transmit the processed signals to a remote computer system 400 via the transmitter 203 (or transceiver), as will be discussed below. In one exemplary embodiment, the processed data may be transmitted wirelessly. The monitoring device 201 may also include a power supply 206, for providing power to the sensors 202, the processor 204, and the transmitter 203 (or transceiver) as needed. The power supply 206 may be, for example, a battery. Further, as discussed below, embodiments of the monitoring device 201 may include a memory (e.g., a flash memory). The memory may include both a read-only memory (ROM) and a random access memory (RAM). As will be appreciated by those of ordinary skill in the art, both the read-only memory (ROM) and the random access memory (RAM) may store software instructions for execution by the processor 204.

It is noted that while the depicted embodiment illustrates a processor 204, according to other aspects of the disclosure, the monitoring device 201 does not need to include a processor to process the data from the sensors 202. Instead, according to such aspects of the disclosure, the "raw" data from the sensors 202 may be transmitted, such as by wireless transmission, without being processed.

As discussed above, according to particular embodiments of the disclosure, the monitoring device 201 may be configured to measure golf swing data. Examples of golf swing data may include, the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, aspects of the impact of the ball with the golf club head during a golf swing (e.g., loft, etc.), etc. Further, the sensors may be configured to measure the position (e.g. a spatial position with regard to a particular frame of reference) of the golf club at various points in time in order to provide data on a golf swing. In this way, acceleration, velocity, positioning of the golf club may be determined and analyzed in 3 dimensions. Further, some or all of the above data may be leveraged to create a graphical representation (e.g., a picture or video) of the golf swing. For example, a swing path may be graphically represented in 3 dimensions along an X-Y-Z frame of reference. Further, areas of the "3D golf swing" during which acceleration is taking place may be represented differently than areas of constant velocity or deceleration. For example, high acceleration takes place may be shown in red, while areas in the swing path during which constant velocity or deceleration takes place may be shown in yellow.

According to aspects of the disclosure, the monitoring device 201 may include one or more sensors 202. It is noted that the sensors 202 may be accelerometers (such as piezoelectric accelerometers), magnetometers, or gyroscopes. Further, one skilled in the art will appreciate that numerous additional sensors may be used in connection with aspects of the disclosure (e.g., impact sensors, strain gauges, etc.). According to particular embodiments of the disclosure, the sensors 202 may be similar to sensors used in the NIKE+™ athletic performance monitoring systems available from NIKE, Inc. of Beaverton, Oreg. For example, the sensors 202 may measure golf swing data in a manner akin to the measurement of data in NIKE+™ athletic performance monitoring systems (e.g., speed information, such as velocity and acceleration information, etc.). According to aspects of the disclosure, the sensors 202 will produce electrical signals corresponding to the specific golfing characteristic it is monitoring. As known in the art, these signals can then be used to generate data representative of the golfing activity performed by the golfer.

Figure 4A:
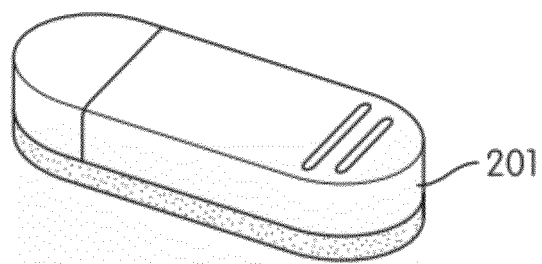
FIGS. 4A and 4B illustrate a monitoring device according to an illustrative embodiment of the disclosure.
Figure 4B:
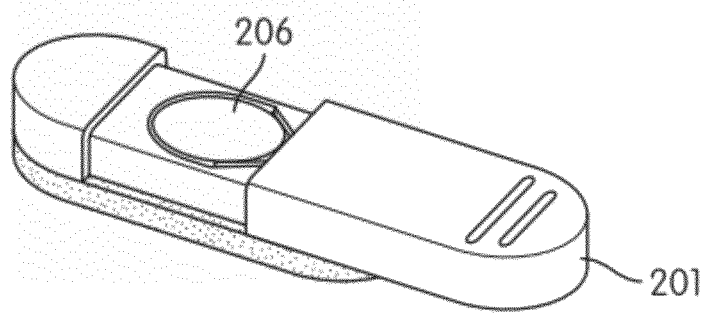

FIGS. 4A and 4B illustrate a particular embodiment of a monitoring device 201 according to aspects of the disclosure. As seen in FIGS. 4A and 4B, the monitoring device 201 may include a generally rectangular compartment in which sensors 202 are housed. The compartment may be similar to the compartment used to house sensors used in the NIKE+™ athletic performance monitoring systems available from NIKE, Inc. of Beaverton, Oreg. For example, according to aspects of the disclosure, the compartment may be rectangular with rounded ends and has a length in the range of 1.0-1.5 inches, a width of 0.4-1.0 inches and thickness of 0.2-0.45 inches. Other dimensions may be used as well. Further, the monitoring device 201 illustrated in FIGS. 5A-C may include three accelerometers, three gyroscopes and a magnetometer. Additionally, the monitoring device 201 illustrated in FIGS. 5A-C may include a transmitter 203 (or transceiver) for wirelessly transmitting data determined by the three accelerometers, three gyroscopes and a magnetometer.

According to aspects of the disclosure, the compartment of the monitoring device 201 may be made of plastic. It is noted that other materials may be used as well. The compartment of the monitoring device 201 may be opened to provide access to the sensors 202 and the other components housed inside the monitoring device 201. For example, as seen in FIGS. 4A and 4B, the compartment of the monitoring device 201 may include a cover which is configured to slide to provider access to various components of the monitoring device, such as the battery 206. Further, the compartment of the monitoring device 201 may house a circuit board or the like which may include various elements described above, such as the processor 204, sensors 202, transmitter 203, power supply 206, memory, etc.

Figure 5A:
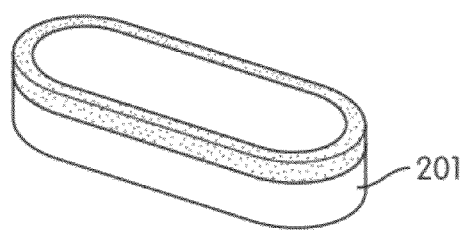
FIGS. 5A and 5B illustrate a monitoring device according to an illustrative embodiment of the disclosure.
Figure 5B:
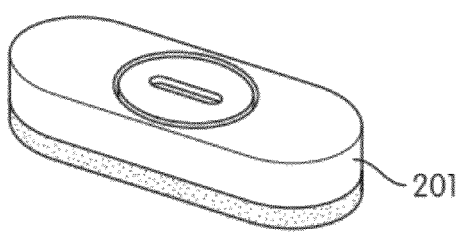
Figure 5C:
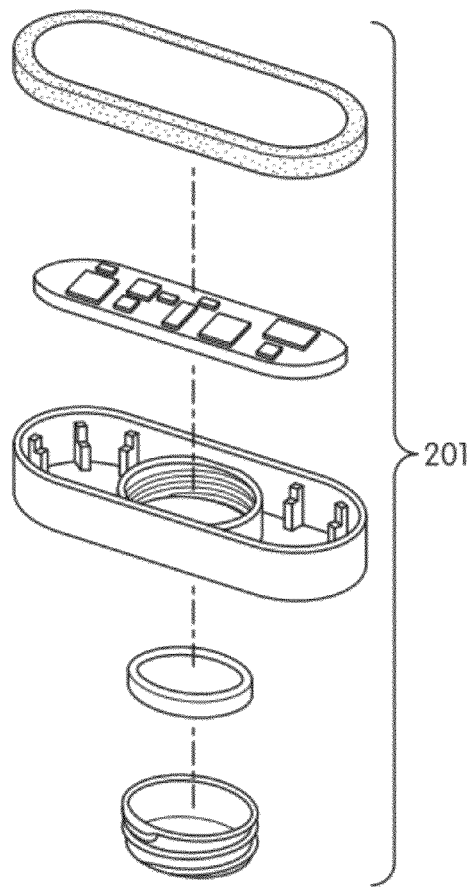
FIG. 5C is an exploded view of the monitoring device shown in FIGS. 5A and 5B.

FIGS. 5A-C illustrate a particular embodiment of the monitoring device 201. Specifically, FIG. 5A is a perspective view of the monitoring device 201. FIG. 5B is a perspective view of the bottom of the monitoring device 201. FIG. 5C is an exploded view of the monitoring device 201. As seen in FIGS. 5A-C, in the depicted embodiment, the monitoring device 201 includes a generally rectangular compartment in which sensors 202 are housed. The compartment may be similar to the compartment used to house sensors used in the NIKE+™ athletic performance monitoring systems available from NIKE, Inc. of Beaverton, Oreg. Further, the monitoring device 201 illustrated in FIGS. 5A-C may include three accelerometers, three gyroscopes and a magnetometer. Additionally, the monitoring device 201 illustrated in FIGS. 5A-C may include a transmitter 203 (or transceiver) for wirelessly transmitting data determined by the three accelerometers, three gyroscopes and a magnetometer.

According to aspects of the disclosure, the compartment of the monitoring device 201 may be made of plastic. It is noted that other materials may be used as well. As seen in FIG. 5C, the compartment of the monitoring device 201 may be opened to provide access to the sensors 202 and the other components housed inside the monitoring device 201. For example, as seen in FIG. 5B, the compartment of the monitoring device 201 may include a locking mechanism which allows the compartment to be unlocked and opened. As seen in FIG. 5C, the compartment of the monitoring device 201 may house a circuit board or the like which may include various elements described above, such as the processor 204, sensors 202, transmitter 203, power supply 206, memory, etc.

Figure 5D:
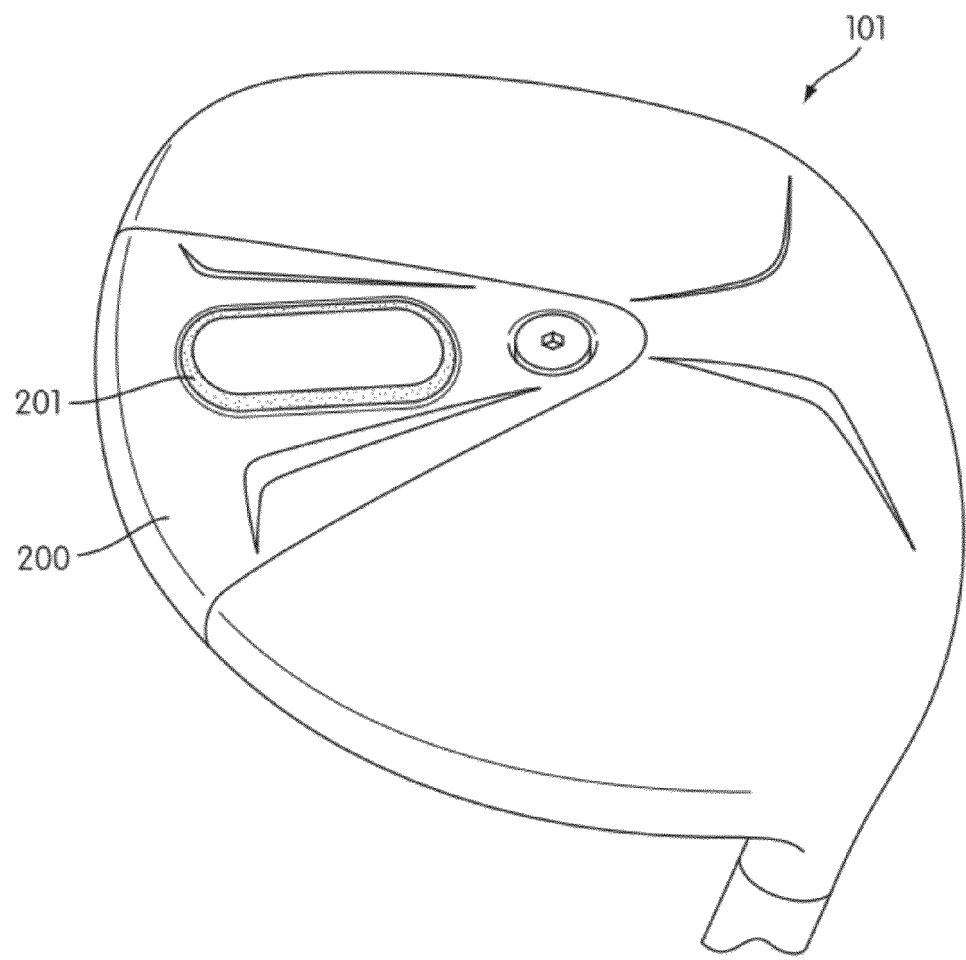
FIG. 5D is an illustrative embodiment of another wood-type golf club structure supporting a monitoring device according to aspects of the disclosure.
Figure 5E:
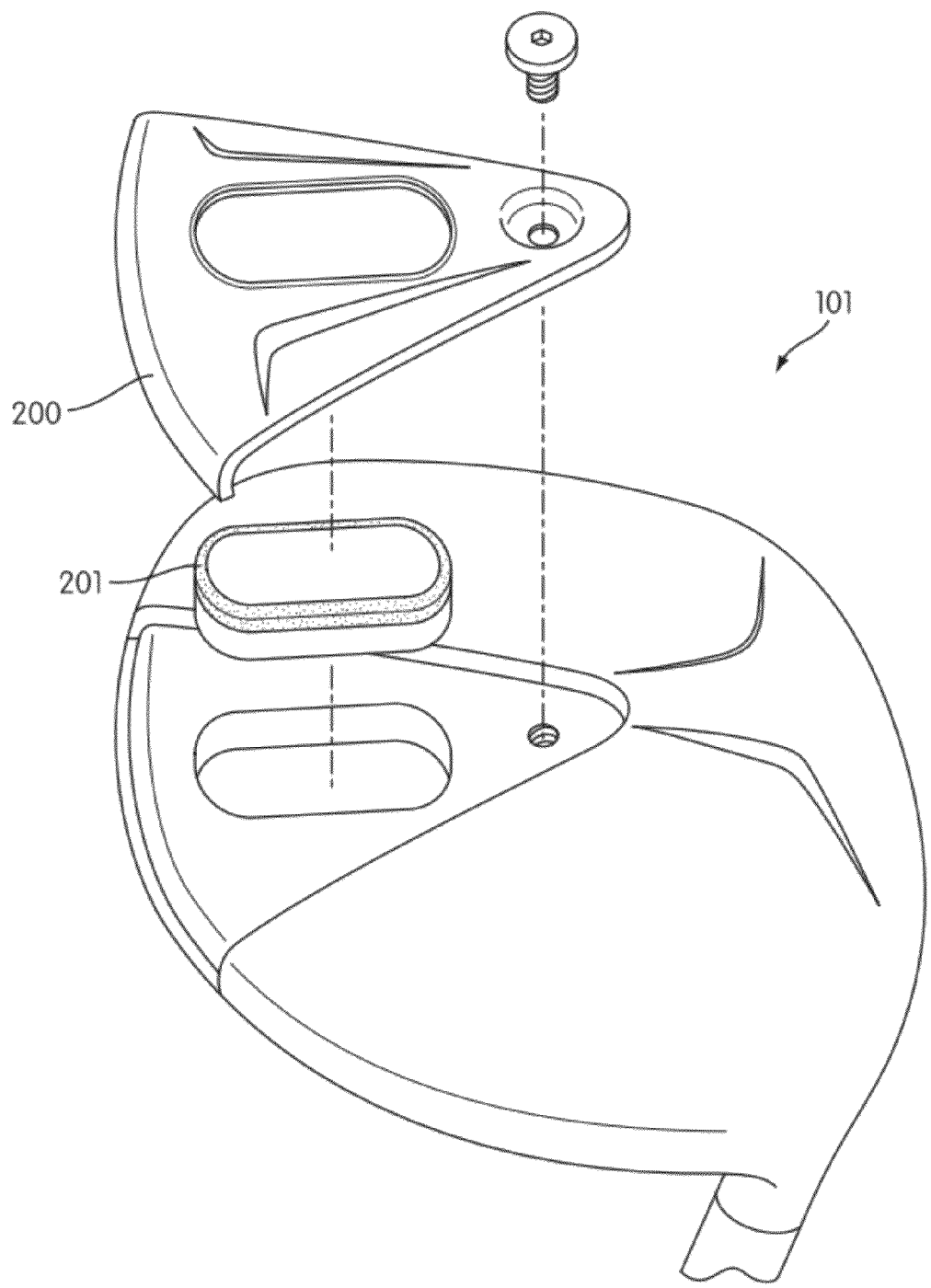
FIG. 5E is an exploded view of the wood-type golf club head shown in FIG. 5D.

According to the aspects of the disclosure, the monitoring device 201 may be configured to engage with the golf club head 101 in a variety of ways. FIGS. 5D-5G show various illustrative embodiments in which the monitoring device 201 is engage with the golf club head 101. For example, FIG. 5D illustrates an embodiment according to the disclosure, wherein the monitoring device 201 and a removable section 200 are engaged with the golf club head 101. FIG. 5E is an exploded view of the embodiment shown in FIG. 5E. As seen in FIGS. 5D and E, the removable section 200 is engaged with the golf club head via a threaded fastener. However, the removable section 200 may be configured to be engaged with the golf club head 101 via other methods as well, such as press fitting, snap fit mechanisms (e.g., spring loaded protrusions and corresponding detents), etc. As seen, the removable section 200 may include an opening configured to surround the monitoring device 201 and through which the monitoring device is visible. The removable section 200 may be configured to provide support and stability to the monitoring device 201.

Further, as seen in FIGS. 5D and 5E, the monitoring device 201 is engaged with the golf club head 101. The engagement of the monitoring device 201 with the golf club head 101 can be done in a variety of ways, e.g., mechanical fasteners, press fitting, snap fit mechanisms (e.g., spring loaded protrusions and corresponding detents), threaded fasteners, etc. As seen in FIG. 5E, the golf club head 101 may include a recess configured to receive the monitoring device 201. For example, the recess may be configured to surround and engage the monitoring device 201 in order to support and stabilize the monitoring device 201. Further, it is noted that the golf club head 101 may include a structure configured to receive the removable section 200. The golf club head 101, the removable section 200 and the monitoring device 201 may be configured so as not to affect the aerodynamics of the golf club head 101 during a golf swing. For example, the golf club head 101, the removable section 200 and the monitoring device 201 may be configured such that when engaged, the golf club head 101 resembles the sole of the traditional wood-type golf club head with a relatively seamless surface.

Figure 5F:
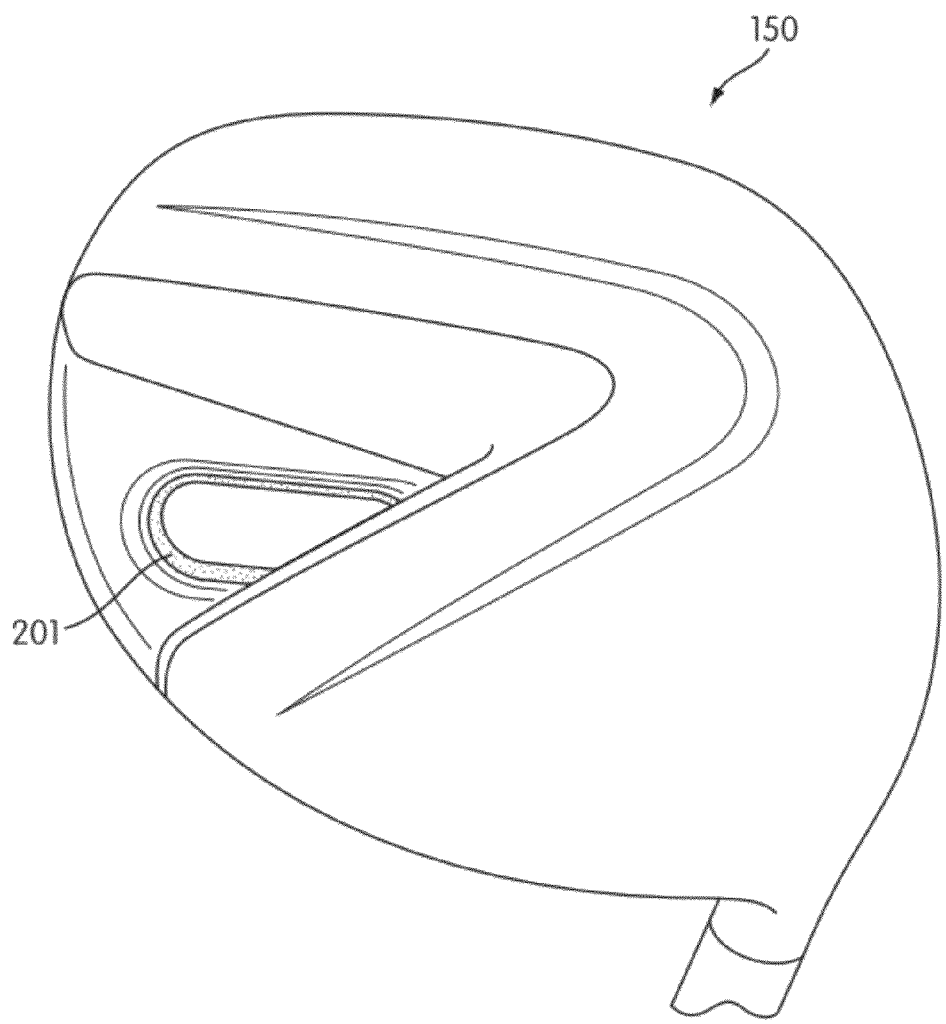
FIG. 5F is an illustrative embodiment of another wood-type golf club structure supporting a monitoring device according to aspects of the disclosure.

FIG. 5F illustrates another illustrative embodiment of a golf club head 150 according to aspects of the disclosure. As seen in FIG. 5F, the golf club head 150 includes a U or V-shaped sole structure between the sole of the golf club head 150 is configured to receive the monitoring device 201. For example, the portion of the of the sole of the golf club head 101 between the legs of the U or V-shaped sole structure may include a recess configured to receive the monitoring device 201. The engagement of the monitoring device 201 with the golf club head 150 can be done in a variety of ways, such as in the above described embodiments.

Figure 5G:
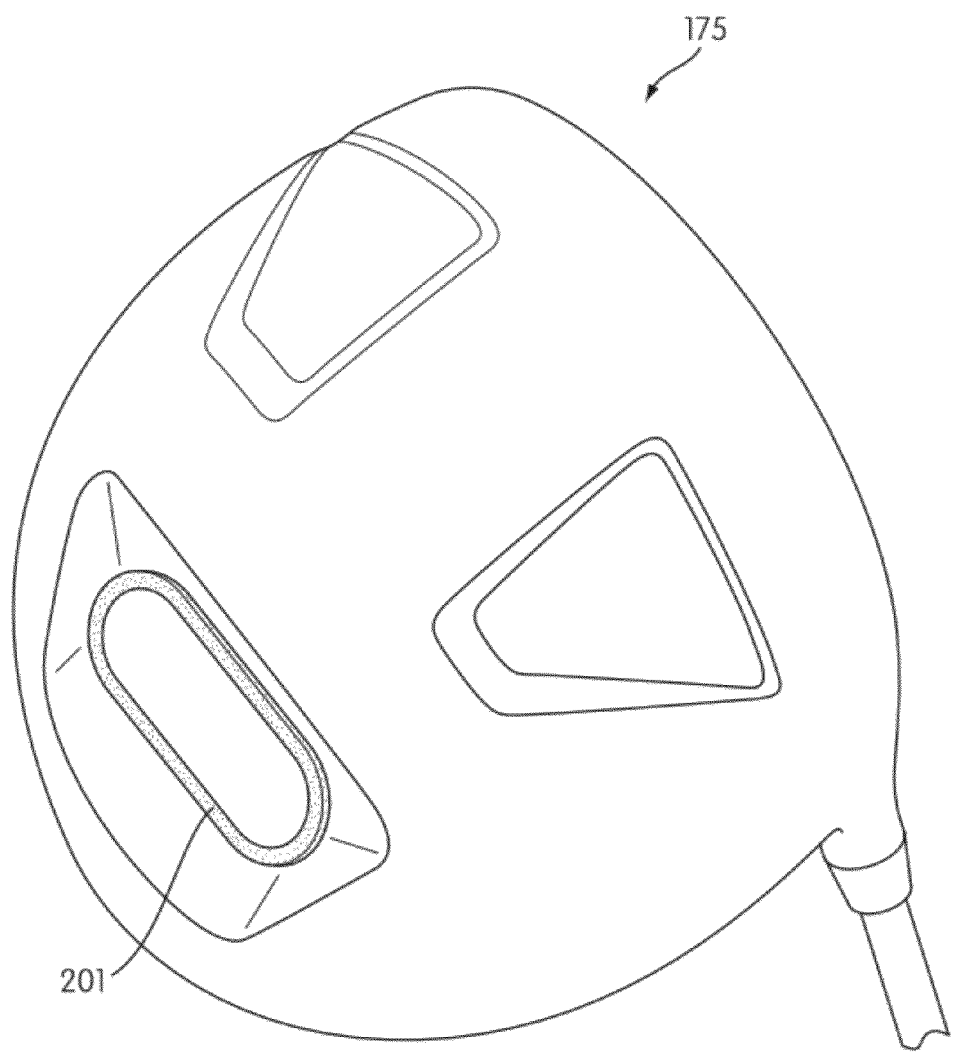
FIG. 5G is an illustrative embodiment of another wood-type golf club structure supporting a monitoring device according to aspects of the disclosure.

FIG. 5G illustrates another illustrative embodiment of a golf club head 175 according to aspects of the disclosure. As seen in FIG. 5G, the golf club head 175 includes a recess in the rear of the golf club head 175. The recess may be configured to receive the monitoring device 201. For example, the portion of the rear of the golf club head 101 may include a smaller recess configured to receive the monitoring device 201. The engagement of the monitoring device 201 with the golf club head 175 can be done in a variety of ways, such as in the above described embodiments.

According to aspects of the disclosure, the monitoring device 201 may include an activation system. The activation system may be used for selectively activating the monitoring device 201 and/or at least some functions of the monitoring device 201 (e.g., data transmission/reception functions, data storage functions, data calculation functions, etc.). A wide variety of different activation systems may be used without departing from this disclosure.

For example, input from the activation system may be provided in any desired form or format without departing from the disclosure. As some more specific examples, if desired, the activation system may include a simple button, switch, or other input source that simply provides an activation or deactivation signal to the monitoring device 201 (e.g., a logical "1" or "0"). If desired, in at least some examples according to this disclosure, the activation system may activate the monitoring device 201, based on input it receives from the remote computer 400 (described below). For example a golfer may manually activate the monitoring device 201 by providing input (e.g., pressing a button) on the remote computer 400. Alternatively, the activation system may activate the monitoring device 201 automatically upon a certain action being performed. For example, when a golfer moves the club in which the monitoring device 201 is inserted, the activation system may induce the monitoring device 201 or its functions to operate. For example, if the monitoring device 201 includes an accelerometer and the golfer waggles the club (e.g., moves the club) over a pre-defined speed or length of time, the activation system may automatically activate the monitoring device 201 and/or at least some functions of the monitoring device 201 (e.g., data transmission/reception functions, data storage functions, data calculation functions, etc.). Further, the activation system may activate the monitoring device 201 when the golf club expands on impact (e.g., an impact with a golf ball). Further, it is noted that a monitoring device 201 may be configured to enter a sleep mode to conserve battery power if the monitoring device 201 is not used for a predetermined amount of time.

As discussed above, according to aspects of the disclosure, one of the sensors 202 may be an accelerometer. An accelerometer is a device used to measure acceleration. For example, an accelerometer may measure the magnitude and the direction of acceleration. An accelerometer according to aspects of the disclosure may include a three-axis accelerometer for measuring acceleration along three orthogonal axes. According to aspects of the disclosure, one or more accelerometers may be included in the golf club 100. For example, one or more accelerometers may be included in the monitoring device 201 or other a micro-electromechanical system (MEMS) configured to be engaged within the golf club head body 101 or shaft 103/grip 105.

According to aspects of the disclosure, the accelerometer may be configured to measure the velocity of the golf club 100 (e.g., club head 101, shaft 103, grip 105) during a golf swing, the acceleration of the club 100 (e.g., club head 101, shaft 103, grip 105) during a golf swing, etc.

According to aspects of the disclosure, one of the sensors 202 may be a magnetometer. A magnetometer is an instrument used to measure the strength and or the direction of a magnetic field around the instrument. According to aspects of the disclosure, one or more magnetometers may be included in the golf club 100. For example, one or more magnetometers may be included in the monitoring device 201 or other MEMS configured to be engaged within the golf club head body 101 or shaft 103/grip 105.

Figure 5H:
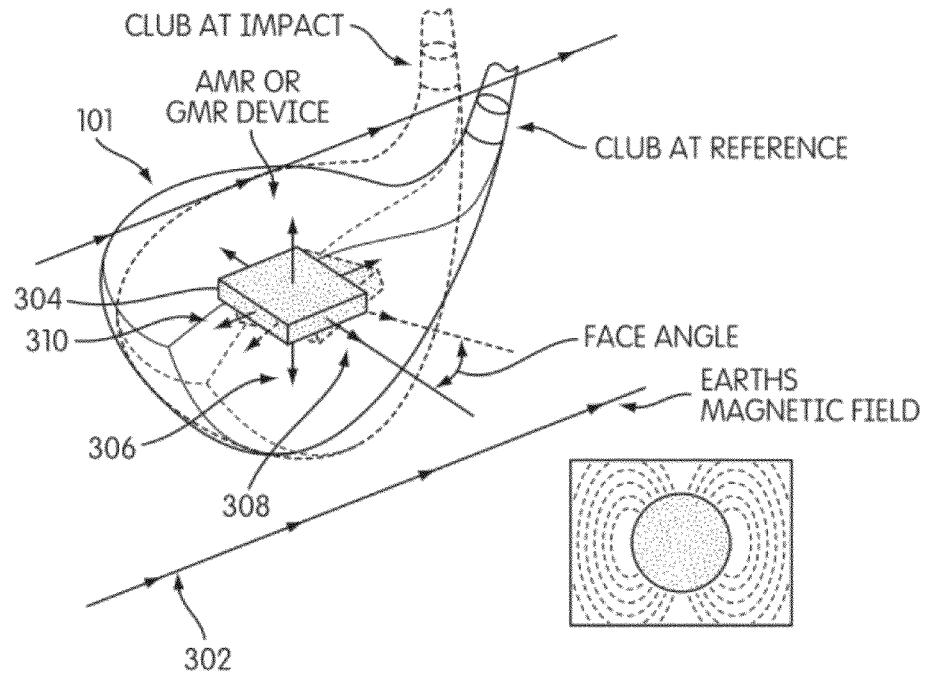
FIG. 5H illustrates an instrumented golf club that includes a magnetic field sensor, in accordance with an embodiment of the invention.

According to aspects of the disclosure, one or more magnetometers may also be used to determine golf swing parameters. As shown in FIG. 5H, the earth's magnetic field represented by vector 302 is relatively constant in the vicinity of a golfer. A magnetometer 304 resolves magnetic field vector 302 into three component vectors 306, 308 and 310. Magnetometer 304 may be implemented with an anisotropic magnetoresistive (AMR) device, a giant magnetoresistor (GMR) device or other suitable devices. As golf club head 101 moves, the magnetic field vector 302 is resolved into component vectors 306, 308 and 310 such that the respective components have different magnitudes. According to aspects of the disclosure, the changing magnitudes of the component vectors may then be used to determine golf swing parameters.

For example, a club head face angle may be determined by first taking a reference measurement of the magnetic field before the back swing and then taking another measurement of the magnetic field just prior to impact. For example, the magnitude of component vectors 306, 308 and 310 will have first values before the back swing and second values just prior to impact. The different component vector values can then be used to determine the face angle. If the magnetic field in the x-y plane is assumed to be 0.3 Gauss, the component X of the field with respect to component vector 308 (x axis) is determined by $X=0.3 \cos \theta$ and the component Y of the field with respect to component vector 310 (y axis) is determined by $Y=0.3 \sin \theta$.

A 1 degree difference would cause a change in the magnitudes of vector components 308 and 310 as follows:

$$\Delta X = 0.3(\cos \theta - \cos(\theta+1))$$

$$\Delta Y = 0.3(\sin \theta - \sin(\theta+1))$$

The smallest change that needs to be detected along each vector component may be determined by taking the derivative of each component and determining were the derivative crosses the 0 axis.

$dX/d\theta = -0.3 \sin\theta = 0$ at $\theta = 0$ degrees $dY/d\theta = 0.3 \cos\theta = 0$ at $\theta = 90$ degrees The highest resolution in the x-component is needed when the angle rotates from 0 to 1 degree and corresponds to 45.7 μG. The same resolution is needed when the y-component rotates from 89 to 90 degrees.

Other golf swing parameters may be determined by magnetometers. For example, according to aspects of the disclosure, swing tempo may be determined by using vector component 306 (z axis) as a tilt sensor. A reference measurement of vector component 306 may be recorded before the back swing. The period required for the club head to return to a position such that the vector component 306 returns to the measured reference value corresponds to the swing tempo. In an alternative embodiment, velocity information may also be just to determine impact time and the resulting swing tempo.

Figure 5I:
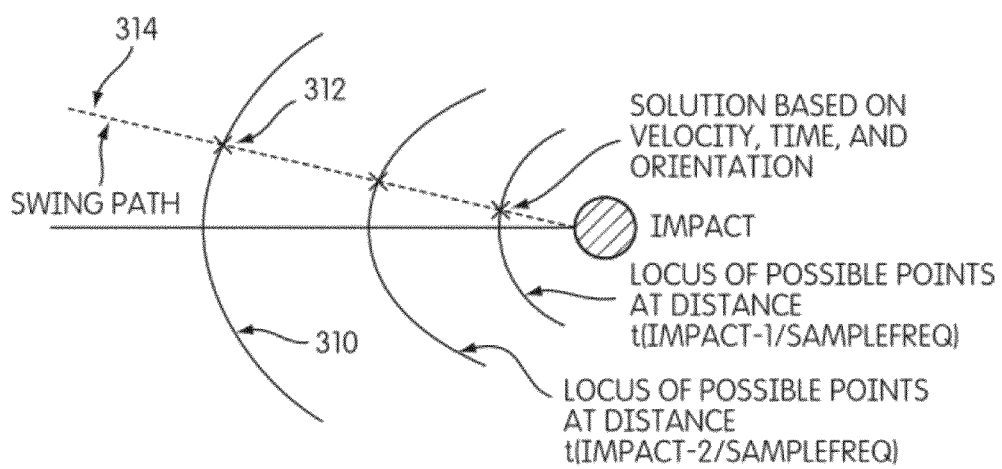
FIG. 5I illustrates how velocity, time and orientation measurements may be used to determine the swing path of a golf club, in accordance with an embodiment of the invention.

Further, several different measurements may be used to determine the swing path. For example, FIG. 5I shows a diagram of how velocity, time and orientation measurements may be used to determine the swing path. For example, velocity and time information measurements may be used to determine a first locus of points 310. Next, an orientation measurement may then be used to determine a first location 312 along first locus of points 310. The process of identifying club locations may be repeated several times to determine a swing path 314. In one embodiment, measurements are taken at least 1 kHz during a swing. Swing path 314 may be determined relative to a reference orientation and impact location.

According to aspects of the disclosure, one of the sensors 202 may be a gyroscope. A gyroscope is a device used to measure orientation and rotation. For example, a gyroscope may measure orientation based on the principles of the conservation of angular momentum. Further, according to aspects of the disclosure, a three-axis gyroscope may be used to increase accuracy. When combined with an accelerometer, the combination of the gyroscope and the accelerometer may provide a more accurate indication of movement within a 3-D space when compare to an accelerometer alone. According to aspects of the disclosure, one or more gyroscopes may be included in the golf club 100. For example, one or more gyroscopes may be included in the monitoring device 201 or other MEMS configured to be engaged within the golf club head body 101 or shaft 103/grip 105.

Figure 5J:
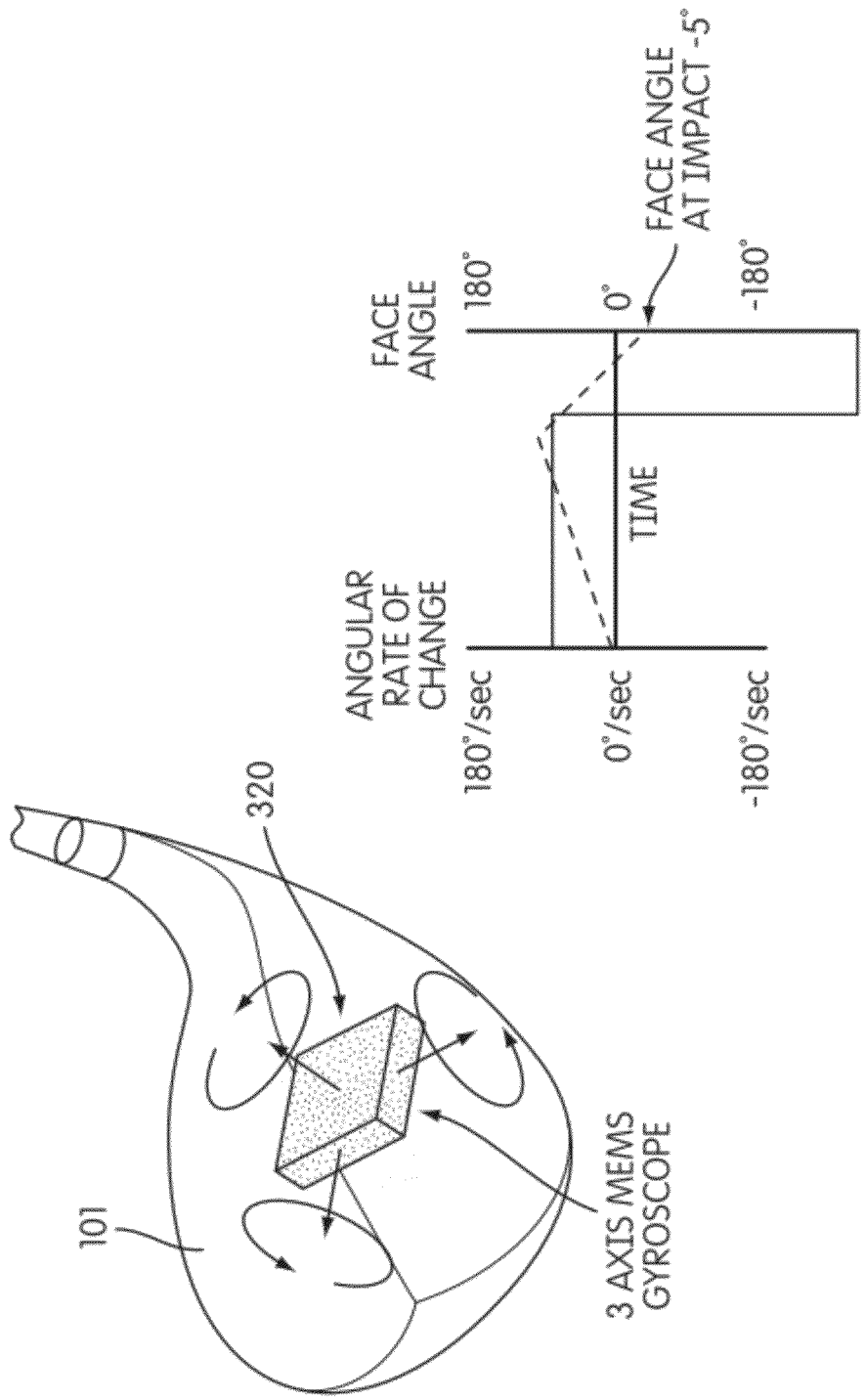
FIG. 5J illustrates an instrumented golf club that includes a gyroscope module, in accordance with an embodiment of the invention.

FIG. 5J shows an embodiment in which a gyroscope 320 is placed within a golf club head 101 to measure golf swing parameters. Gyroscope 320 may be implemented with a micro-electromechanical system (MEMS) or other device or module capable of fitting within golf club head 101. A three-axis gyroscope may be used to increase accuracy.

According to aspects of the disclosure, the gyroscope 320 may be configured to determine golf swing parameters by assuming that the point of rotation is a golfer's shoulders. Club head velocity may be determined by an accelerometer (such as described above) that is part of the same MEMS, an external accelerometer or some other device. For golf swing parameter determination purposes, in the proximity of a golf ball the movement of golf club head 101 may be modeled as an object moving on the surface of a sphere. The sphere has a radius equal to the length of the club plus the length of the golfer's arms. In one embodiment, a standard radius of 62.5 inches is used. In other embodiments, a golfer may provide his or her arm length and/or club length for more accurate determinations.

Figure 5K:
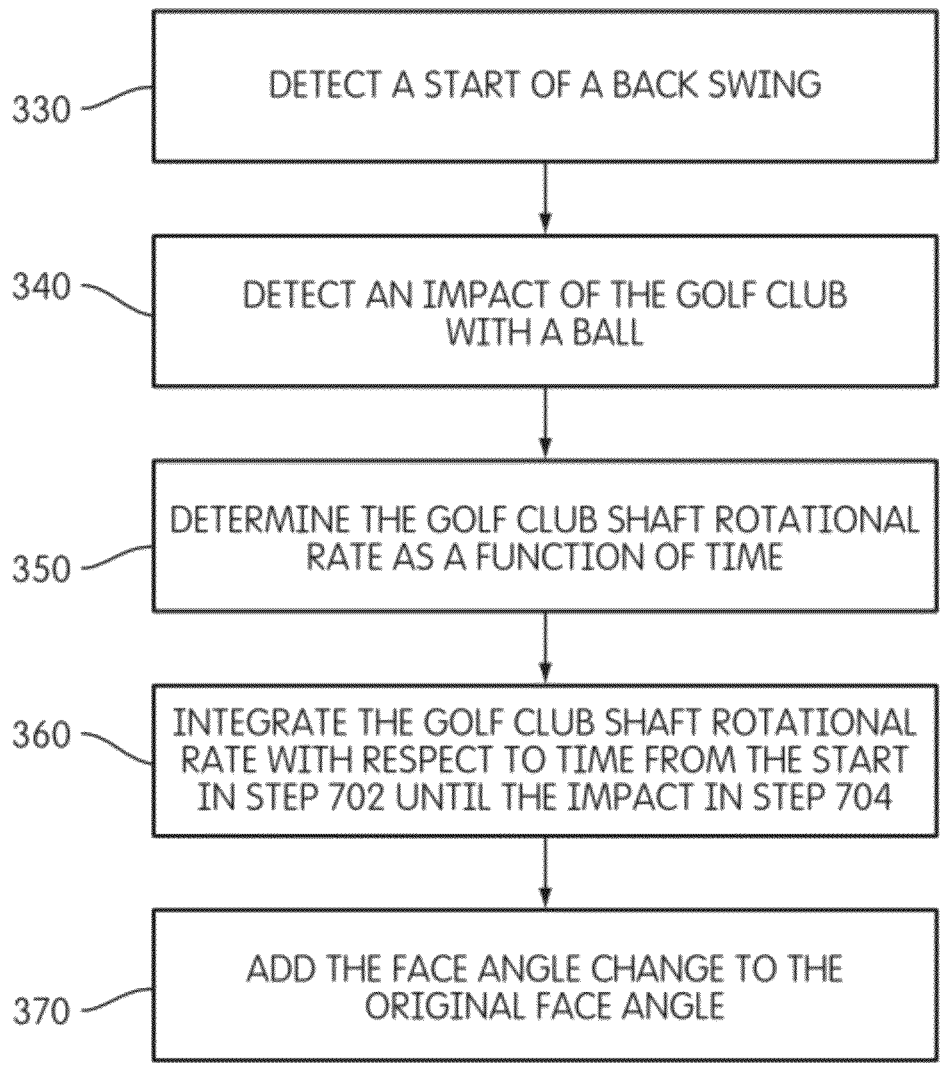
FIG. 5K illustrates a method of determining the face angle of a golf club with the use of a gyroscope, in accordance with an embodiment of the invention.

The face angle of golf club head 101 may be determined as a function of the shaft rotation rate. The shaft rotation rate may be determined by gyroscope 320. FIG. 5K illustrates one exemplary method of determining the face angle with the use of a gyroscope. First, in step 330 the start of the back swing is determined. A velocity sensor may be used to determine the start of the back swing. In step 340 impact of the golf club with a ball is detected. Step 350 may be performed by the impact sensors described above. The shaft rotational rate as a function of time may be determined by gyroscope 320 in step 350. Step 350 preferably includes determining the shaft rotational rate from at least the start in step 330 until at least the impact in step 340. Next, in step 360, the golf club shaft rotational rate is integrated with respect to time from the start in step 330 until the impact in step 340 in accordance with the following formula:

Face Angle Change=$\int_{BackswingStart}^{Impact}$ Shaft Rotation Rate $(t)dt$

The face angle is then determined by adding the face angle change to the original face angle in step 370.

Club head speed may be determined as a function of the radius (arm length plus club length) and angular velocity. In particular, the club head speed is the product of the radius and the angular velocity of golf club head 101.

Swing tempo may be determined by first determining when the angular rate is zero and begins to increase at the start of the back swing. The time of impact may then be determined by a spike in the angular rate that accompanies the impact or from one or more other sensors, such as an accelerometer or impact sensor.

Rotational velocities may also be used to determine the swing path. In one embodiment in which gyroscope 320 is implemented with a three axis gyroscope and in which the z-axis is used to determine changes in face angle, the y-axis is used to determine motion in a target reference plane and the x-axis is used to determine motion parallel to the target reference plane, the swing path may be estimated by the following formula:

$$SwingPath = \text{atan}\left(\frac{xAxisRotationalVelocity}{yAxisRotationalVelocity}\right)$$

Therefore, as demonstrated above, the monitoring device can determine various aspects of a golfer's golf swing, including: the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, etc.

As described above, the golf club 100 may include a transmitter 203. Further, it is noted that while a transmitter is the depicted embodiment, according to particular embodiments of the disclosure, the transmitter 203 may be a transceiver which is capable of receiving data as well as transmitting data. Data determined from each of the one or more sensors 202 may be communicated to the transmitter 203. For example, the one or more sensors 202 may be electrically connected to transmitter 203. Alternatively, data may be communicated wirelessly from the one or more sensors 201 to the transmitter 203. Regardless of how the data is communicated from the one or more sensors 202 to the transmitter 203, the transmitter 203 may be configured to transmit the data determined by the one or more sensors 202 to a remote computer system 400 (e.g., a portable computer device with a receiver configured to receive the data from the transmitter 203). While not shown, according to aspects of the disclosure, the monitoring device 201 may include a memory. The memory may be configured to store data from the one or more sensors 202. More specifically, the memory may store data while the golfing activity takes place and save it for later transmission to the remote computer system 400 (as discussed below).

While the data may be transmitted from the transmitter 202 in any desired manner, wireless type transmissions may be used in embodiments of the disclosure. Any desired wireless transmission system and method may be used without departing from the scope of the disclosure, including the use of any desired wireless data transmission format or protocol, including the transmission systems and protocols currently in use in NIKE+™ athletic performance monitoring systems. According to example aspects of the disclosure, the transmitter 203 may be configured to transmit data using a variety of conventional protocols. For example, the monitoring device 201 may be configured to communicate using the Bluetooth wireless communication protocol, so that it can be employed with Bluetooth-capable mobile telephones, personal digital assistants, watches or personal computers. Further, other methods of transmitting may be used as well, such as Bluetooth2, RFID, infrared transmission, cellular transmissions, etc.

Further, according to example aspects of the disclosure, the transmitter 203 may be configured to transmit data via an antenna. For example, in one embodiment of the invention, a ferrule is used as an antenna. The ferrule may be formed of a metal material or other type of antenna material. In another embodiment, shaft 103 may function as an antenna. An antenna may also be plated onto shaft 103, embedded under grip 105 or placed in any other location that does not interfere with a golf swing. The monitoring device 201 and the golf club head 101 may be configured such that a connection is made between the transmitter 203 and the antenna when the monitoring device 201 is engaged with the golf club head 101.

While wireless communication between the monitoring device 201 and the remote computer system 400 is described above, it is noted that any desired manner of communicating between the monitoring device 201 and the remote computer system 410 may be used without departing from the scope of the disclosure, including wired connections. For example, if desired, monitoring device 201 may include its own data storage system for storing data from the one or more sensors 202. Further, the monitoring device 201 may be configured to be engaged with the remote computer system 400 in order to transmit data to the remote computer 400. For example, monitoring device 201 may include an interface (e.g., a USB connection) configured to engage with a port of the remote computer system 400 in order to transmit data to the remote computer 400.

According to aspects of the disclosure, data collected from the sensors 202 may be stored during a practice session or a round of golf. Then, at a convenient time, such as after the practice session or round of golf, the golfer may disengage the monitoring device 201 from the golf club head and engage it with the remote computer system 400 in order to transmit the data to the remote computer system 400. Any type of connection system may be used without departing from the scope of the disclosure, including a wireless connection, a hardwired connection, connection via an input port (such as a USB port, or the like), etc.

Other data storage and/or transmission arrangements also are possible without departing from the scope of the invention. For example, any desired way of placing data derived from the physical data from the monitoring device 201 in the proper form or format for communication to the remote computer system 400 may be provided without departing from the invention. For example, as discussed above, the monitoring device 201 may include a receiver (e.g., the transmitter 203 may be a transceiver) which determines whether a transmission from transmitter 203 has been or is being received by the remote computer 400. If the transmission from transmitter 203 is not received by the remote computer 400, the monitoring device 201 may be configured to store the data on the memory (e.g., if the remote computer system 400 is not in range or is turned off). In this way, data collected by the sensors 202 will be stored locally so that it will not be lost and can be downloaded later to the remote computer system 400.

The remote computer system 400 may be any desired type of computer system, at any desired location, without departing from the scope of the disclosure.

An example remote computer 400 may include a processor system (which may include one or more processors or microprocessors, which may be configured to execute software instructions), a memory, a power supply, an output device, other user input devices, and data transmission/reception system (e.g., a wireless transceiver). The processor system and the memory may be connected, either directly or indirectly, through a bus or alternate communication structure to one or more peripheral devices. For example, the processor system or the memory may be directly or indirectly connected to additional memory storage, such as a hard disk drive, a removable magnetic disk drive, an optical disk drive, and a flash memory card. The processor system and the memory also may be directly or indirectly connected to one or more input devices and one or more output devices. The input devices may include, for example, a keyboard, touch screen, a remote control pad, a pointing device (such as a mouse, touchpad, stylus, trackball, or joystick), a scanner, a camera or a microphone. The output devices may include, for example, a monitor display, speakers, etc.

Still further, the processor system may be directly or indirectly connected to one or more network interfaces for communicating with a network. This type of network interface, also sometimes referred to as a network adapter or network interface card (NIC), translates data and control signals from the processor system into network messages according to one or more communication protocols, such as the Transmission Control Protocol (TCP), the Internet Protocol (IP), and the User Datagram Protocol (UDP). These protocols are well known in the art, and thus will not be discussed here in more detail. The data transmission/reception system may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof.

Of course, still other peripheral devices may be included with or otherwise connected to the remote computer system 400, as is well known in the art. In some cases, a peripheral device may be permanently or semi-permanently connected to the processor system. For example, as with many computers, the processor system, the hard disk drive, the removable optical disk drive and a display are semi-permanently encased in a single housing. Still other peripheral devices may be removably connected to the remote computer system. The remote computer system may include, for example, one or more communication ports through which a peripheral device can be connected to the processor unit (either directly or indirectly through the bus). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, the remote computer system 400 may include a wireless data "port," such as a Bluetooth interface, a Wi-Fi interface, an infrared data port, or the like.

According to aspects of the disclosure, the transmission/reception system may be configured for communication with the transmitter 203 of the monitoring device via the above described transmission/reception systems and/or through any type of known electronic communications. If desired, in accordance with at least some examples of this invention, the remote computer system 400 may include a display and/or a user input system, such as one or more rotary input devices, switches, buttons, mouse or trackball elements, touch screens, or the like, or some combination thereof.

The display may be employed to show, for example, information relating to the golfing information signals being received by the remote computer system 400, etc. The user input system may be employed, for example: to control one or more aspects of the processing of the input data received, to control input data receipt (e.g., timing, types of information received, on-demand data requests, etc.), to control data output, to control the monitoring device, etc. Alternatively or additionally, if desired, the input system on the remote computer system 400 (e.g., buttons, a touch screen, a digitizer/stylus based input, a rotary input device, a trackball or roller ball, a mouse, etc.), may be used to provide user input data to the monitoring device 201. As still another example, if desired, a voice input system may be provided with the interface device and/or the remote computer system 400, e.g., to enable user input via voice commands. Any other desired type of user input system, for control of any system elements and/or for any purpose, may be provided without departing from the scope of the disclosure. For example, the remote computer system 400 may include additional input and/or output elements, e.g., such as ports e.g., for headphones (or other audio output), power supplies, wireless communications, infrared input, microphone input, or other devices.

According to aspects of the disclosure, the remote computer system 400 may be, for example, portable audio and/or video players, cellular telephones, personal digital assistants, pagers, beepers, palm top computers, laptop computers, desktop computers, servers, or any type of computer controlled device, optionally a computer controlled device that generates or displays a human perceptible output and/or interface.

Figure 6B:
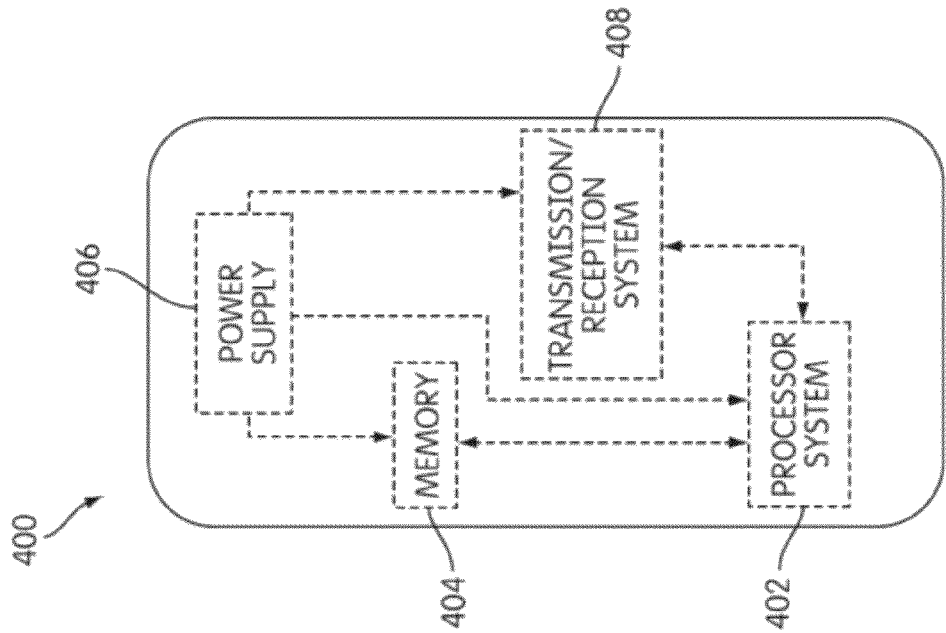
FIGS. 6A and 6B illustrate a remote computer system according to an illustrative embodiment of the disclosure.
Figure 6A:
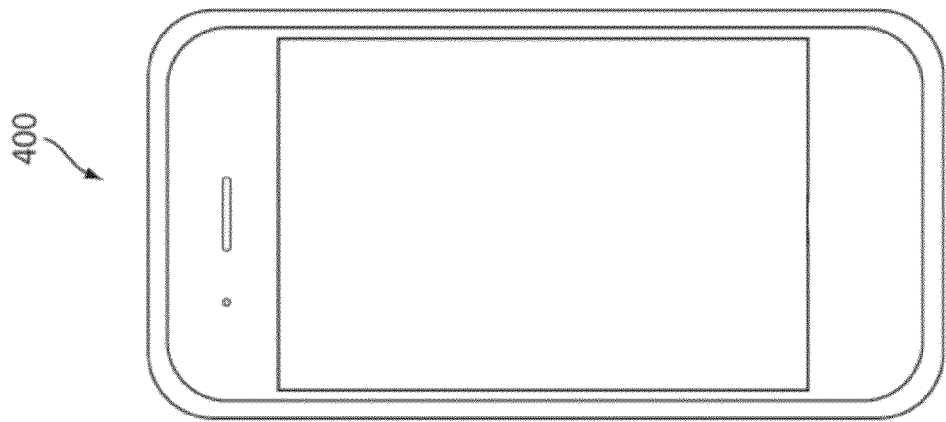

FIG. 6 illustrates one example of a remote computer system 400 that may be employed according to various examples of the invention to measure various information corresponding a golfer's abilities and game. As shown in this figure, the remote computer system 400 may be a cellular telephone (e.g., a Bluetooth enabled cellular telephone, such as an IPHONE®, BLACKBERRY®, DROID®, etc.). FIG. 6 also illustrates a schematic rendering of the remote computer system 400. As seen in FIG. 6, the cellular telephone may include a processor system 402, a memory 404, a power supply 406, and a data transmission/reception system (e.g., a wireless receiver or transceiver) 408. The memory 404 may include both a read-only memory (ROM) and a random access memory (RAM). As will be appreciated by those of ordinary skill in the art, both the read-only memory (ROM) and the random access memory (RAM) may store software instructions for execution by the processor system 400. The data transmission/reception system 408 may be configured to receive, from the transmitter 203, data that corresponds to the measured golfing parameter. Further, as shown, the data transmission/reception system 408 may be configured to provide the received data to the processor 402.

For example, according to aspects of the disclosure, the data transmission/reception system 408 receives the signals (e.g., processed or unprocessed signals) transmitted by the transmitter 203 in the monitoring device 201. The data transmission/reception system 408 may be configured to relay the signals to the processor 402, which processes the signals further. Like the processor 204, the processor 402 may perform any desired operation on the processed signals, such as curve smoothing, noise filtering, outlier removal, amplification, summation, integration, or the like.

According to aspects of the disclosure, the processor 402 may initially store the processed signals in a memory 404. Further, with some implementations of the disclosure, the processor 402 may operate on the processed signals provided by the monitoring device 201 to generate a set of data corresponding to the golf activity performed by the golfer. For example, if the monitoring device 201 includes accelerometers for measuring the acceleration of the golf club head 101, the processor 402 may analyze the signals from the monitoring device 201 to generate a set of data describing the acceleration of the golf club head 101 at specific instances during the golf swing. It is noted that the transmitted data set may also include a time value associated with each speed value.

Once the processor 402 has generated a set of data from the information provided by the monitoring device 201, the processor 402 may store the data set in the memory 404. As will be discussed in more detail below, when the remote computer system 400 subsequently is connected to a second computing device 500 implementing a golf information collection tool, the computing unit 404 may be configured download the data to a display configuration tool.

It is noted that the above described monitoring system (which includes the monitoring device 201 and the remote computer system 400) may be configured to be active, real-time transmitting systems that provides data to the remote computer system 400 as the golf activity is taking place. Optionally, if desired, the remote computer system 400 may be configured to provide the golfer with real-time performance feed back (e.g., velocity of the golf club head, acceleration of the golf club head, the impact position of the golf ball on the ball striking face, path of the swing path of a particular swing, face angle of the ball striking face of the club head throughout the swing (e.g., during impact), etc.) while the golfing performance is taking place. The real-time performance feed back could be in the form of an audio or visual message. For example, if desired, the remote computer system 400 may be configured to provide an output based on the received data from the sensors 202, wherein the output provides feedback to the golfer in real time, such as when the athletic performance is taking place. For example, the output may be as a visual display such as an alphanumeric, video, or textual output. Additionally, or alternatively, the output may be an audio output, such as an audio tone, message, etc.

According to example aspects of the disclosure, the output may include a visual display provided on the display screen of the cellular telephone, wherein the visual display includes one of: a illustration of a swing path of a golf swing, a numeric value of a maximum acceleration of the golf club head 101 during a golf swing (and, if desired, at a particular time relative to the duration of the golf swing when that maximum acceleration was reached), a numeric value of the acceleration or velocity of the golf club head 101 at a particular time relative to the duration of the golf swing (e.g., the acceleration or velocity of the golf club head 101 during impact or on the backswing), the angle of the ball striking face 107 at a particular time relative to the duration of the golf swing (e.g., the angle of the ball striking face 107 during impact; this may be represented with characters (e.g., "Open Face", "Closed Face", etc.) or graphically (e.g., pictures of a golf club head with an "Open Face", "Closed Face", etc.), the impact location of the golf ball on ball striking face, messages (e.g., "Great Shot!" or "You Hit a Slice"), etc. Similarly, audio messages may be employed as well. For example, recorded messages (e.g., recorded by well known golfers) may be stored in the memory and played based on predefined circumstances being achieved.

It should be appreciated that, while some specific embodiments of the invention described above relate to a cellular telephone, alternate examples of the disclosure may be implemented using other portable electronic device. For example, with some implementations of the invention, the monitoring device 201 may be used in conjunction with a digital music or video player, a watch, a personal digital assistant, anther type of music player (such as a compact disc or satellite radio music player), a portable computer, or any other desired electronic device. For example, remote computer system 400 may be in the form of a wrist band, such as a watch or other wrist borne data receiving device, or an arm band, or other apparel. Therefore, it is understood that while several examples of the remote computer system 400 are described above, the remote computer system 400 may take on a variety of different forms without departing from the scope of the disclosure.

It is noted, that if the remote computer system 400 does not have an internal electronic interface device (e.g., if the remote computer 400 is a digital music player, such as an iPod®, the data transmission/reception system 408 (e.g., the receiver or transceiver) may be a separate device which is configured to engage with the remote computer system 400. For example, the data transmission/reception system 408 may include a connector system that physically plugs into and connects with a conventional input port provided on remote computer system 400. The input port into which the connector system of the data transmission/reception system 408 connects may be any desired type of input port for transferring data, such as a parallel data port, a serial data port, an earphone or microphone jack, etc. The connector system may include any suitable connecting devices, such as wires, pins, electrical connectors, and the like, so as to make an electrical connection or other suitable connection with corresponding elements provided in the input port of the remoter computer system 400 (e.g., to allow electronic and/or data communications between the remote computer system and the electronic interface device). If necessary or desired, additional securing elements may be provided to securely connect the interface device to the remote computer system 400, such as straps, hooks, buckles, clips, clamps, clasps, retaining elements, mechanical connectors, and the like. In this way, when the external data transmission/reception system 408 is engaged with the remote computer system 400, the remote computer system 400 may communicate wirelessly with the monitoring device 201.

Figure 7A:
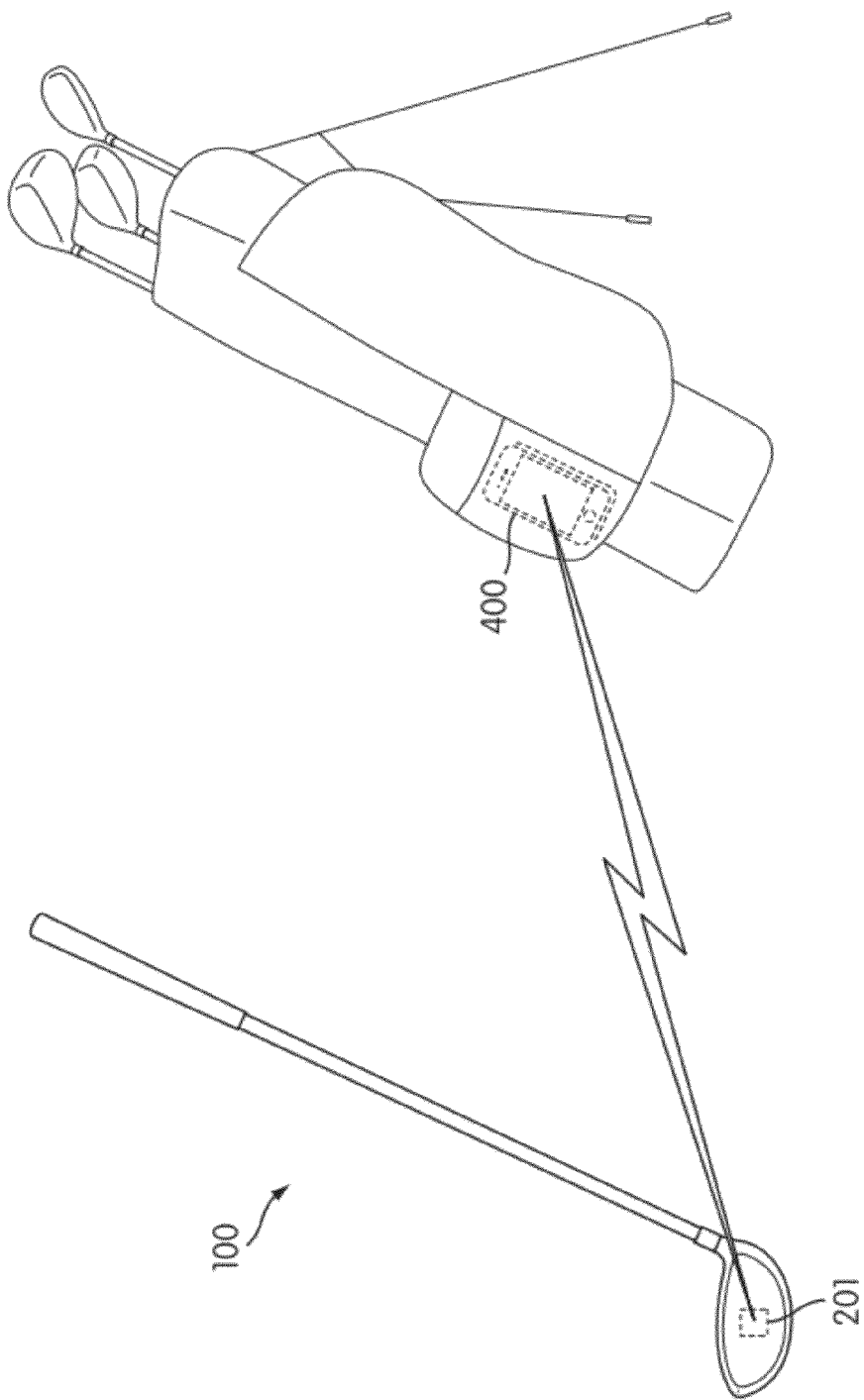
FIGS. 7A and 7B illustrate wireless communication between the monitoring device and the remote computer system according to an illustrative embodiment of the disclosure.
Figure 7B:
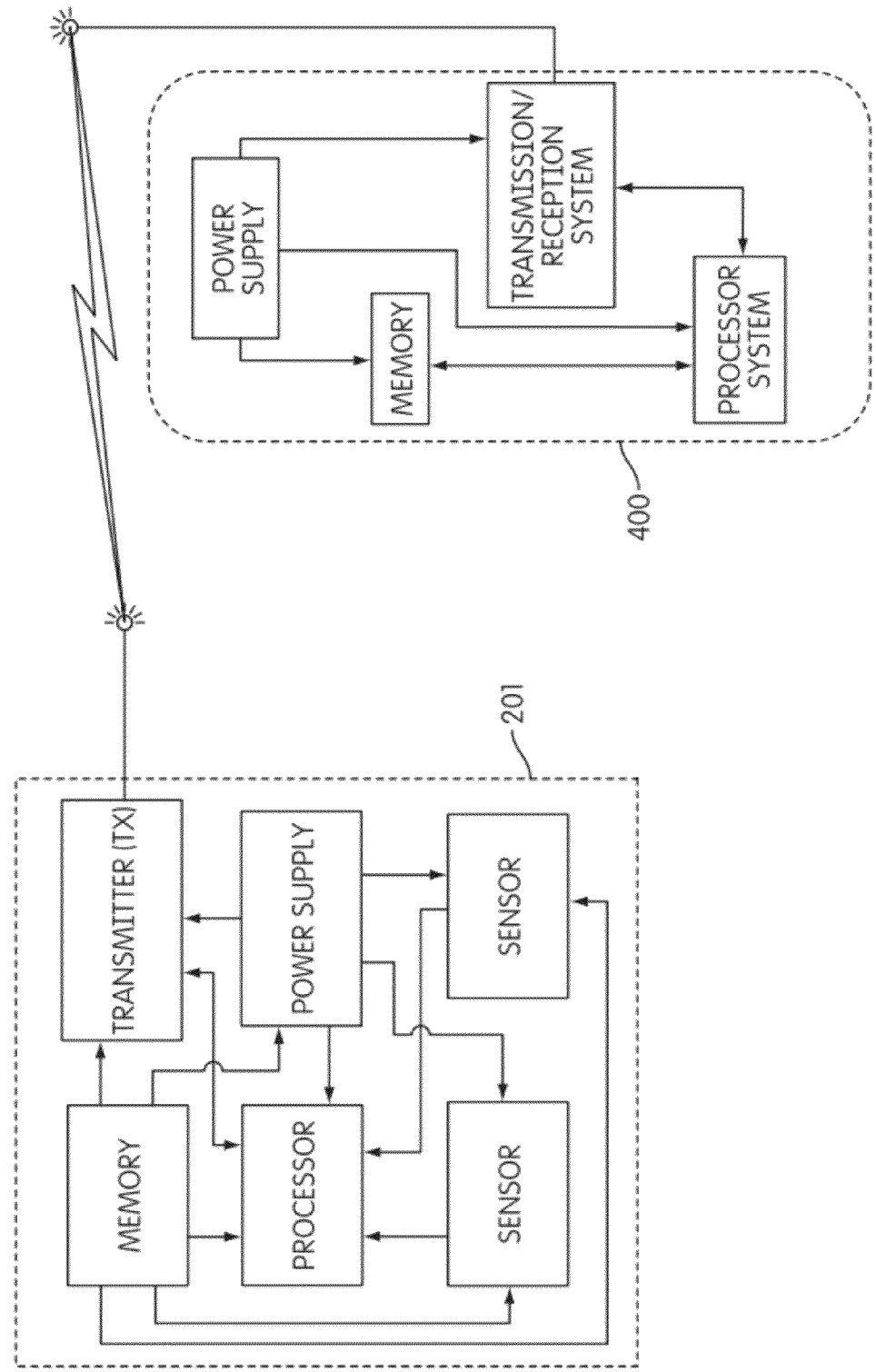

FIGS. 7A and 7B show an illustrative transmission from the monitoring device 201 to the remote computer system 400 according to aspects of the disclosure. Specifically, FIG. 7B illustrates the transmitter (or transceiver) 203 of the monitoring device 201 communicating with the transmission reception system 408 of the remote computer 400. As described above, in embodiments in which the monitoring device 201 includes a transceiver 203, the communication may be two-way, i.e., from the transceiver 203 to the transmission reception system 408 of the remote computer 400 and, also, from the transmission reception system 408 to the transceiver 203. However, in embodiments in which the monitoring device 201 includes a transmitter 203, the communication will be one way, i.e., from the transmitter 203 to the transmission reception system 408 of the remote computer 400.

According to aspects of the disclosure, the determination of data by the monitoring device 201 and the transmission of data between the monitoring device 201 and the remote computer 400 may be performed in a variety of ways.

For example, according to a first method in which the monitoring device 201 determines data and then communicates the data to the remote computer 400, the monitoring device 201 includes sensors 202 (e.g., one or more accelerometers, one or more gyroscopes, and/or one or more magnetometers), a transmission module 203 (e.g., a transmitter or transceiver configured to transmit/receive data wirelessly (e.g., through RF, Bluetooth, Bluetooth2, etc.)), a processor 204 (e.g., microprocessor) and a power source 206 (e.g., a battery). Further, according to such a method, data determined by the monitoring unit is transmitted to the remote computer 400 (e.g., a portable telephone, a computer (e.g., a PC), a sport tablet, an electronic range finder, such as SKY CADDIE® available from SKY GOLF®), etc. Further, according to such a method, data may be determined by the sensors 202. Once the data is determined by the sensors, the processor 204 in the monitoring device 201 may use the data to calculate golf metrics or variables (e.g., a swing path representation as discussed) According to aspects of the method, the golf metrics or variables may be transmitted wirelessly via the transmission module 203 to the remote computer 400. Alternatively, according to other aspects of the method, the golf metrics or variables may be stored in a memory in the monitoring device 201. Afterwards, (e.g., after a number of golf shots), the golf metrics or variables may be transmitted wirelessly via the transmission module 203 to the remote computer 400. According to aspects of this method, the remote computer 400 may be configured to store the golf metrics or variables, communicate the golf metrics or variables to the user, e.g., through video or audio means, and/or further transmit the golf metrics or variables to other devices.

According to another method in which the monitoring device 201 determines data and then communicates the data to the remote computer 400, the monitoring device 201 includes sensors 202 (e.g., one or more accelerometers, one or more gyroscopes, and/or one or more magnetometers), a transmission module 203 (e.g., a transmitter or transceiver configured to transmit/receive data wirelessly (e.g., through RF, Bluetooth, Bluetooth2, etc.)), a processor 204 (e.g., a microprocessor) and a power source 206 (e.g., a battery). Further, according to such a method, data determined by the monitoring unit is transmitted to the remote computer 400 (e.g., a portable telephone, a computer (e.g., a PC), a sport tablet, an electronic range finder, such as SKY CADDIE® available from SKY GOLF®), etc. Further, according to such a method, data may be determined by the sensors 202. Once the data is determined by the sensors, the processor 204 in the monitoring device 201 may use the data to calculate kinematics (e.g., computed acceleration data). According to aspects of the method, the kinematics may be transmitted wirelessly via the transmission module 203 to the remote computer 400. For example, the kinematics may be transmitted during each golf shot or after each golf shot. Alternatively, according to other aspects of the method, the kinematics may be stored in a memory in the monitoring device 201. Afterwards, (e.g., after a number of golf shots or whenever the golfer desires), the kinematics may be transmitted wirelessly via the transmission module 203 to the remote computer 400. Regardless of when the kinematics are transmitted from the monitoring device 201 to the remote computer 400, once the kinematics are received by the remote computer 400 (e.g., via the transmission reception system 408), the remote computer 400 may be configured to process the kinematics to calculate golf metrics or variables. According to aspects of this method, the remote computer 400 may be configured to store the golf metrics or variables, communicate the golf metrics or variables to the user, e.g., through video or audio means, and/or further transmit the golf metrics or variables to other devices.

According to another method in which the monitoring device 201 determines data and then communicates the data to the remote computer 400, the monitoring device 201 includes sensors 202 (e.g., one or more accelerometers, one or more gyroscopes, and/or one or more magnetometers), a transmission module 203 (e.g., a transmitter or transceiver configured to transmit/receive data wirelessly (e.g., through RF, Bluetooth, Bluetooth2, etc.)), a processor 204 (e.g., a microprocessor) and a power source 206 (e.g., a battery). Further, according to such a method, data determined by the monitoring unit is transmitted to the remote computer 400 (e.g., a portable telephone, a computer (e.g., a PC), a sport tablet, an electronic range finder, such as SKY CADDIE® available from SKY GOLF®), etc. Further, according to such a method, data may be determined by the sensors 202. Once the data is determined by the sensors, the processor 204 in the monitoring device 201 may use the data to calculate individual processed sensor signals (e.g., processed electrical signals from the sensors). According to aspects of the method, the individual processed sensor signals may be transmitted wirelessly via the transmission module 203 to the remote computer 400. For example, the individual processed sensor signals may be transmitted during each golf shot or after each golf shot. Alternatively, according to other aspects of the method, the individual processed sensor signals may be stored in a memory in the monitoring device 201. Afterwards, (e.g., after a number of golf shots or whenever the golfer desires), the individual processed sensor signals may be transmitted wirelessly via the transmission module 203 to the remote computer 400. Regardless of when the individual processed sensor signals are transmitted from the monitoring device 201 to the remote computer 400, once the individual processed sensor signals are received by the remote computer 400 (e.g., via the transmission reception system 408), the remote computer 400 may be configured to process the individual processed sensor signals to calculate golf metrics or variables. According to aspects of this method, the remote computer 400 may be configured to store the golf metrics or variables, communicate the golf metrics or variables to the user, e.g., through video or audio means, and/or further transmit the golf metrics or variables to other devices.

According to another method in which the monitoring device 201 determines data and then communicates the data to the remote computer 400, the monitoring device 201 includes sensors 202 (e.g., one or more accelerometers, one or more gyroscopes, and/or one or more magnetometers), a transmission module 203 (e.g., a transmitter or transceiver configured to transmit/receive data wirelessly (e.g., through RF, Bluetooth, Bluetooth2, etc.)), a power source 206 (e.g., a battery). Further, according to such a method, data determined by the monitoring unit 201 is transmitted to the remote computer 400 (e.g., a portable telephone, a computer (e.g., a PC), a sport tablet, an electronic range finder, such as SKY CADDIE® available from SKY GOLF®), etc. Further, according to such a method, data may be determined by the sensors 202. Once the data is determined by the sensors, data may be transmitted wirelessly via the transmission module 203 to the remote computer 400. For example, the data may be transmitted to the remote computer 400 without being processed (e.g., raw data such as electrical signals from the sensors). According to such a method, the unprocessed data may be transmitted during each golf shot or after each golf shot. Alternatively, according to other aspects of the method, the unprocessed data may be stored in a memory in the monitoring device 201. Afterwards, (e.g., after a number of golf shots or whenever the golfer desires), the unprocessed data may be transmitted wirelessly via the transmission module 203 to the remote computer 400. Regardless of when the unprocessed data is transmitted from the monitoring device 201 to the remote computer 400, once the unprocessed data is received by the remote computer 400 (e.g., via the transmission reception system 408), the remote computer 400 may be configured to process the unprocessed data to calculate golf metrics or variables. According to aspects of this method, the remote computer 400 may be configured to store the golf metrics or variables, communicate the golf metrics or variables to the user, e.g., through video or audio means, and/or further transmit the golf metrics or variables to other devices.

While the above methods described various methods for determining data by the monitoring device 201 and the communicating the data between the monitoring device 201 and the remote computer 400, they should not be construed as limiting. In contrast, they are provided to assist the reader with understanding the disclosure and other methods for determining data by the monitoring device 201 and the communicating the data between the monitoring device 201 and the remote computer 400 may be considered within the scope of the disclosure.

It also should be appreciated that, while specific examples of monitoring devices 201 have been described above for ease of understanding, any type of desired monitoring device 201 can be employed with various embodiments of the disclosure. For example, according to aspects of the disclosure, the monitoring device 201 may be configured to engage with the shaft 103 of the golf club 100. For example, the monitoring device 201 may be configured with a shape and size such that the monitoring device 201 is able to be positioned within the grip 105 of the golf club.

Figure 8:
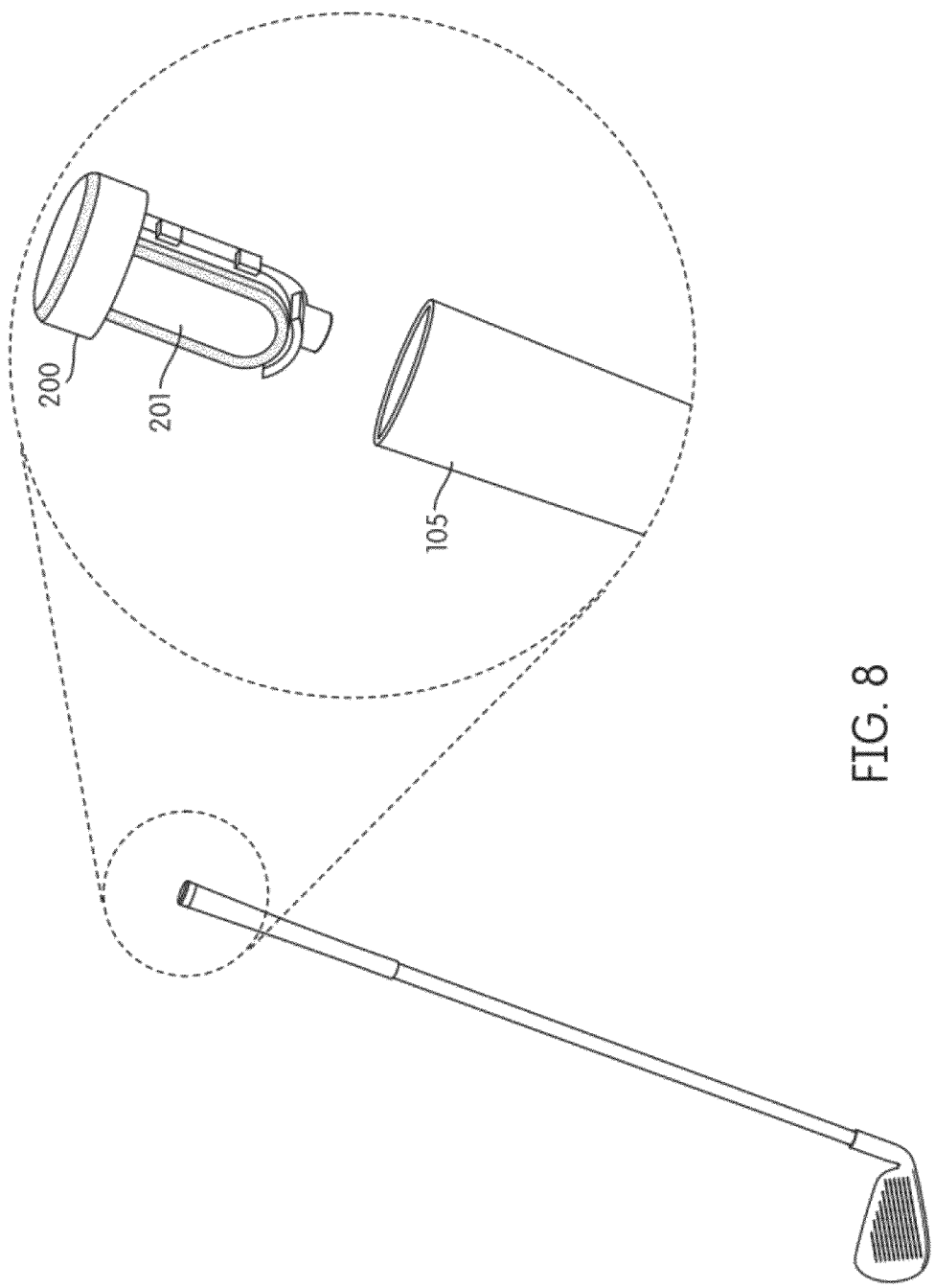
FIG. 8 is a perspective view of another embodiment of a golf club according to an illustrative embodiment of the disclosure, including an exploded view of a grip portion of the golf club having a cartridge supporting a monitoring device.

For example, according to aspects of the disclosure, the grip 105 may be configured to receive a removable section or cartridge 200. Further, the removable section 200 may be configured to receive the monitoring device 201. FIG. 8 shows an illustrative embodiment of such aspects of the disclosure.

As seen in FIG. 8, the removable section 200 may include a circular portion which forms the top of the shaft and, also, an elongated portion configured to house the monitoring device 201. According to aspects of the disclosure, the elongated portion of the removable section 200 may include guides to aid in positioning and securing the monitoring device 201 within the removable section 200. It is noted that the removable section 200 may be configured to secure the monitoring device 201 in such a way that the monitoring device 201 does not move within the removable section 200. For example, the removable section 200 may be configured to engage with the monitoring device 201 (e.g., a compartment which includes the exterior of the monitoring device 201) via press fitting, snap fit mechanisms (e.g., spring loaded protrusions and corresponding detents), mechanical fasteners, etc. For example, the elongate portion may includes a first arched end configured to engage a first rounded end of the compartment, a second arched end configured to engage a second rounded end of the compartment and a back portion which extends between the first arched portion and the second arched portion and is configured to engage a side of the compartment. In this way, the removable section 200 may be configured to support and stabilize the monitoring device 201. For example, the elongate portion may be configured to secure the compartment which may be rectangular with first and second rounded ends and have a length in the range of 1.0-1.5 inches, a width of 0.4-1.0 inches and thickness of 0.2-0.45 inches. According to aspects of the disclosure, the removable section 200 may be made of plastic. It is noted that other materials, such as rubber, or combinations thereof may be used as well.

The removable section or cartridge 200 may be configured to be engaged with the grip 105 in a variety of ways. For example, the grip 105 may be configured with an opening at its terminal end that is configured to receive the removable section 200. Further, the grip 105 may be configured with guides within the interior of the grip 105 that guide the removable section during insertion into the grip 105. Also, the grip may be configured with a locking mechanism, such as threads which line the interior of the grip 105. The removable section 200 may include a corresponding structure through which the removable section 200 is engaged and locked with the grip 105 upon twisting the removable section 200 into the grip 105. Alternatively, the removable section 200 may be configured to engage with the grip 105 via press fitting, snap fit mechanisms (e.g., spring loaded protrusions and corresponding detents), other mechanical fasteners, etc.

Figure 8A:
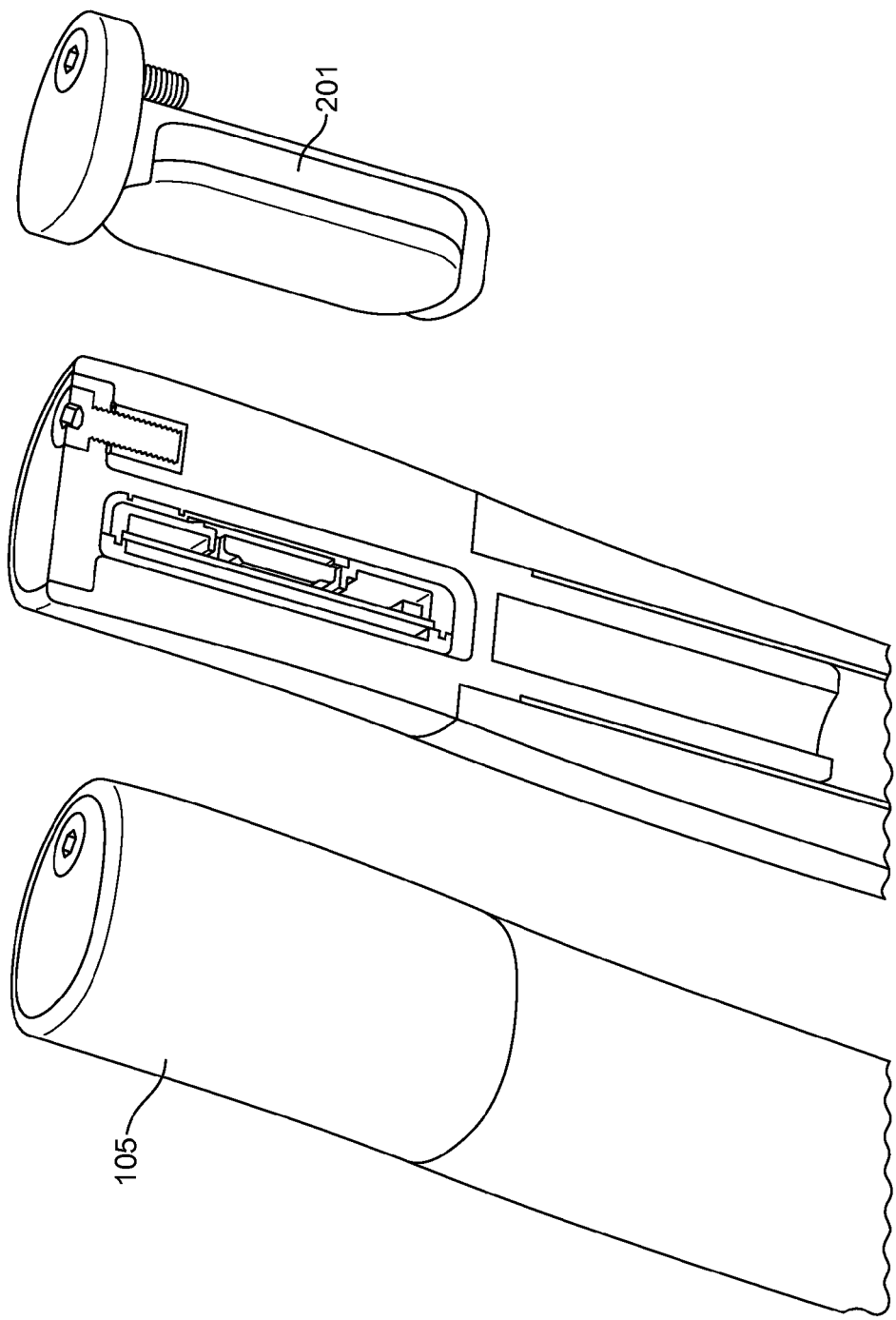
FIG. 8A is a perspective view of another embodiment of a golf club according to an illustrative embodiment of the disclosure, including an exploded view of a grip portion of the golf club configured to receive a monitoring device.

FIG. 8A illustrates an exploded view of another embodiment of a removable section or cartridge according to aspects of the disclosure. For example, as seen in FIG. 8A, the cartridge 200 may be configured to fit within a top portion of the grip 105. The top portion of the grip 105 may include a first portion which is configured to receive the cartridge supporting the monitoring device 201 and a second portion configured to engage with the interior of the shaft 103 of the golf club. Hence, the top portion of the grip 105 may be configured to removably fit within the golf club shaft 103. The removable top portion of the grip and the cartridge 200 may be configured to be attached to each other. For example, as seen in FIG. 8A, the cartridge 200 and the top portion of the grip 105 may be configured to be fastened together by a threaded fastener. For example, the circular portion of the removable section 200 may include an orifice configured to receive a threaded fastener and configured to align with a second orifice in the top portion of the grip 105 configured to receive the threaded fastener. Further, as seen in FIG. 8A, the first portion of the grip 105 configured to receive the cartridge supporting the monitoring device 201 may be configured to surround and securely hold the cartridge 200 and thereby further protect the monitoring device 201 from damage due to impact or the elements. It is understood that the monitoring device 201 held in the cartridge 200 can take any of the various exemplary embodiments as described herein. The cartridge 200 includes holder members that cooperatively engage the monitoring device 201 in an interference fit in an exemplary embodiment. The cartridge 200 fits flush in the end of the grip portion of the golf club and may include a screw fastener. Other fastening mechanisms such as snap-fitting configurations or interference fittings as well as other mechanical configurations may also be included.

Figure 9:
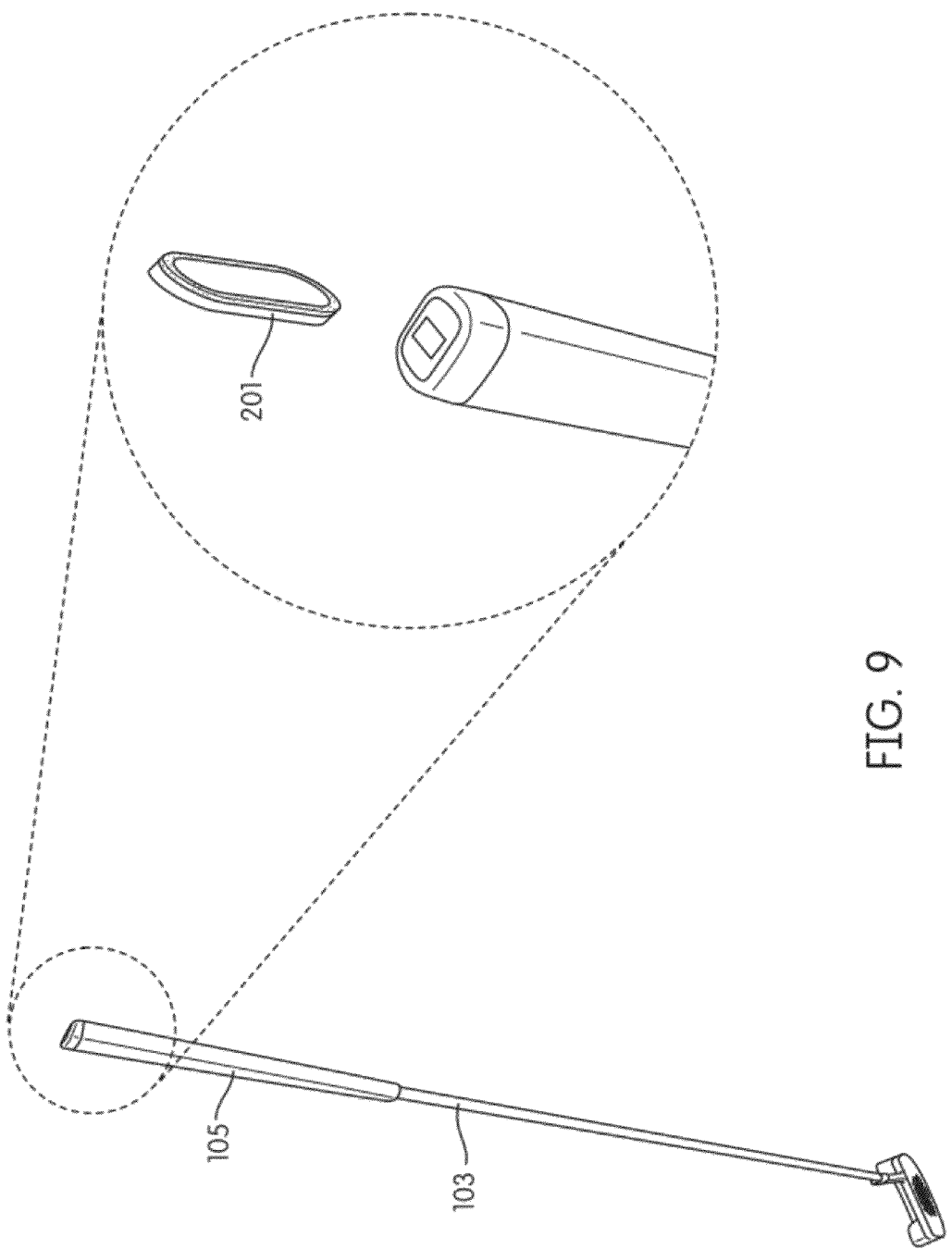
FIG. 9 is a perspective view of another embodiment of a golf club according to an illustrative embodiment of the disclosure, including an exploded view of a grip portion of the golf club having a monitoring device.

According to other aspects of the disclosure, the grip 105 may be configured to receive and secure the monitoring device 201 directly, without the inclusion of a separate removable section or cartridge 200. FIG. 9 shows an illustrative embodiment of such aspects of the disclosure.

The monitoring device 201 may be configured to be engaged with the grip 105 in a variety of ways. For example, the grip 105 may be configured with an opening at its terminal end that is configured to receive the monitoring device 201. For example, as seen in FIG. 9, the grip 105 may include a slit that is configured to receive the monitoring device 201 when the monitoring device 201 is inserted into the grip along the monitoring device's longitudinal axis. The slit may be configured to provide a tight interference fit with the monitoring device 201. It is noted that in this way, the grip 105 may be configured to secure the monitoring device 201 such that the monitoring device 201 does not move within the grip 105. In this way, the removable section 200 may be configured to support and stabilize to the monitoring device 201.

Further, the grip 105 may be configured with guides within the interior of the grip 105 that guide the monitoring device 201 during insertion into the grip 105. Also, the grip may be configured with a locking mechanism, such as a cover which includes flaps through which the monitoring device is inserted. It is noted that monitoring device 201 may be configured to engage with the grip 105 via other methods as well, including snap fit mechanisms (e.g., spring loaded protrusions and corresponding detents), other mechanical fasteners, etc.

While, the engagement of the monitoring device 201 and the removable section 200 with the shaft is described above with respect to the grip 105, it is noted that, alternatively, the shaft 103 may be configured to receive the monitoring device 201 and/or the removable section 200 at the butt end of the shaft 103. Further, the interior of the shaft 103 may be configured to position the monitoring device 201 at any point along the length of the shaft 103 (e.g., at the butt end, the grip end, the center, etc.).

According to aspects of the disclosure, the grip end of the shaft 103 (or a portion thereof) may be removable to allow the monitoring device 201 to be inserted. Additionally, or alternatively, as described above, the butt end of the shaft may be removably engaged with the golf club head 101. Hence, the monitoring device 201 may be inserted into that end of the shaft 103 as well. Further, it is noted that, if desired, more than one monitoring device 201 may be inserted into the shaft 103 in order to measure various different locations or different portions of the shaft 103 during the golf swing.

According to aspects of the disclosure, golf club 101 may include a monitoring device 201 in both the shaft 103 and in the golf club head 101. For example, the golf club 101 may include two monitoring devices 201, such as a first monitoring device 201 which is positioned in the grip 105 (such as shown in FIG. 8) and a second monitoring device 201 which is positioned in the golf club head 101 such as shown in FIG. 5D. In such embodiments, wherein the golf club 101 includes a first monitoring device 201 positioned in the grip 105 and a second monitoring device 201 positioned in the golf club head 101, data may be collected from both monitoring devices and used together in one of the manners described above with regard to providing golf metrics and variables. For example, the first monitoring device 201 positioned in the grip 105 and a second monitoring device 201 positioned in the golf club head 101 may be configured to collect data related to different aspects of a golf swing. For example, first monitoring device 201 positioned in the grip 105 may collect data regarding acceleration while the second monitoring device 201 positioned in the golf club head 101 may collect data regarding the angle of the golf club (or club head) during a golf swing (e.g., relative to one or more reference points), or the impact of the ball with the golf club head during a golf swing. Such data may be combined in calculating the golf metrics in order to provide more detailed feedback to the golfer. It is noted that according to other aspects of the disclosure, the first monitoring device 201 positioned in the grip 105 and a second monitoring device 201 positioned in the golf club head 101 may be configured to collect data related to the same or similar aspects of a golf swing. For example, both the first and second monitoring devices 201 may be configured to collect data related to acceleration. Again, such data may be combined in calculating the golf metrics in order to provide more detailed feedback to the golfer. Such golf metrics that may be determined by one or more of the monitoring devices may include bending, torsion, deflection, kick, etc. of the shaft during a golf swing.

Further, is noted that, if desired, strain gauges may be used in conjunction with the monitoring device 201 in order to provide measurements regarding the axial strain, bending moments or other characteristics of the shaft 103 or other features of the golf swing. Such data may be combined in calculating the golf metrics in order to provide more detailed feedback to the golfer. Such strain gauges are known in the art and will not be elaborated on here for the sake of brevity.

As discussed above, according to particular embodiments of the disclosure, the monitoring device 201 may also be configured to identify the particular golf club in which the monitoring device 201 is engaged. For example, golf club 100 may include a chip (e.g., an RFID chip) which communicates with the monitoring device 201 when the cartridge 200 or the monitoring device 201 is engaged with the golf club 100. This could be through direct electrical connection, wireless transmission, etc. The chip may be configured to indicate to the monitoring device 201 with which golf club the monitoring device 201 is engaged. Of course, other methods of identification may be used as well. For example, prior to use, the monitoring device 201 may be programmed such that it reflects the golf club with which it will be used prior to even being engaged with the golf club head 202.

Regardless of how the monitoring device 201 is aware of the particular golf club with which it is engaged, according to aspects of the disclosure, such information may be incorporated with the data collected from the sensors 202 of the monitoring device 201. For example, the characteristics of a particular golf shot (e.g., the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, etc) may be coordinated with the particular golf club with which the shot was made (e.g., the processor 204 of the monitoring device may be configured to calculate and coordinate such data).

Such coordinated identification information may then be transmitted by the transmitter 203 and/or stored in a memory (if applicable) along with the data from the sensors 202 (e.g., through methods such as discussed above). Of course, the identification information and the data from the sensors 202 may be coordinated at the remote computer system 400 if desired (e.g., through methods such as discussed above). Regardless of where the identification information and data from the sensors or golf metrics are coordinated, such coordinated information may be included with a data set generated from the information provided by the monitoring device 201.

According to aspects of the disclosure, the processor 204 of the monitoring device 201 or remote computer system 400 may use such golf club identification information and data from the sensors 202 of the monitoring device 201 to determine an estimated distance of the golf shot. For example, the remote computer system 400 may be configured to use characteristics of the golf swing (e.g., velocity of the golf club head at impact, the angle of the golf club head at impact, etc.) and the particular golf club with which the golf shot was taken in order to estimate the distance and the direction the golf ball will travel. Such information may be useful to the golfer. For example, if the remote computer system 400 is a portable electronic device that the golfer has during a round of golf, the golfer may consult a remote computer system and use such information to potentially find a lost golf ball. Of course, the data may be used for other purposes as well. For example, the golfer's round of golf may be tracked and used for later analysis, such as to determine potential tendencies or habits in a golfer's swing of a particular golf club.

As discussed above, according to aspects of the disclosure, the monitoring device 201 may include a GPS technology. For example, the monitoring device 201 may include a GPS device which determines the location of the golf club 100 in which the monitoring device 201 is engaged. Alternatively, the golf club 100 may include a separate GPS device (e.g., a GPS transmitter/transceiver and, if desired, a processor). According to aspects of the disclosure, the location information may be incorporated with data determined by the sensors of monitoring device 201. For example, the action of a golf swing may be determined by the sensors 202 of the monitoring device 201). Hence, by coordinating such data with the location information from the GPS device (in a manner similar to the methods described above), the location of each golf shot taken during a round of golf may be determined.

Further, according to aspects of the disclosure, the above described location of each golf shot may be incorporated with maps of the golf course on which the golf shots were taken in order to provide a golfer with information on each golf shot during a round of golf. For example, according to aspects of the disclosure, maps of the golf course may be downloaded to the remote computer system 400. Thereafter, the golf shots (determined in a manner such as described above) may be superimposed or otherwise represented on the maps of the golf course in order to represent the golfer's round of golf.

Further, according to aspects of the disclosure, the above described location of a particular golf shot on the golf course may be incorporated with the data collected from the sensors 202. For example, the characteristics of a particular golf shot (e.g., the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, etc) may be coordinated with the location on the golf course at which that particular golf shot was taken.

Further, according to aspects of the disclosure, the above described location of a particular golf shot on the golf course may be incorporated with information about the particular golf club with which the golf shot was taken. For example, such aspects of the determining the particular golf club with which a shot is take are described above and may be used in combination with the above described GPS technology. Further, such coordinated information may be included with a data set generated from the information provided by the monitoring device 201. For example, based on the data transmitted by the monitoring device 201, it may be determined that a golfer used a 3-iron to make a golf shot at a point 170 yards from the flag at the $2^{nd}$ hole of a golf course.

Some or all of the above described determining information, such as determined golf swing characteristics (e.g., the velocity of the golf club (or club head) during a golf swing, the acceleration of the club (or club head) during a golf swing, the angle of the golf club (or club head) during a golf swing (e.g., relative to one or more reference points), swing tempo, the impact of the ball with the golf club head during a golf swing, etc), golf club identification, location of the golf shot, golf course positioning information, etc., (including combinations and permutations thereof) may be coordinated and the coordinated information may be included with a data set generated from the information provided by the monitoring device 201. Therefore, according to aspects of the disclosure, detailed information of the practice session or round of golf may be recorded and analyzed.

According to aspects of the disclosure, the remote computer system 400 does not have to be a portable computer system. For example, as discussed above, the remote computer system 400 may be a desktop computer or other type of computer system. In such embodiments, the data collected by the monitoring device 201 may be stored locally in a memory as described above.

When the golfer has finished the practice session or round, the golfer may disengage the monitoring device 201 from the golf club head and engage it with the remote computer system 400 in order to transmit the data to the remote computer system 400. It is noted, that any type of connection system may be used without departing from the scope of the disclosure, including a wireless connection, a hardwired connection, connection via an input port (such as a USB port, or the like), etc. For example, according to some aspects of the disclosure, the monitoring device 201 does not have to be disengaged from the golf club head 101 and instead can transmit the data to the remote computer system 400 wirelessly. Other data storage and/or transmission arrangements also are possible without departing from the scope of the invention. For example, any desired way of placing data derived from the physical data from the monitoring device 201 in the proper form or format for communication to the remote computer system 400 may be provided without departing from the invention.

It is noted that according to some aspects of the disclosure, the monitoring device 201 may be configured to transmit data to the remote computer system 400 (e.g., a portable computer system, such as a cellular telephone) and the remote computer system 400 may be configured to transmit data to a secondary computer system (such as a desktop computer). For example, the remote computer system 400 may be connected to the secondary computer via a USB cable or other connection. Alternatively, a wireless connection such as described above may be used as well. In such a configuration, wherein the remote computer system 400 is portable, it could be used during play (e.g., at a practice session on a driving range or on the course during play) to give real time feedback to the golfer (e.g., during the round or practice session). Thereafter, the data from the portable remote computer system 400 may be downloaded to the secondary computer system for further analysis.

Additional aspects of this disclosure relate to the presentation of data to the golfer, coach, or other person(s). Such systems help the golfer measure and track his or her capabilities, mark improvements over time, determine areas that require additional work, etc. Data can be collected over single rounds of golf, portions of rounds of golf, single practices, portions of practices, multiple rounds of golf (or portions thereof), multiple practices (or portions thereof), multiple seasons (or portions thereof), etc.

Figure 9A:
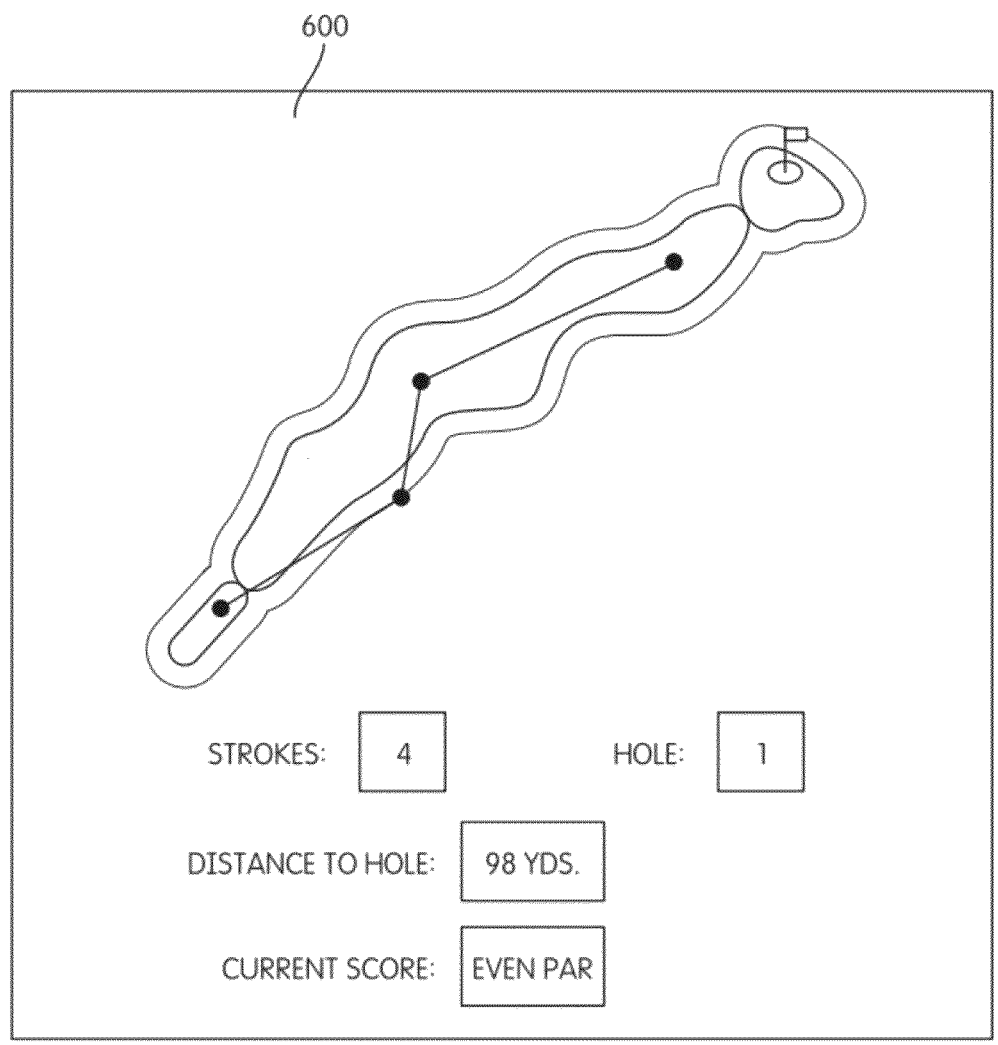
FIG. 9A is an illustrative user interface according to an embodiment of the disclosure.

FIG. 9A illustrates an example user interface screen 600 that may be used in systems and methods in accordance with at least some examples of this disclosure. As shown in FIG. 9A, the interface screen 600 may present much information to the player, including information relating to a specific round of golf or practice session, as well as information relating to more long term use of systems and methods in accordance with this disclosure. For example, as shown in FIG. 9A, user interface 600 may provide a display of the above described location of each golf shot incorporated with a map of the golf course on which the golf shots were taken in order to provide a golfer with information on each golf shot during a round of golf. For example, according to aspects of the disclosure, maps of the golf course may be downloaded to the remote computer system 400 and the golf shots (determined in a manner such as described above) have been superimposed on the map of the golf course in order to represent the golfer's round of golf. Further additional data may be displayed as shown.

Additionally, in accordance with this disclosure, other interfaces may provide information relating to: the overall total number of rounds of golf and/or practice sessions played by the golfer, the total overall strokes logged by the golfer using the system, the golfer's handicap over that time period, the golfer's top swing speed during those rounds or practice sessions, the number of times the golfer had an open club face during impact, the number of times the golfer had a closed club face during impact, the number of strokes that the club head was within a predetermined angle during a predetermined portion of the golf swing (e.g., the backswing or downswing), etc., the number of strokes that the club head was within a predetermined velocity or acceleration range during the entire or a predetermined portion of the golf swing, etc.

The interface may also provide information for an individual round or practice session (with the ability to select among the various stored rounds of golf or practice sessions on the system). For example, the interface may display information relating to the speed of the golf swing during this specific practice session. Also, if desired, the user interface could be adapted to allow user selection of various different metrics or information to be displayed.

Systems and methods in accordance with at least some examples of this disclosure may include "goals" or "challenges." While the goals may be set by the individual golfer for himself or herself, optionally, the goals or challenges may be set by others (e.g., a coach, etc.). For example, a user interface may present one or more data metric which includes "grayed out" blocks that represent a player's "goal" or "challenge" for that metric. For example, the data from a round of golf may be displayed with an indication of the player's performance in that round of golf (e.g., in blackened in boxes) along with an indication of where the golfer's performance stood with respect to their "goal" or "challenge" levels (e.g., in grayed out boxes). The specific metric for the "goal" or "challenge" may be displayed in any desired manner, e.g., by clicking on the last box associated with the goal or challenge, by hovering over a grayed-out box, through a continuous display, etc. For example, the system may indicate that the player's overall top swing speed goal or challenge is 70 mph, while in the present round they had only run at a top swing speed of 65 mph.

In the next round, however, if the golfer achieved his or her speed goal by swinging at 70 mph, the systems and methods in accordance with at least some examples of this disclosure may provide a congratulatory message (e.g., textually, visually, audibly, etc., note the changes in the display. Furthermore, if desired, in an effort to keep the golfer motivated, a new "goal" or "challenge" can be calculated and displayed for the golfer. Also, if desired, when presented as a challenge from a coach, systems and methods in accordance with at least some examples of this disclosure may send a message to the golfer (or offer to let the golfer compose a message to others (e.g., a coach)) to advise that the challenge had been met. Other "rewards," motivational information, or other interaction may be provided, if desired, without departing from the scope of this disclosure.

User interfaces for athletic performance monitoring systems and methods in accordance with this invention may take on a wide variety of forms and formats and provide a variety of different types of displays and information without departing from this invention. Displays of other metrics or combinations of metrics are possible without departing from the scope of this disclosure. Other graphical or other displays of the desired metric information also may be provided without departing from the scope of this disclosure.

According to aspects of the disclosure, data collected from the above described system and metrics determined by the above described system may be uploaded to a network. For example, similar to aspects of the NIKE+™ athletic performance monitoring systems, such data may be uploaded to and shared on various social networking sites like FACEBOOK® or TWITTER®. In particular, the user may be able to enable or disable activity broadcasts. Activity broadcasts may include the automatic sharing of completed rounds of golf, goals and challenges. Additionally or alternatively, the user may enable or disable a function that notifies other users (e.g., placing a post or status update on the user's network site page) whenever the user playing a round of golf or practicing at a driving range. This may enable other users to post messages of encouragement and to track the user's progress during the round of golf or the practice session. Golf data may also be posted to social network sites and social networking feeds mid-run and in real-time. Various other features and functions may also be configured by the user for sharing information.

Golfers may choose to share information or portions thereof with one or more other users, friends or through a social networking site. If the golfer chooses to share workout data through a social network site such as FACEBOOK® or TWITTER®, an interface may be displayed. Such an interface may include an automatically generated round of golf update message and allow the golfer to include additional information or notes. Upon approving the message, the user may publish the data to the social networking site by selecting publish option of the interface.

Figure 10:
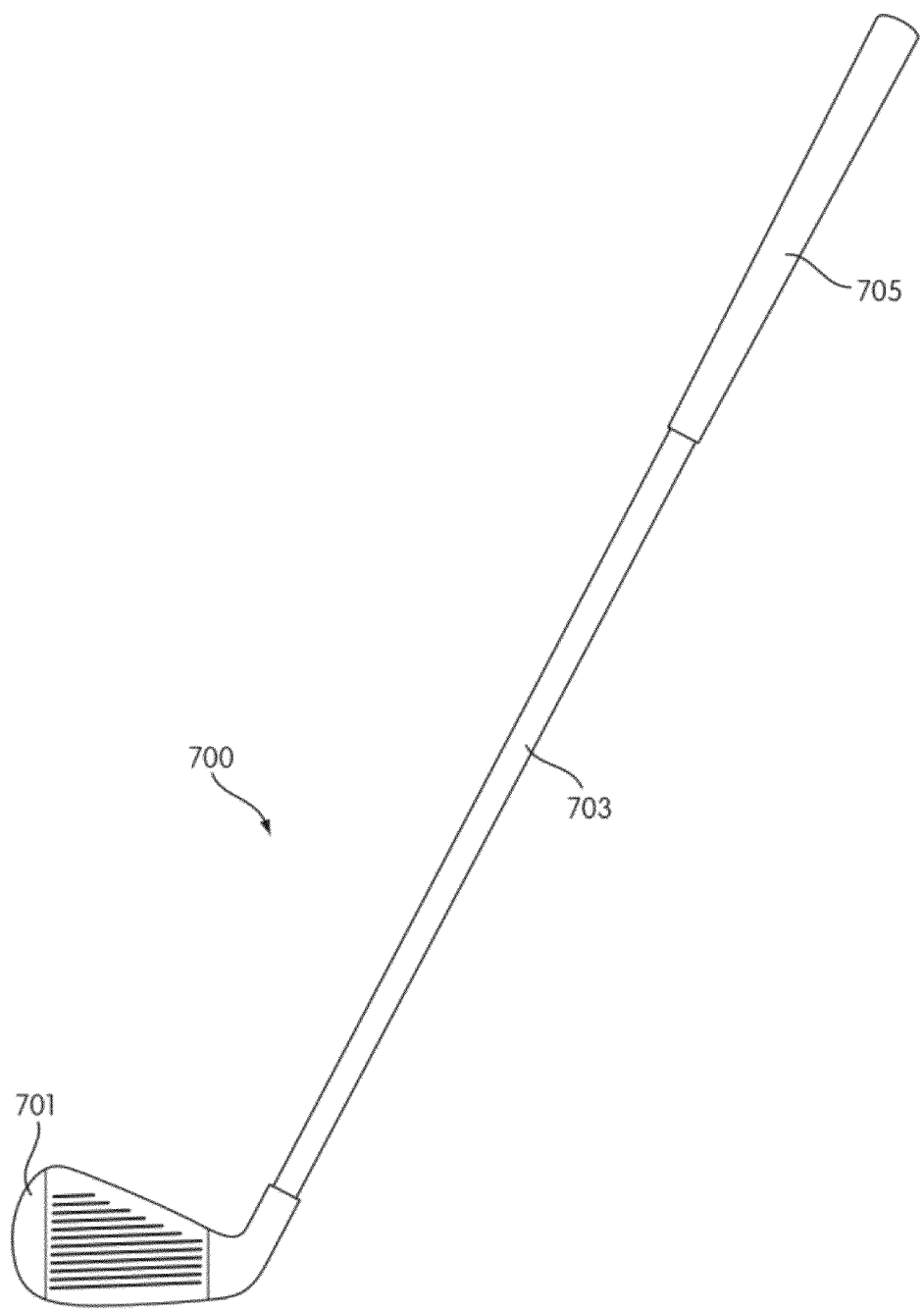
FIG. 10 is an illustrative embodiment of an iron-type golf club structure according to aspects of the disclosure.

While wood-type golf clubs and wood-type golf club heads have been described in detail above, other aspects of this disclosure relate to iron-type golf club heads and iron-type golf clubs. For example, FIG. 10 illustrates an example of an iron-type golf club 700 according to aspects of the disclosure. As seen in FIG. 10, the iron-type golf club 700 may include an iron-type golf club head 701 in accordance with the present disclosure.

In addition to the golf club head 701, the overall golf club structure 400 may include a shaft 703 and a grip or handle 705 attached to the shaft 703. The shaft 703 may be received in, engaged with, and/or attached to the golf club head 701 in any suitable or desired manner, including in conventional manners known and used in the art, without departing from the disclosure. As more specific examples, the shaft 703 may be engaged with the golf club head 701 through a shaft-receiving sleeve or element extending into the club head 701 (e.g., a hosel), and/or directly to the club head structure 701, e.g., via adhesives, cements, welding, soldering, mechanical connectors (such as threads, retaining elements, or the like). If desired, the shaft 703 may be connected to the golf club head 701 in a releasable manner using mechanical connectors to allow easy interchange of one shaft for another on the head. Also, the grip or handle 705 may be attached to, engaged with, and/or extend from the shaft 703 in any suitable or desired manner, including in conventional manners known and used in the art, e.g., using adhesives or cements, etc. The shaft 703 and the grip or handle 705 may be made from any suitable materials such as those described above with regard to the wood type golf club 100.

According to aspects of the disclosure, the golf club head 701 may also include a ball striking face (e.g., a ball striking face which includes a face plate) 711. According to aspects of the disclosure, the golf club head 701 may be constructed in any suitable or desired manner and/or from any suitable or desired materials without departing from this disclosure, including from conventional materials and/or in conventional manners known and used in the art. For example, the club head 701 and/or its various parts may be made by forging, casting, molding, and/or using other techniques and processes, including techniques and processes that are conventional and known in the art. According to aspects of the disclosure, the golf club head 701 may be a blade type iron golf club head. According to other aspects the golf club head 701 may be a perimeter weighted and/or cavity back type golf club head or other iron type golf club head structure.

Figure 11:
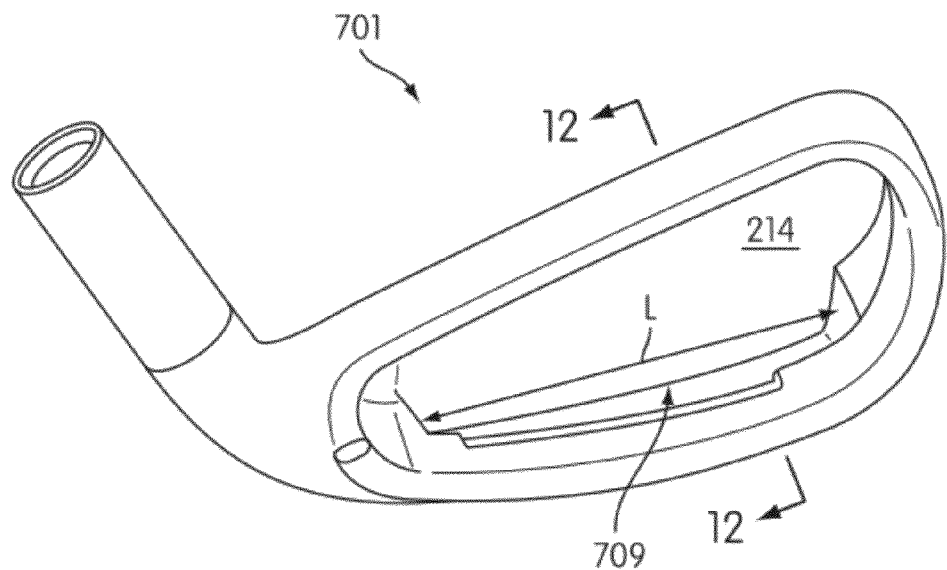
FIG. 11 is a rear view of the iron-type golf club head shown in FIG. 10 wherein a cartridge is removed from the iron-type golf club head.
Figure 12:
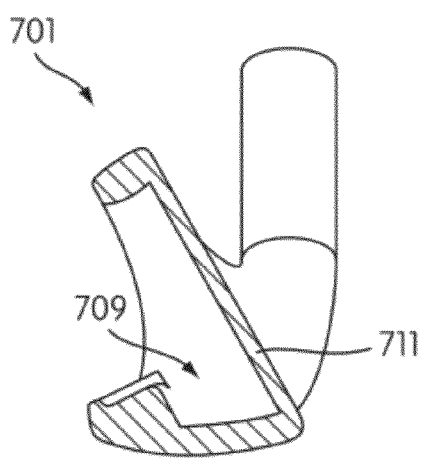
FIG. 12 is a cross-sectional view along line 12-12 of the iron-type golf club head shown in FIG. 11.

According to aspects of the disclosure, the golf club head 701 may include a crown, a sole, a toe end, and a heel end. Further, as seen in FIGS. 11 and 12 the golf club head 701 may include a cavity, or port, 709 behind the ball striking face 711. The port 709 may extend substantially along the length of the rear of the ball striking face 711.

Figure 13:
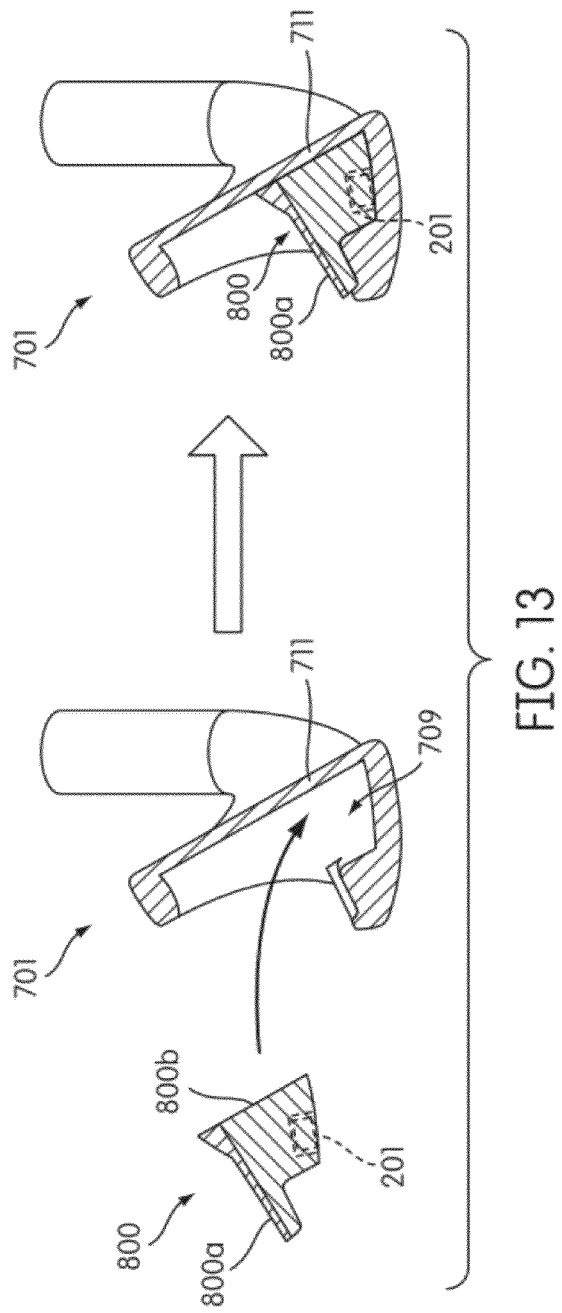
FIG. 13 is an exploded view of the iron-type golf club head shown in FIG. 10.
Figure 14:
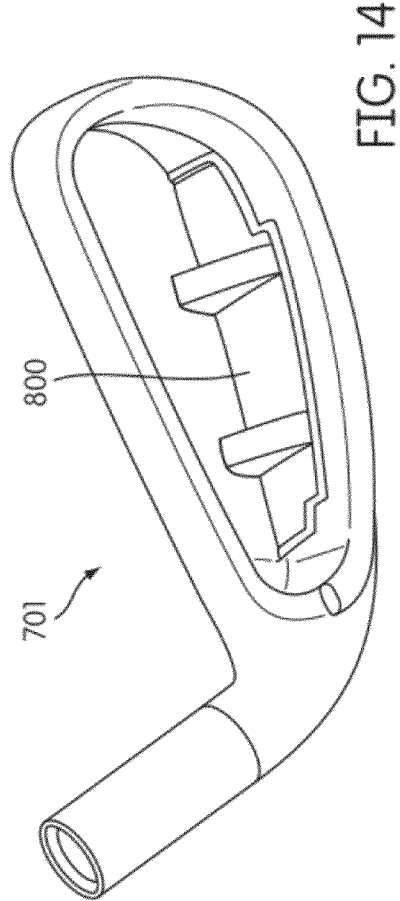
FIG. 14 is a rear view of the iron-type golf club head shown in FIG. 10 wherein the cartridge is inserted the iron-type golf club head.

According to aspects of the disclosure, and as seen in FIGS. 13 and 14, the port 709 may be configured to receive a cartridge 800. Further, if desired, cartridge 800 may be secured within to the golf club head 701 by securing means. It is noted, that the cartridge 800 may be secured in the port 709 of the golf club head 701 in a variety of ways. For example, as discussed above, according to aspects of the disclosure, the cartridge 800 may be removably engaged with the golf club head 701. Therefore, mechanical fasteners may be used to secure the cartridge 800 in the port 709. For example, example embodiments of the disclosure may include a cartridge 800 which is configured to be engaged with the golf club head 701 via press fitting, snap fit mechanisms (e.g., spring loaded protrusions and corresponding detents), threaded fasteners, etc. Other securing means, such as described above with regard to wood-type golf club, may be used as well.

According to example embodiments of the disclosure, the cartridge 800 may be configured with a first portion (e.g., an exterior portion) 800a. Further, according to example aspects of the disclosure, the cartridge 800 may include a second portion (e.g., an insert portion) 800b which is configured to be inserted into the interior of the port 709 of the golf club head 701. The cartridge 800 may be made from any desired materials and combinations of different materials such as described above with regard to cartridge 200.

The second portion may be configured to house a monitoring device 201 similar to the one described above with regard to the wood-type golf club. For example, the monitoring device 201 may be configured to house the sensors 202, the transmitter/transceiver 203, processor 204, power supply 206, memory, etc. The monitoring device 201, its capabilities and functions are similar to the monitoring device 201 described above and, therefore, for the sake of brevity, will not be elaborated on here. Further, the above described methods for determining and transmitting data to the remote computer 400 are applicable with the iron-type golf clubs as well and, therefore, will not be repeated for the sake of brevity.

While not shown in the depicted embodiment, aspects of the disclosure, relate to a weight cartridge which is configured to be engaged with the port 709. The weight cartridge may be configured similarly to the cartridge 800 described above with the exception that the weight cartridge does not include a monitoring device 201. It is noted that the weight cartridge may be configured to engage with the port 709 in the same manner as the corresponding cartridge 800. Hence, again, for the sake of brevity, the engaging and releasing structure of the weight cartridge and the port 709 will not be elaborated on here.

According to aspects of the disclosure, when the golfer does not want to have the monitoring device 201 housed within the golf club 700, the golfer may disengage and remove the cartridge 800 from the port 709 of the golf club head 701 and engage and secure the weight cartridge with the port 709 of the golf club head 701. It is noted that according to aspects of the disclosure, the weight cartridge may be configured to act as a dampening member.

Based on the above disclosure, it is understood that aspects of the disclosure are directed to a golf club configured to receive interchangeable sections or cartridges, wherein one of the interchangeable cartridges may house a monitoring device 201 and a second of the interchangeable cartridges does not house a monitoring device. In this way, the golfer may selectively configure the golf club to include, or not include, the monitoring device 201 at the golfer's discretion. It is noted that, if desired, neither the cartridge 800 or the weight cartridge has to be included in the golf club head 701 and, instead, the golfer may remove the cartridge 800 and play with the port 709 being open and unfilled.

Figure 14A:
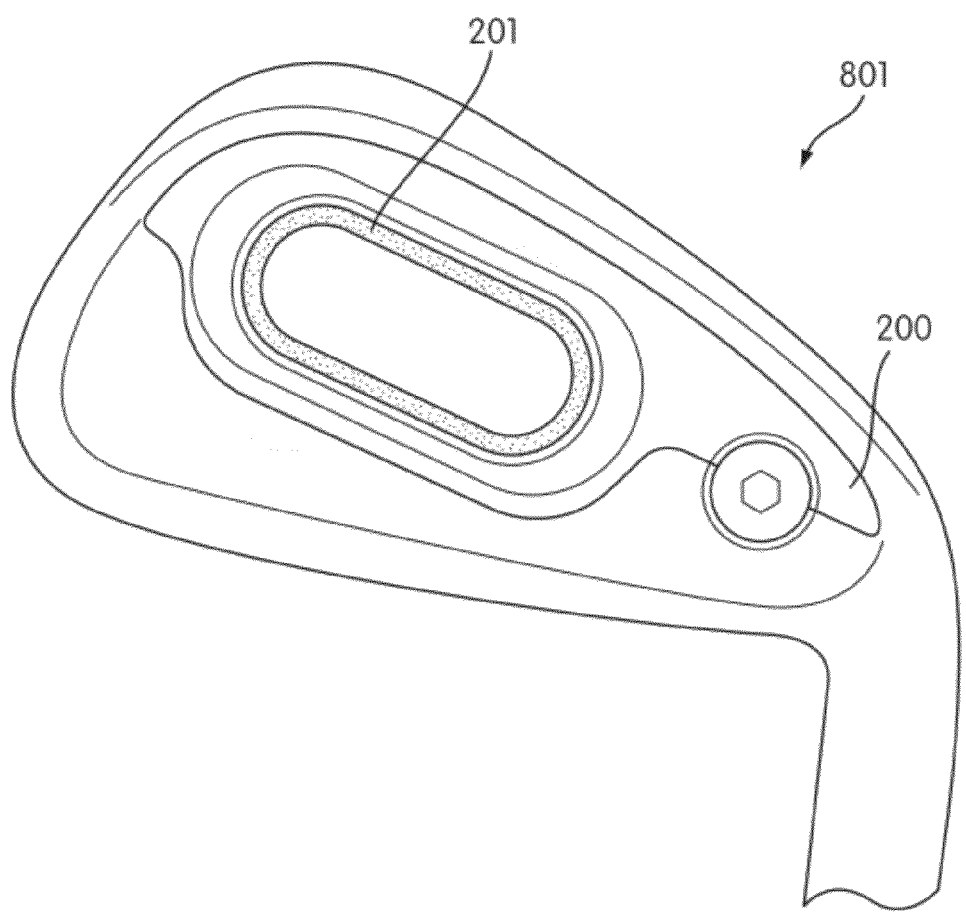
FIG. 14A is an illustrative embodiment of another iron-type golf club structure supporting a monitoring device according to aspects of the disclosure.

FIG. 14A shows another iron-type golf club 800 according to aspects of the disclosure. As seen in FIG. 14A, the iron-type golf club 800 may include an iron-type golf club head 801 in accordance with the present disclosure. Further, the iron-type golf club 800 may be configured to engage with a removable section or cartridge 200 and a monitoring device 201.

According to the aspects of the disclosure, the monitoring device 201 may be configured to engage with the golf club head 801 in a variety of ways. For example, as seen in FIG. 14A, the removable section 200 is engaged with the golf club head 801 via a threaded fastener. However, the removable section 200 may be configured to be engaged with the golf club head 801 via other methods as well, such as press fitting, snap fit mechanisms (e.g., spring loaded protrusions and corresponding detents), etc. As seen, the removable section 200 may include an opening configured to surround the monitoring device 201 and through which the monitoring device is visible. The removable section 200 may be configured to provide support and stability to the monitoring device 201. According to aspects of the disclosure, the removable section 200 may be made of plastic or other materials.

Further, as seen in FIG. 14A, the monitoring device 201 is engaged with the golf club head 801. The engagement of the monitoring device 201 with the golf club head 801 can be done in a variety of ways, e.g., mechanical fasteners, press fitting, snap fit mechanisms (e.g., spring loaded protrusions and corresponding detents), threaded fasteners, etc. The golf club head 801 may include a recess configured to receive the monitoring device 201. For example, the recess may be configured to surround and engage the monitoring device 201 in order to support and stabilize the monitoring device 201.

The golf club head 801, the removable section 200 and the monitoring device 201 may be configured to provide desirable weight placement in the club head 801. For example, the golf club head 101, the removable section 200 and the monitoring device 201 may be configured such that when engaged, the golf club head 801 it is in the lower portion of the golf club head 801.

A wide variety of overall club head constructions are possible without departing from this disclosure. For example, it is noted that the dimensions and/or other characteristics of the golf club heads 701, 801 according to examples of this disclosure may vary significantly without departing from the disclosure. For example, the above described features and configurations may be incorporated into any iron-type club heads including, for example: wedges (e.g., pitching wedges, lob wedges, gap wedges, sand wedges, etc.), iron-type hybrid clubs, driving irons, 0 through 10 irons, etc.

Further, the above described features and configurations in the aspects of the disclosure may be incorporated into a blade type golf club heads, a perimeter weighted and/or cavity back type golf club head or other iron type golf club head structure without departing from this disclosure. For example, a perimeter weighted and/or cavity back type golf club head including the golf club heads 701, 801 according to aspects of the disclosure, may include a rear surface opposite the ball striking face 711 which includes a perimeter weighting member extending rearward from the ball striking face and along at least a portion of a circumferential area of the golf club head body.

While wood-type golf clubs and iron-type golf clubs, have been described in detail above, other aspects of this disclosure relate to putter type golf club heads and putters. For example, FIGS. 15A and 15B generally illustrate an example of a putter-type golf club head 1001 according to aspects of the disclosure. The putter-type golf club head 1001 may be included in a putter which includes a shaft and a grip or handle (not shown). It is noted that the shaft and the grip or handle may be configured and attached to, or engaged with, the putter-type golf club head 1001 any suitable or desired manner such as those described above with regard to the wood type golf club 100 and iron-type golf club 700.

According to aspects of the disclosure, the golf club head 1001 may also include a ball striking face (e.g., a ball striking face which includes a face plate) 1111. According to aspects of the disclosure, the golf club head 1001 may be constructed in any suitable or desired manner and/or from any suitable or desired materials without departing from this disclosure, including from conventional materials and/or in conventional manners known and used in the art. For example, the club head 1001 and/or its various parts may be made by forging, casting, molding, and/or using other techniques and processes, including techniques and processes that are conventional and known in the art.

Figure 15A:
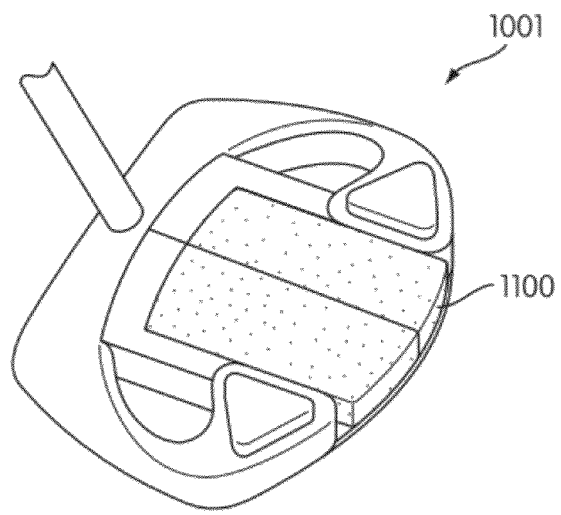
FIG. 15A is an illustrative embodiment of an putter golf club head structure supporting a monitoring device according to aspects of the disclosure.
Figure 15B:
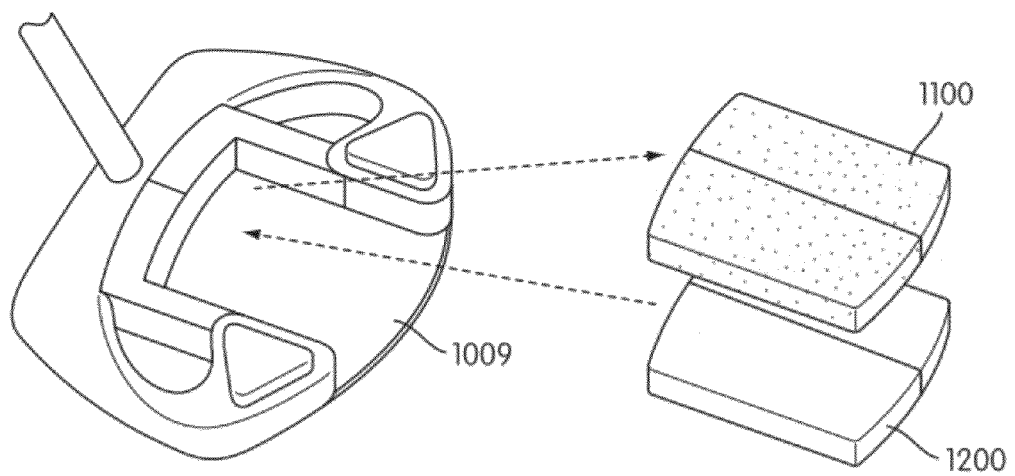
FIG. 15B is an exploded view of the putter golf club head shown in FIG. 15A.

According to aspects of the disclosure, the golf club head 701 may include a crown, a sole, a toe end, and a heel end. Further, as seen in FIG. 15B the golf club head 1001 may include a cavity, or port, 1009 behind the ball striking face 1011. The port 1009 may be positioned centrally in the golf club head 1001 and behind the rear of the ball striking face 1011.

According to aspects of the disclosure, and as seen in FIG. 15B, the port 1009 may be configured to receive a cartridge 1100. Further, if desired, the cartridge 1100 may be secured within the golf club head 1001 by securing means. It is noted, that the cartridge 1100 may be secured in the port 1009 of the golf club head 1001 in a variety of ways. For example, as discussed above, according to aspects of the disclosure, the cartridge 1100 may be removably engaged with the golf club head 1001. Therefore, mechanical fasteners may be used to secure the cartridge 1100 in the port 1009. For example, example embodiments of the disclosure may include a cartridge 1100 which is configured to be engaged with the golf club head 1001 via press fitting, snap fit mechanisms (e.g., spring loaded protrusions and corresponding detents), threaded fasteners, etc. Other securing means, such as described above with regard to wood-type golf club, may be used as well.

According to aspects of the disclosure, the cartridge 1100 may be made from any desired materials and combinations of different materials such as described above with regard to cartridge 200. Further, according to example embodiments of the disclosure, the cartridge 1100 may be configured with configured to house a monitoring device 201 similar to the one described above with regard to the wood-type golf club. For example, the monitoring device 201 may be configured to house the sensors 202, the transmitter/transceiver 203, processor 204, power supply 206, memory, etc. The monitoring device 201, its capabilities and functions are similar to the monitoring device 201 described above and, therefore, for the sake of brevity, will not be elaborated on here. Further, the above described methods for determining and transmitting data to the remote computer 400 are applicable with the iron-type golf clubs as well and, therefore, will not be repeated for the sake of brevity.

As seen in FIG. 15B, aspects of the disclosure, relate to a weight cartridge 1200 which is configured to be engaged with the port 1009. The weight cartridge 1200 may be configured similarly to the cartridge 1100 described above with the exception that the weight cartridge 1200 does not include a monitoring device 201. It is noted that the weight cartridge 1200 may be configured to engage with the port 1009 in the same manner as the corresponding cartridge 1100. Hence, again, for the sake of brevity, the engaging and releasing structure of the weight cartridge 1200 and the port 1009 will not be elaborated on here.

According to aspects of the disclosure, when the golfer does not want to have the monitoring device 201 housed within the golf club 1000, the golfer may disengage and remove the cartridge 1100 from the port 1009 of the golf club head 1001 and engage and secure the weight cartridge 1200 with the port 1009 of the golf club head 1001. It is noted that according to aspects of the disclosure, the weight cartridge 1100 may be weighted as desired to provide appropriate balancing to the putter-type golf club head 1001.

Therefore, based on the above disclosure, it is understood that aspects of the disclosure are directed to a golf club configured to receive interchangeable sections or cartridges, wherein one of the interchangeable cartridges may house the monitoring device 201 and a second of the interchangeable cartridges does not house the monitoring device 201. In this way, the golfer may selectively configure the golf club to include, or not include, the monitoring device 201 at the golfer's discretion.

A wide variety of overall club head constructions are possible without departing from this disclosure. For example, it is noted that the dimensions and/or other characteristics of the golf club heads 1001 according to examples of this disclosure may vary significantly without departing from the disclosure. For example, the above described features and configurations may be incorporated into any putter-type club heads including, for example: mallet heads, blade-type putters, etc.

Figure 16A:
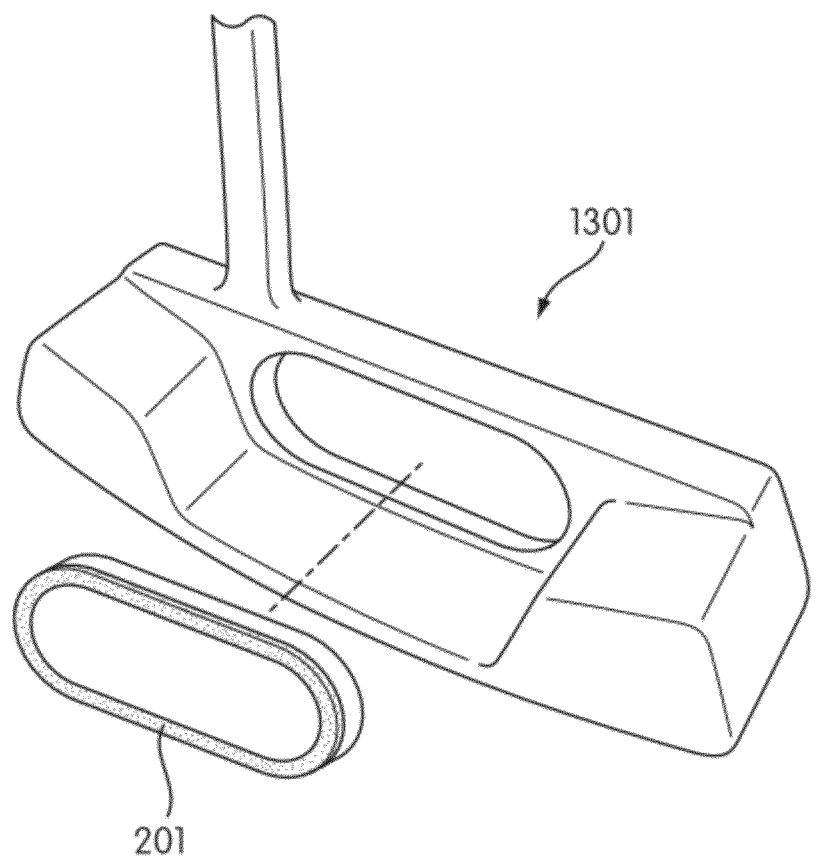
FIG. 16A is an exploded view of an illustrative embodiment of an putter golf club head structure having a monitoring device according to aspects of the disclosure.
Figure 16B:
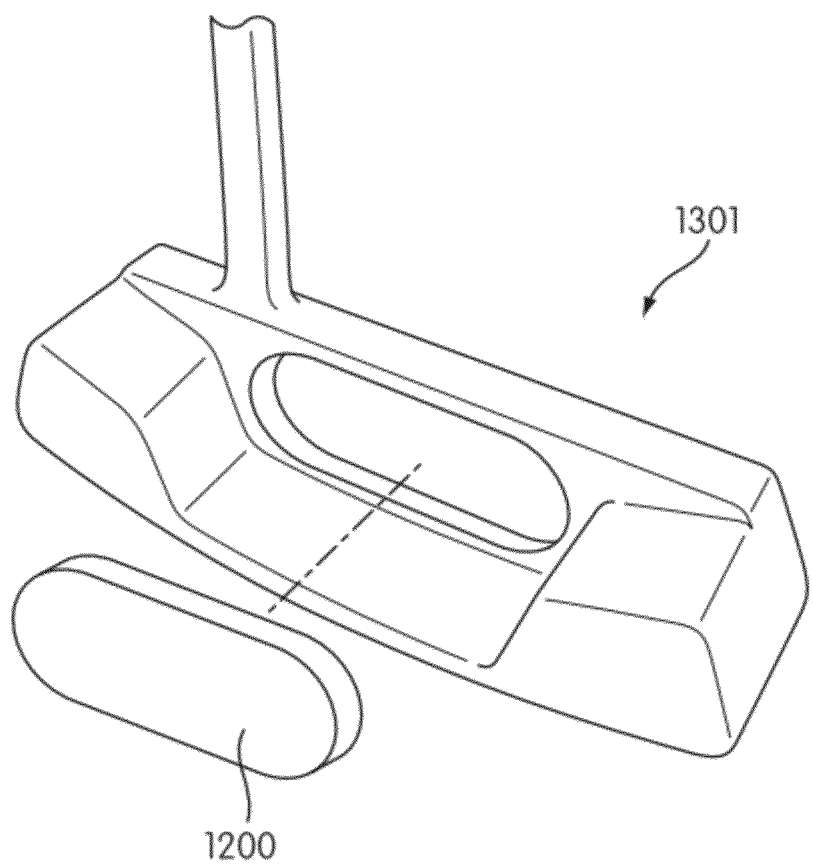
FIG. 16B is an exploded view of the putter golf club head shown in FIG. 16A wherein the weight is attached the golf club head.

For example, FIGS. 16A and 16B show an alternative embodiment of a putter-type golf club according to aspects of the disclosure. FIG. 16A is an exploded view of an illustrative embodiment of a putter golf club head structure according to aspects of the disclosure wherein a monitoring device 201 is used. FIG. 16B is an exploded view of the putter golf club head shown in FIG. 16A wherein the weight cartridge 1200 is used instead of the monitoring device 201.

As seen in FIGS. 16A and 16B, the putter-type golf club may include a putter-type golf club head 1301 in accordance with the present disclosure. The golf club head 1301 may include a recess configured to receive the monitoring device 201. For example, the recess may be configured to surround and engage the monitoring device 201 in order to support and stabilize the monitoring device 201. As seen in FIG. 16A, the recess may be configured in the rear of the golf club head 1301 behind the ball striking face of the golf club head 1301. According to the aspects of the disclosure, the monitoring device 201 may be configured to engage with the golf club head 1301 in a variety of ways, such as mechanical fasteners, press fitting, snap fit mechanisms (e.g., spring loaded protrusions and corresponding detents), threaded fasteners, etc.

The golf club head 1301 and the monitoring device 201 may be configured to provide desirable weight placement in the club head 1301. For example, the golf club head 1301, and the monitoring device 201 may be configured such that when engaged, the golf club head 1301 is directly behind the center of the ball striking face of the golf club head 1301. While not illustrative, it is noted that in alternative embodiments, the removable section 200 may be used to engage the monitoring device with the golf club head 1301.

As seen in FIG. 16B, aspects of the disclosure, relate to a weight cartridge 1200 which is configured to be engaged with the recess. The weight cartridge 1200 may be configured similarly to the monitoring device 201 described above with the exception that the weight cartridge 1200 does not include a monitoring device 201. It is noted that the weight cartridge 1200 may be configured to engage with the recess in the same manner as the monitoring device 201. Hence, for the sake of brevity, the engaging and releasing structure of the weight cartridge 1200 and the recess will not be elaborated on here.

Figure 16C:
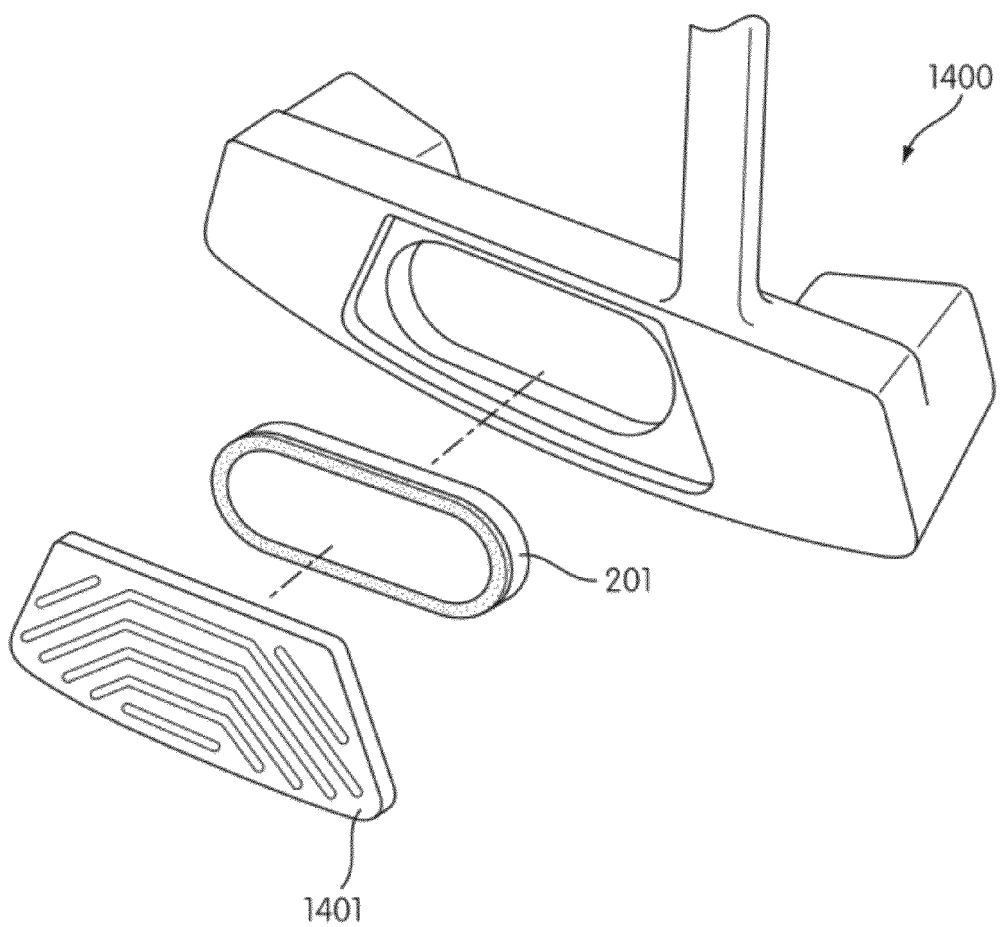
FIG. 16C is an exploded view of an illustrative embodiment of another putter golf club head structure supporting a monitoring device according to aspects of the disclosure.

FIG. 16C shows an alternative embodiment of a putter-type golf club according to aspects of the disclosure. FIG. 16C is an exploded view of an illustrative embodiment of a putter golf club head structure according to aspects of the disclosure wherein a monitoring device 201 is used.

As seen in FIG. 16C, the putter-type golf club may include a putter-type golf club head 1401 in accordance with the present disclosure. The golf club head 1401 may include a recess configured to receive the monitoring device 201. For example, the recess may be configured to surround and engage the monitoring device 201 in order to support and stabilize the monitoring device 201. As seen in FIG. 16C, the recess may be configured in the ball striking face of the golf club head 1401. According to the aspects of the disclosure, the monitoring device 201 may be configured to engage with the golf club head 1401 in a variety of ways, such as mechanical fasteners, press fitting, snap fit mechanisms (e.g., spring loaded protrusions and corresponding detents), threaded fasteners, etc.

The golf club head 1401 and the monitoring device 201 may be configured to provide desirable weight placement in the club head 1401. For example, the golf club head 1401, and the monitoring device 201 may be configured such that when engaged, the golf club head 1401 is in center of the ball striking face of the golf club head 1401. While not illustrative, it is noted that in alternative embodiments, the removable section 200 may be used to engage the monitoring device with the golf club head 1401.

Figure 16D:
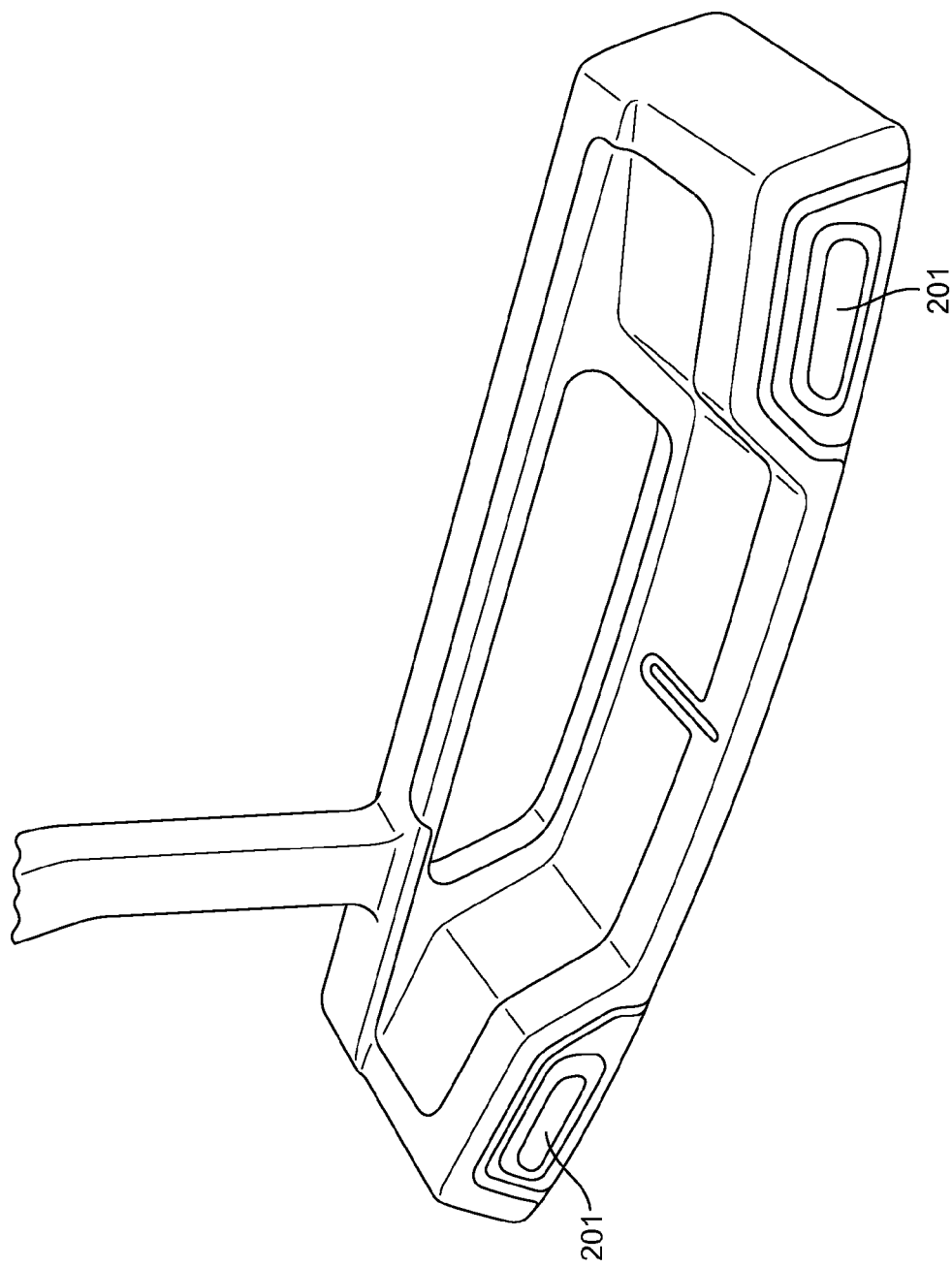
FIG. 16D is a view of an illustrative embodiment of another putter golf club head structure according to aspects of the disclosure.

FIG. 16D shows an alternative embodiment of a putter-type golf club according to aspects of the disclosure. FIG. 16D is a view of an illustrative embodiment of a putter golf club head structure according to aspects of the disclosure wherein two monitoring devices 201 are used. For example, as seen in FIG. 16, a first monitoring device 201 may be positioned in a heel of the putter-type golf club head and a second monitoring device 201 may be positioned in a toe of the putter-type golf club head. According to aspects of the disclosure, by using data from both the first and second monitoring devices 201, the position of where the golf ball impacts the face of the golf club head may be determined. It is noted that while this feature of having two monitoring devices 201 in a golf club head is depicted in a putter, this feature is applicable to any type of golf club head, including: wood-type golf club heads, iron-type golf club heads, hybrid-type golf club heads, etc. It is further understood that the pair of monitoring devices 201 may be positioned proximate the face of the club head and proximate the heel and toe of the club head.

According to aspects of the disclosure, monitoring devices 201 may include one or more sensors configured to detect the impact of the golf ball with the golf club head 101. For example, a force sensor, a pressure sensor (e.g., a piezoelectric sensor), or the like may be configured to detect the location of the impact on the ball striking face 107 of the golf club head and, further, the force generated from the impact. Such data generated from the impact sensors may be communicated through the monitoring device 201 and, further, transmitted via the transmitter 203 along with the other data from the other one or more sensors of the monitoring device 201 described above. Further, according to embodiments of such a disclosure, the data from the impact sensors can be incorporated with data from the above described sensors. For example, the data from the impact sensors can be used to determine various characteristics of the golf swing such as described above. Further, according to aspects of the disclosure, by using data from one or more impact sensors, the position of where the golf ball impacts the face of the golf club head may be determined.

According to aspects of the disclosure, embodiments of the disclosure may include one or more monitoring devices 201 located in various positions throughout the golf club. For example, according to aspects of the disclosure, the first and second monitoring devices 201 may be positioned at or near the ball striking face of the golf club head. However, according to other aspects of the disclosure, embodiments may have one or more monitoring devices 201 positioned away from the ball striking face of the golf club head. For example, in the embodiment depicted in FIG. 16D, the first and second monitoring devices 201 are positioned in the rear of the golf club head.

It is noted that in embodiments wherein the sensors are not positioned at the ball striking face, the data determined by sensors may need to be manipulated or adjusted in order to provide accurate measurements. For example, in the embodiment shown in FIG. 16D, because sensors are positioned in the rear of the golf club head, they may provide data that is different from data determined by sensors in monitoring devices 201 positioned at or near the ball striking face of the golf club head. Therefore, data collected from sensors of the embodiment shown in FIG. 16D may be manipulated (e.g., recalculated or otherwise modified) in order to account from the positioning of the sensors within the rear of the golf club head. In this way, the manipulated data can be used to determine accurate golf metrics, variables and kinematics, such as described above.

It is noted that while the above description of manipulating data is with respect to a distance from the ball striking face of the golf club head, any reference point may be used. Accordingly, the data collected from sensors positioned away from that particular reference point may be manipulated (e.g., recalculated or otherwise modified) in order to account from the positioning of those sensors away from the particular reference point.

According to aspects of the disclosure, the data from sensors may be subjected a transformation matrix which manipulates the data (e.g., recalculates or modifies the data) in order to account for the exact positioning of the sensor within the golf club. The transformation matrix may be a series of calculations which modifies that data according to the exact positioning of the sensor within the golf club. Therefore, it is understood that a different transformation matrix may be required for each of individual sensors positioned at different locations within the golf club. For example, in the embodiment shown in FIG. 16D, a first transformation matrix may be used to calculate data obtained the first sensor in the heel of the golf club head and a second, different, transformation matrix may be used to calculate data obtained the second sensor in the toe of the golf club head.

The transformation matrix may be included in a software package that may be downloaded to the remote computer 400 to which the data from the monitoring device 201 is transmitted. For example, the software package may be available for download from a website. For example, a website may include software packages or applications designed for particular golf clubs of sets of golf clubs. Those software packages may contain transformation matrices designed for the specific positions of sensors and remote monitoring devices 201 in the respective golf clubs.

Therefore, if a golfer was using a particular putter (e.g., putter A), the golfer could download the particular software package or application designed for putter A to the remote computer 400. Hence, when data (obtained by the sensors of the remote monitoring device(s) 201 in that particular golf club) is transmitted to the remote computer 400, the downloaded software package or application for that particular golf club would recalculate the obtained data and output accurate measurements, golf metrics, variables and kinematics.

According to aspects of the disclosure, a monitoring device 201 may contain identification codes which allow data transmitted from a particular monitoring device 201 to synchronize with the remote computer 400 used by the golfer. For example, the upon downloading the software package or application for the particular golf club to the remote computer 400, the golfer may manually enter a identification code into the remote computer 400 to synchronize the monitoring device 201 with the remote computer 400. Hence, by allowing the particular monitoring device 201 to be synchronized with the remote computer 400, the monitoring devices could be interchangeable within various golf clubs.

For example, a golfer may download an application or software package which contains transformation matrices for each golf clubs that a golfer owns. By synchronizing the monitoring device(s) 201 in each of the golf clubs (e.g., the monitoring device(s) 201 in each of: a pitching wedge, a sand wedge, a 10-iron, a 9-iron . . . a 3-wood, a driver, etc.), with the remote computer 400, the remote computer 400 would recognize the data from a particular monitor device 201 and associate that data with the respective golf club and, additionally, appropriate location of the sensor within the respective golf club. Hence, using the transformation matrix for the respective golf club, the remote computer 400 would output correct measurements, golf metrics, variables and kinematics. Therefore, as demonstrated, provided that the monitoring device(s) 201 are synchronized correctly, the monitoring device(s) 201 may be interchangeable within golf clubs. It is noted that, if desired, the identification code could be transmitted to the remote computer 400 by the monitoring device 201 along with the data. In this way, the identification code would not have entered by the golfer and, instead, the synchronization and coordination of the monitoring device 201 with remote computer 400 could be done automatically.

Figure 17A:
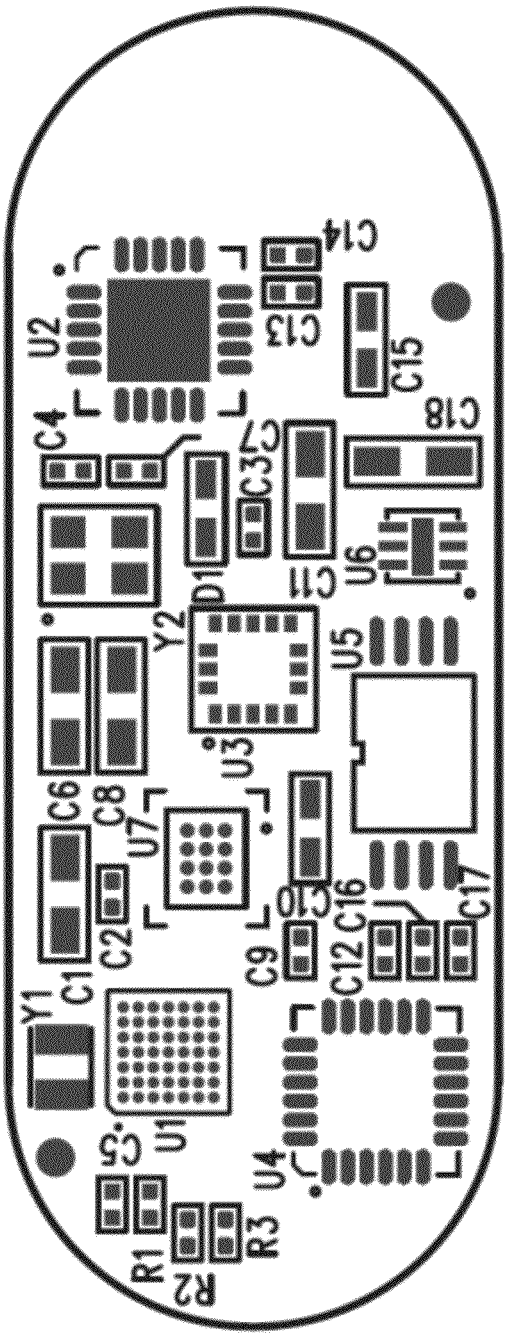
FIGS. 17A and 17B are an illustrative embodiment of the interior of an embodiment of a monitoring device according to aspects of the disclosure.
Figure 17B:
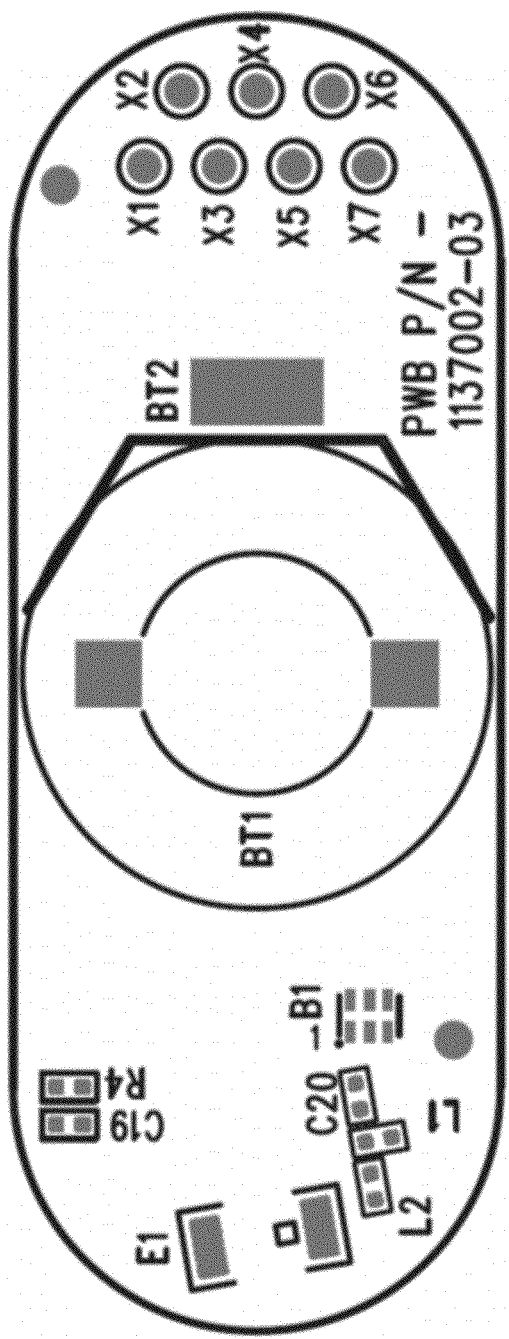
Figure 18A:
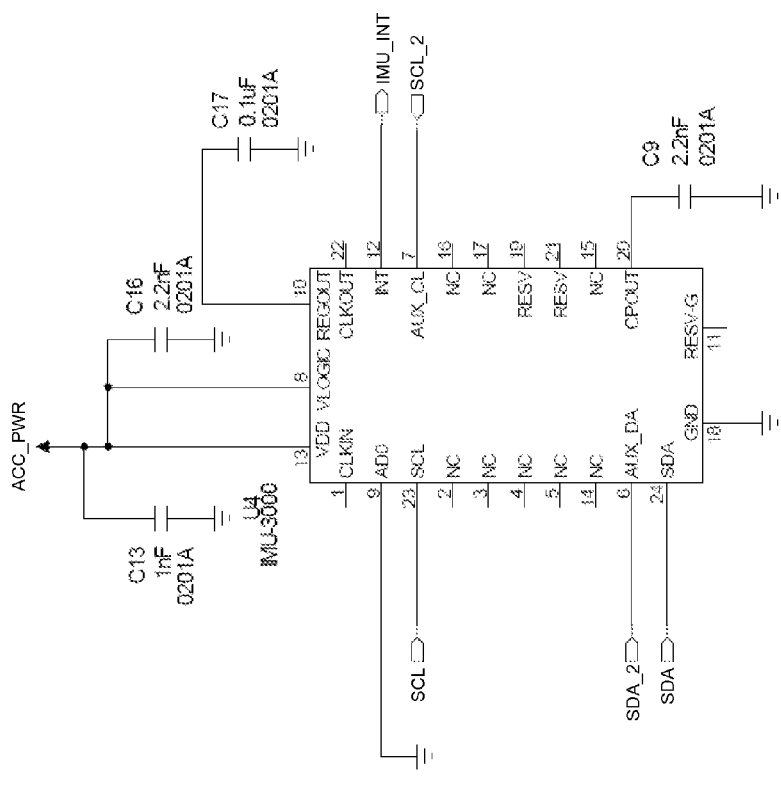
FIGS. 18A-D are illustrative embodiments of circuitry of a monitoring device according to aspects of the disclosure.
Figure 18A:
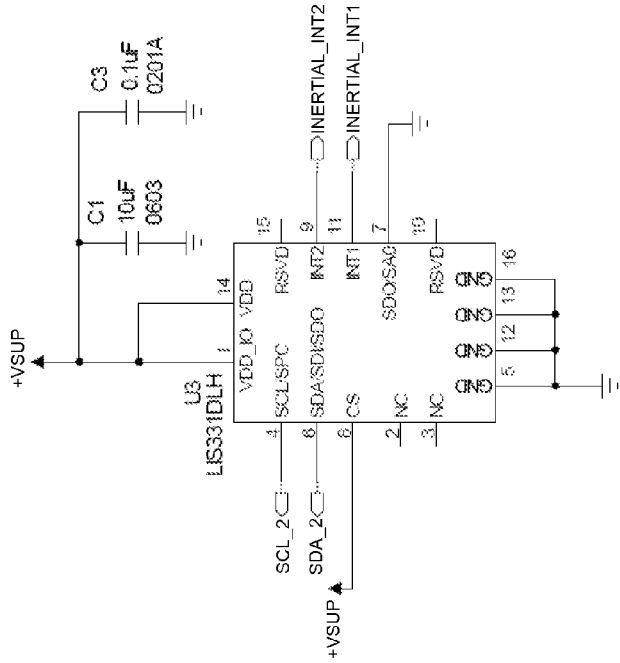
Figure 18B:
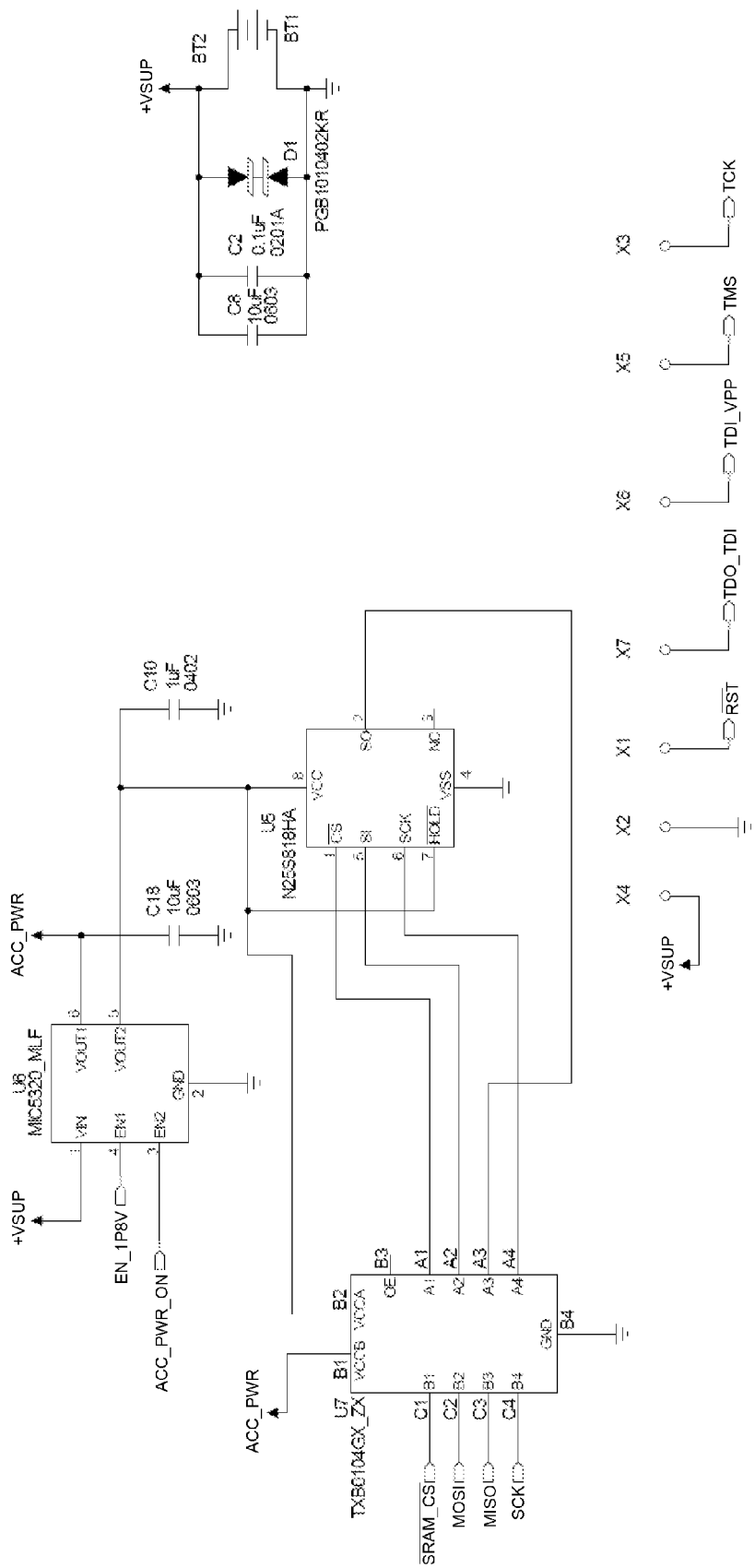
Figure 18C:
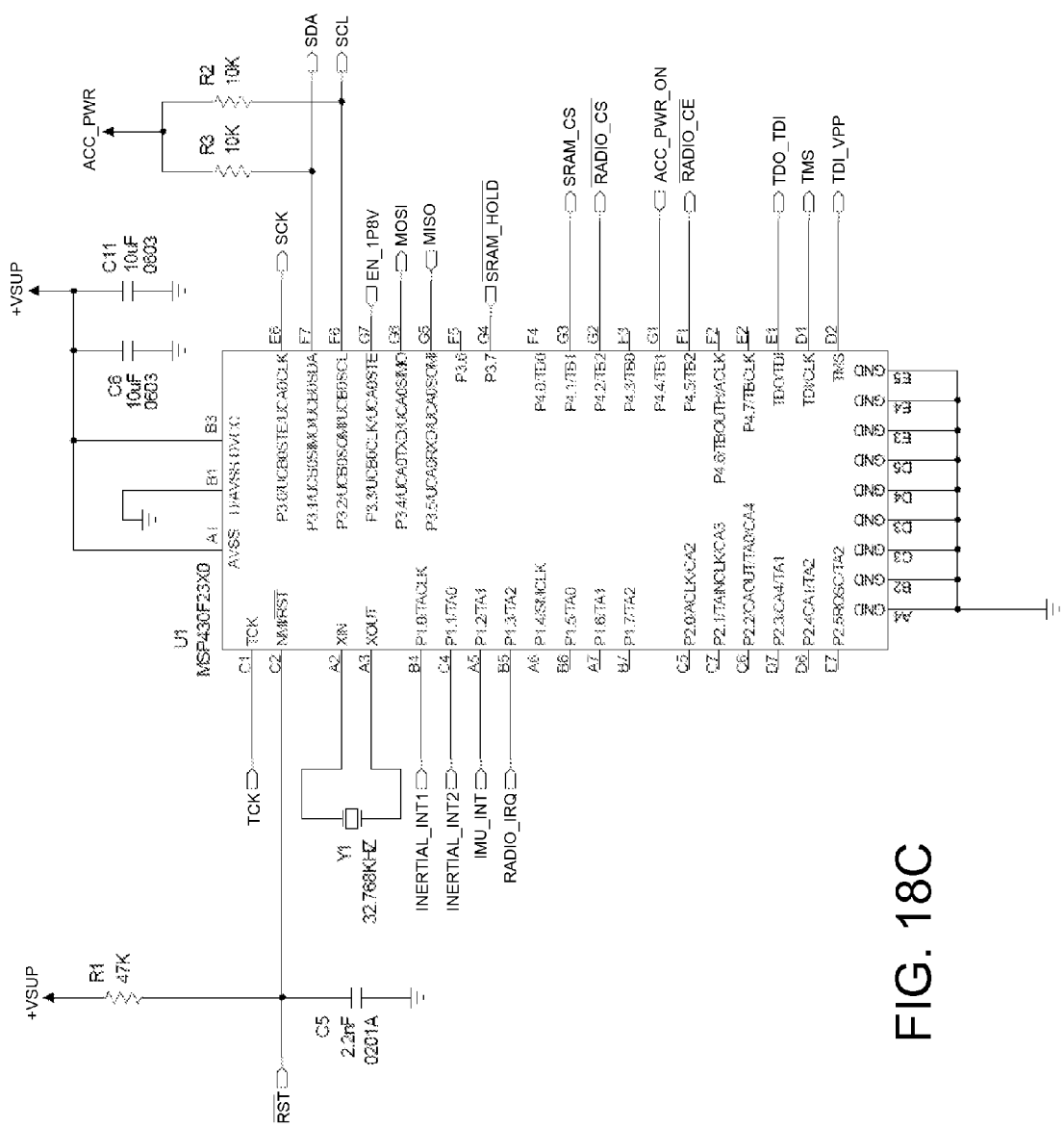
Figure 18D:
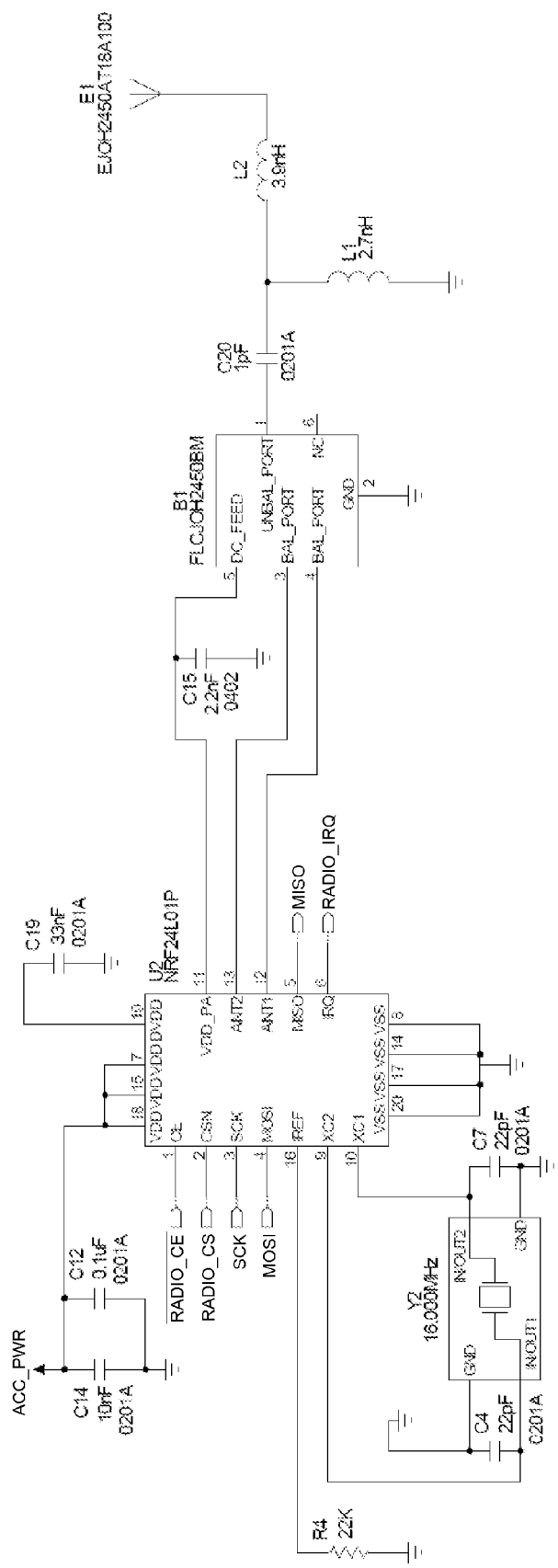

FIGS. 17A and 17B are an illustrative embodiment of the interior of an embodiment of a monitoring device 201, or general schematic sensor layout, according to aspects of the disclosure. For example, as seen in FIGS. 17A and B, a monitoring device 201 may include a power source, a transceiver, an accelerometer (e.g., 3-axis accelerometer), one or more: capacitors, diodes, antennas, inductors, resistors, filters, integrated circuits for controllers (e.g., mixed signal controllers), transceivers, memory and digital motion sensors, voltage regulators, inertial measurement units, etc. One of ordinary skill in the art would realize that modification to, or exclusion of, one or more of the above components or the inclusion of additional components in monitoring device may be used as desired to configure the monitoring device to function as described above. Such inclusions, modifications, etc. are considered within the scope of the disclosure. FIGS. 18A-D are illustrative embodiments of circuitry of a monitoring device according to aspects of the disclosure. It is understood that various components as described above can be incorporated into the schematic layouts and circuitry disclosed herein.

III. Conclusion

The present disclosure is described above and in the accompanying drawings with reference to a variety of example structures, features, elements, and combinations of structures, features, and elements. The purpose served by the disclosure, however, is to provide examples of the various features and concepts related to the disclosure, not to limit the scope of the disclosure. One skilled in the relevant art will recognize that numerous variations and modifications may be made to the embodiments described above without departing from the scope of the present disclosure, as defined by the appended claims. For example, the various features and concepts described above in conjunction with FIGS. 1 through 10 may be used individually and/or in any combination or sub-combination without departing from this disclosure.

The invention claimed is:

1. A system for determining aspects related to a golf swing, comprising:
 a golf club comprising:
  a golf club head;
  a shaft configured to engage with the golf club head, including a grip engaged with the shaft;
 a monitoring device configured to be engaged with the golf club and configured to determine data related to at least one characteristic of a golf swing, comprising:
  an accelerometer,
  a gyroscope,
  a magnetometer, and
  a GPS device;
 a remote computer configured to receive the data; and
 a removable section;
 wherein the removable section is nondestructively removably engaged with the golf club and wherein the monitoring device is nondestructively removably engaged with the removable section;
 wherein the shaft is configured to nondestructively removably engage and secure the removable section;
 wherein the removable section is configured to removably engage the monitoring device with at least one of: press fitting, snap fit mechanisms or mechanical fasteners; and
 wherein the shaft is configured to removably engage the removable section with at least one of: press fitting, snap fit mechanisms or mechanical fasteners.

2. The system of claim 1, wherein the monitoring device includes a transmission module and the remote computer includes a transmission reception system, wherein the transmission module is configured to wirelessly transmit the data related to the characteristics of a golf swing to the transmission reception system of the remote computer.

3. The system of claim 2, wherein the monitoring device includes a microprocessor configured to calculate one or more golf metrics based on the data determined by the sensor.

4. The system of claim 3, wherein the transmission module is configured to wirelessly transmit the golf metrics based on the data determined by the sensor.

5. The system of claim 4, wherein the remote computer includes a memory configured to store the golf metrics.

6. The system of claim 4, wherein the remote computer includes an audio or video means configured to communicate the golf metrics to the user.

7. The system of claim 3, wherein the golf metrics include a graphical representation of the swing path of the golf swing from which the data was determined.

8. The system of claim 4, wherein the transmission reception system of the remote computer is configured to transmit the golf metrics.

9. The system of claim 2, wherein the monitoring device includes a microprocessor configured to calculate kinematics based on the data determined by the sensor.

10. The system of claim 9, wherein the transmission module is configured to wirelessly transmit the kinematics.

11. The system of claim 10, wherein the remote computer is configured to process the kinematics received from the transmission module of the monitoring device and calculate one or more golf metrics based on the kinematics.

12. The system of claim 11, wherein the remote computer includes a memory configured to store the golf metrics.

13. The system of claim 12, wherein the remote computer includes an audio or video means configured to communicate the golf metrics to the user.

14. The system of claim 10, wherein the kinematics includes computed acceleration data from the golf swing from which the data was determined.

15. The system of claim 10, wherein the transmission module is configured to wirelessly transmit the kinematics during a golf swing.

16. The system of claim 9, wherein the monitoring device includes a memory configured to store the kinematics.

17. The system of claim 10, wherein the transmission module is configured to wirelessly transmit the kinematics after a golf swing.

18. The system of claim 10, wherein the transmission module is configured to wirelessly transmit the kinematics for more than one golf swing stored in the memory.

19. The system of claim 11, wherein the transmission reception system of the remote computer is configured to transmit the golf metrics.

20. The system of claim 2, wherein the monitoring device includes a microprocessor configured to process electrical signals determined by the sensor.

21. The system of claim 20, wherein the transmission module is configured to wirelessly transmit the processed electrical signals.

22. The system of claim 21, wherein the remote computer is configured to process the processed electrical signals received from the transmission module and calculate one or more golf metrics based on the processed electrical signals.

23. The system of claim 22, wherein the remote computer includes a memory configured to store the golf metrics.

24. The system of claim 22, wherein the remote computer includes an audio or video means configured to communicate the golf metrics to the user.

25. The system of claim 21, wherein the transmission module is configured to wirelessly transmit the processed electrical signals during a golf swing.

26. The system of claim 20, wherein the monitoring device includes a memory configured to store the processed electrical signals.

27. The system of claim 20, wherein the transmission module is configured to wirelessly transmit the processed electrical signals after a golf swing.

28. The system of claim 26, wherein the transmission module is configured to wirelessly transmit the kinematics for more than one golf swing stored in the memory.

29. The system of claim 22, wherein the transmission reception system of the remote computer is configured to transmit the golf metrics.

30. The system of claim 2, wherein the transmission module is configured to wirelessly transmit electrical signals which are determined by the sensor and contain the data related to the characteristics of a golf swing.

31. The system of claim 30, wherein the remote computer is configured to process the electrical signals received from the transmission module and calculate one or more golf metrics based on the processed electrical signals.

32. The system of claim 31, wherein the remote computer includes a memory configured to store the golf metrics.

33. The system of claim 31, wherein the remote computer includes an audio or video means configured to communicate the golf metrics to the user.

34. The system of claim 30, wherein the transmission module is configured to wirelessly transmit the electrical signals during a golf swing.

35. The system of claim 31, wherein the transmission reception system of the remote computer is configured to transmit the golf metrics.

36. The system of claim 30, wherein the remote computer includes:
   a transceiver configured to receive the electrical signals received from the transmission module;
   a microprocessor configured to process the electrical signals and calculate one or more golf metrics based on the processed electrical signals;
   a memory configured to store the golf metrics; and
   at least one of an audio and a video means configured to communicate the golf metrics to the user,
   wherein the golf metrics include a graphical representation of the swing path of the golf swing from which the data was determined.

37. The system of claim 36, wherein the transceiver is configured to receive the electrical signals from the transmission module from the during the golf swing.

38. The system of claim 36, wherein the a microprocessor configured to recognize the electrical signals from the transmission module an coordinate the electrical signals with a particular golf club or set of golf clubs based on an identification code stored in the memory of the remote computer or received from the monitoring device.

39. A system for determining aspects related to a golf swing, comprising:
   a golf club comprising:
   a golf club head;
   a shaft configured to engage with the golf club head, including a grip engaged with the shaft;
   a monitoring device configured to be engaged with the golf club and configured to determine data related to at least one characteristic of a golf swing, comprising:
      an accelerometer;
      a gyroscope;
      a magnetometer; and
   a remote computer configured to receive the data;
   a removable section nondestructively removably engaged with the monitoring, device;
   a top portion;
   wherein the top portion is nondestructively removably engaged with the golf club and wherein the removable section is nondestructively removably engaged with the top portion;
   wherein the shaft is configured to nondestructively removably engage and secure the top portion;
   wherein the removable section is configured to removably engage the monitoring device with at least one of: press fitting, snap fit mechanisms or mechanical fasteners;
   wherein the top portion is configured to removably engage the removable section with at least one of: press fitting, snap fit mechanisms or mechanical fasteners; and
   wherein the shaft is configured to removably engage the top portion with at least one of: press fitting, snap fit mechanisms or mechanical fasteners.

40. A system for determining aspects related to a golf swing, comprising:
   a golf club comprising:
      a golf club head;
      a shaft configured to engage with the golf club head, including a grip engaged with the shaft; and
      a monitoring device configured to be engaged with the golf club and configured to determine data related to at least one characteristic of a golf swing, comprising:
         an accelerometer;
         a gyroscope;
         a magnetometer;
         a GPS device; and
      a remote computer configured to receive the data,
      a removable section,
      wherein removable section is nondestructively removably engaged with the golf club and wherein the monitoring device is nondestructively removably engaged with the removable section;
      wherein both of the golf club head and the shaft are configured to nondestructively removably engage and secure the removable section;
      wherein the removable section is configured to removably engage the monitoring device with at least one of: press fitting, snap fit mechanisms or mechanical fasteners; and
      wherein both the head and the shaft are configured to removably engage the removable section with at least one of: press fitting, snap fit mechanisms or mechanical fasteners.

41. The golf club of claim 40, further comprising:
   a second monitoring device, comprising:
      at least one sensor configured to determine data related to at least one characteristic of a golf swing;
   wherein the remote computer is configured to receive the data from the second monitoring device.

* * * * *